United States Patent
Wallace et al.

(10) Patent No.: US 9,835,729 B2
(45) Date of Patent: Dec. 5, 2017

(54) GLOBAL NAVIGATION SATELLITE SYSTEM RECEIVER SYSTEM WITH RADIO FREQUENCY HARDWARE COMPONENT

(71) Applicant: Trimble Inc., Sunnyvale, CA (US)

(72) Inventors: Gregory Craig Wallace, Arvada, CO (US); Peter Van Wyck Loomis, Sunnyvale, CA (US); Shawn D. Weisenburger, Denver, CO (US); James M. Janky, Los Altos, CA (US)

(73) Assignee: Trimble Inc., Sunnyvale, CA (US)

(*) Notice: Subject to any disclaimer, the term of this patent is extended or adjusted under 35 U.S.C. 154(b) by 600 days.

(21) Appl. No.: 14/304,822

(22) Filed: Jun. 13, 2014

(65) Prior Publication Data

US 2014/0292569 A1    Oct. 2, 2014

Related U.S. Application Data

(63) Continuation-in-part of application No. 14/134,437, filed on Dec. 19, 2013, now Pat. No. 9,612,341.
(Continued)

(51) Int. Cl.
*G01S 19/43* (2010.01)
*G01S 19/41* (2010.01)
*G01S 19/00* (2010.01)

(52) U.S. Cl.
CPC .............. *G01S 19/43* (2013.01); *G01S 19/41* (2013.01)

(58) Field of Classification Search
CPC .......... G01S 19/38; G01S 19/39; G01S 19/40; G01S 19/41; G01S 19/42; G01S 19/43;
(Continued)

(56) References Cited

U.S. PATENT DOCUMENTS 5,225,842 A    7/1993  Brown et al.
5,345,244 A    9/1994  Gildea et al.
(Continued)

FOREIGN PATENT DOCUMENTS

EP    0508405    10/1992
EP    1729145 A1    12/2006
(Continued)

OTHER PUBLICATIONS

"Spirit Level with bubble", https://play.google.com/store/apps/details?id=com.zabaanapps.android.level, Mar. 25, 2014, 2 Pages.
(Continued)

*Primary Examiner* — Bernarr Gregory
(74) *Attorney, Agent, or Firm* — Kilpatrick Townsend & Stockton LLP

(57) ABSTRACT

A stand-alone radio frequency (RF) hardware component comprises first and second antennas, a digitizer, a serializer, and a serial output. The first antenna receives, over-the-air, a first analog Global Navigation Satellite System (GNSS) signal in a first frequency band. The second antenna receives, over-the-air, at least a second analog GNSS signal in a second frequency band, wherein the first frequency band and the second frequency band are separate and distinct. The digitizer digitizes the first analog GNSS signal into a first digitalized GNSS signal and digitizes the second analog GNSS signal into a second digitized GNSS signal. The serializer serializes the digitized GNSS signals into a serialized output signal. The serial output communicatively couples the digitized GNSS signals, as the serialized output signal, directly from the RF hardware component to a communication device that is removably couplable with the stand-alone RF hardware component.

41 Claims, 57 Drawing Sheets

Related U.S. Application Data which is a continuation-in-part of application No. 14/035,884, filed on Sep. 24, 2013, now Pat. No. 9,369,843, said application No. 14/035,884 is a continuation-in-part of application No. 13/842,447, filed on Mar. 15, 2013, now Pat. No. 9,429,640.

(60) Provisional application No. 61/746,916, filed on Dec. 28, 2012.

(58) Field of Classification Search
CPC .... G01S 19/421; G01S 19/423; G01S 19/425; G01S 19/426; G01S 19/01; G01S 19/13; G01S 19/33; G01S 19/07; G01S 19/11
See application file for complete search history.

(56) References Cited

U.S. PATENT DOCUMENTS

| | | | |
|---|---|---|---|
| 5,379,224 A | 1/1995 | Brown et al. | |
| 5,471,217 A | 11/1995 | Hatch et al. | |
| 5,477,228 A | 12/1995 | Tiwari et al. | |
| 5,523,761 A | 6/1996 | Gildea | |
| 5,572,216 A | 11/1996 | Weinberg et al. | |
| 5,594,454 A | 1/1997 | Devereux et al. | |
| 5,621,416 A | 4/1997 | Lennen | |
| 5,740,048 A | 4/1998 | Abel et al. | |
| 5,805,108 A | 9/1998 | Lennen | |
| 5,852,412 A * | 12/1998 | Stangeland | G01S 19/07 340/945 |
| 5,862,501 A | 1/1999 | Talbot et al. | |
| 5,899,957 A | 5/1999 | Loomis | |
| 5,903,235 A | 5/1999 | Nichols | |
| 5,913,170 A | 6/1999 | Wortham | |
| 5,914,685 A * | 6/1999 | Kozlov | G01S 19/425 342/357.26 |
| 6,067,046 A | 5/2000 | Nichols | |
| 6,072,431 A | 6/2000 | Froeberg | |
| 6,249,245 B1 | 6/2001 | Watters et al. | |
| 6,324,473 B1 | 11/2001 | Eschenbach | |
| 6,408,178 B1 | 6/2002 | Wickstrom et al. | |
| 6,429,808 B1 | 8/2002 | King et al. | |
| 6,430,503 B1 | 8/2002 | McBurney et al. | |
| 6,448,926 B1 | 9/2002 | Weinberg et al. | |
| 6,473,030 B1 | 10/2002 | McBurney et al. | |
| 6,507,738 B1 | 1/2003 | Allison et al. | |
| 6,510,387 B2 | 1/2003 | Fuchs et al. | |
| 6,564,144 B1 | 5/2003 | Cherveny | |
| 6,590,525 B2 | 7/2003 | Yule et al. | |
| 6,711,293 B1 | 3/2004 | Lowe | |
| 6,853,909 B2 | 2/2005 | Scherzinger | |
| 7,003,112 B1 | 2/2006 | Froeberg | |
| 7,043,364 B2 | 5/2006 | Scherzinger | |
| 7,151,489 B2 | 12/2006 | Pande | |
| 7,170,445 B2 * | 1/2007 | Thiel | G01S 19/11 342/357.48 |
| 7,191,097 B1 | 3/2007 | Lee et al. | |
| 7,336,814 B2 | 2/2008 | Boca et al. | |
| 7,480,511 B2 | 1/2009 | O'Meagher | |
| 7,541,974 B2 | 6/2009 | Scherzinger | |
| 7,570,204 B1 | 8/2009 | McGraw et al. | |
| 7,683,831 B2 * | 3/2010 | Fischer | G01S 19/33 342/357.64 |
| 7,768,449 B2 * | 8/2010 | Gaal | G01S 19/33 342/357.73 |
| 7,908,106 B2 | 3/2011 | Cho et al. | |
| 7,961,141 B2 | 6/2011 | Dai et al. | |
| 8,024,144 B2 | 9/2011 | Kludas et al. | |
| 8,032,152 B2 | 10/2011 | Manson et al. | |
| 8,044,852 B2 | 10/2011 | Green et al. | |
| 8,068,848 B2 | 11/2011 | Manson et al. | |
| 8,068,849 B2 | 11/2011 | Manson et al. | |
| 8,078,192 B2 | 12/2011 | Wirola et al. | |
| 8,081,987 B2 | 12/2011 | Manson et al. | |
| 8,081,988 B2 | 12/2011 | Manson et al. | |
| 8,081,989 B2 | 12/2011 | Manson et al. | |
| 8,085,196 B2 | 12/2011 | Whitehead | |
| 8,085,387 B2 | 12/2011 | Kludas et al. | |
| 8,095,149 B2 | 1/2012 | Manson et al. | |
| 8,134,497 B2 | 3/2012 | Janky et al. | |
| 8,136,545 B2 | 3/2012 | Jablonski | |
| 8,242,956 B2 | 8/2012 | Lamance et al. | |
| 8,339,311 B2 | 12/2012 | Walley et al. | |
| 8,368,875 B2 | 2/2013 | Kludas et al. | |
| 8,447,519 B2 | 5/2013 | Basnayake et al. | |
| 8,699,409 B2 | 4/2014 | Aryan et al. | |
| 8,719,188 B2 | 5/2014 | Kuhn et al. | |
| 8,860,610 B2 * | 10/2014 | Hang | G01S 19/425 342/357.73 |
| 9,037,527 B2 | 5/2015 | Kuhn et al. | |
| 9,279,886 B2 * | 3/2016 | Hadef | G01S 19/425 |
| 9,429,658 B2 * | 8/2016 | Leclercq | G01S 19/42 |
| 2001/0017599 A1 | 8/2001 | Yule et al. | |
| 2001/0028322 A1 | 10/2001 | Ueda et al. | |
| 2002/0072854 A1 | 6/2002 | Fuchs et al. | |
| 2002/0186180 A1 | 12/2002 | Duda | |
| 2003/0083804 A1 | 5/2003 | Pilley et al. | |
| 2003/0114984 A1 | 6/2003 | Scherzinger | |
| 2005/0064878 A1 | 3/2005 | O'Meagher et al. | |
| 2005/0104774 A1 | 5/2005 | Pande et al. | |
| 2006/0146136 A1 | 7/2006 | Cho et al. | |
| 2006/0223549 A1 | 10/2006 | Chang | |
| 2007/0139262 A1 | 6/2007 | Scherzinger | |
| 2008/0263097 A1 | 10/2008 | Manson et al. | |
| 2008/0319664 A1 | 12/2008 | Kremin et al. | |
| 2009/0024325 A1 | 1/2009 | Scherzinger | |
| 2009/0083430 A1 | 3/2009 | Edge et al. | |
| 2009/0093959 A1 | 4/2009 | Scherzinger et al. | |
| 2009/0189804 A1 | 7/2009 | Ashjaee et al. | |
| 2009/0262016 A1 | 10/2009 | Wirola et al. | |
| 2010/0057359 A1 | 3/2010 | Caballero et al. | |
| 2010/0063733 A1 | 3/2010 | Yunck | |
| 2010/0079333 A1 | 4/2010 | Janky et al. | |
| 2010/0141510 A1 | 6/2010 | Dai et al. | |
| 2010/0231443 A1 | 9/2010 | Whitehead | |
| 2010/0260150 A1 | 10/2010 | Aryan et al. | |
| 2011/0001668 A1 * | 1/2011 | Cobb | G01S 19/11 342/458 |
| 2011/0018761 A1 | 1/2011 | Walley et al. | |
| 2011/0064312 A1 | 3/2011 | Janky et al. | |
| 2011/0163914 A1 | 7/2011 | Seymour et al. | |
| 2011/0187590 A1 | 8/2011 | Leandro | |
| 2011/0195687 A1 | 8/2011 | Das et al. | |
| 2011/0267230 A1 | 11/2011 | Lamance et al. | |
| 2011/0285587 A1 | 11/2011 | Vollath et al. | |
| 2012/0116676 A1 | 5/2012 | Basnayake et al. | |
| 2012/0163656 A1 | 6/2012 | Wang et al. | |
| 2012/0166137 A1 | 6/2012 | Grässer et al. | |
| 2012/0330601 A1 | 12/2012 | Soubra et al. | |
| 2013/0027246 A1 | 1/2013 | Hadef et al. | |
| 2013/0243250 A1 | 9/2013 | France et al. | |
| 2014/0081571 A1 | 3/2014 | Briggs et al. | |
| 2014/0184442 A1 | 7/2014 | Large et al. | |
| 2014/0187193 A1 | 7/2014 | Rudow et al. | |
| 2014/0240170 A1 | 8/2014 | Rudow et al. | |
| 2014/0253375 A1 | 9/2014 | Rudow et al. | |
| 2014/0292569 A1 | 10/2014 | Wallace et al. | |
| 2014/0292570 A1 | 10/2014 | Wallace et al. | |
| 2014/0375493 A1 | 12/2014 | Weisenburger et al. | |
| 2014/0378170 A1 | 12/2014 | Rudow et al. | |
| 2014/0378171 A1 | 12/2014 | Rudow et al. | |
| 2015/0009067 A1 | 1/2015 | Rudow et al. | |
| 2015/0043012 A1 | 2/2015 | Rudow et al. | |
| 2015/0045058 A1 | 2/2015 | Rudow et al. | |
| 2015/0045059 A1 | 2/2015 | Rudow et al. | |
| 2015/0050907 A1 | 2/2015 | Rudow et al. | |
| 2015/0057028 A1 | 2/2015 | Rudow et al. | |
| 2015/0289097 A1 | 10/2015 | Rudow et al. | |

FOREIGN PATENT DOCUMENTS

| | | |
|---|---|---|
| EP | 2275778 A1 | 1/2011 |
| EP | 2722647 A1 | 4/2014 |
| KR | 20110085744 | 7/2011 |

(56) References Cited

FOREIGN PATENT DOCUMENTS

| WO | 2005/045458 | | 5/2005 |
|---|---|---|---|
| WO | 2008089792 | A1 | 7/2008 |
| WO | 2009074654 | A1 | 6/2009 |
| WO | 2011120141 | A1 | 10/2011 |

OTHER PUBLICATIONS

"Technical Tips from Inland GPS", Trimble TSC2—RTK over internet—establishing IP Connection, Jun. 14, 2011, 8 pages.
"Theodolite", Hunter Research & Technology, Mar. 24, 2014, 1 Page.
"Trimble S8 Total Station Datasheet", Trimble Navigation Limited, 2013, 4 Pages.
"Wireless RTK Bridge—Cellular User Guide", Revision 1.4, 2009, 47 pages.
Ike, "Spike: Laser Accurate Measurement & Modeling on Smartphones", https://www.kickstarter.com/projects/ikegps/spike-laser-accurate-measurement-and-modelling-on?ref=nav_search, Oct. 2, 2013, 14 Pages.
International Search Report of the International Searching Authority for PCT Application No. PCT/US2015/052370 dated Jan. 8, 2016, 6 pages.
International Written Opinion of the International Searching Authority for PCT Application No. PCT/US2015/052370 dated Jan. 8, 2016, 7 pages.
"Comparison of Photogrammetry Software", http://en.wikipedia.org/wiki/Comparison_of_photogrammetry_software, Jul. 8, 2015, 4 pages.
"Photogrammetry", http://en.wikipedia.org/wiki/Photogrammetry, Jun. 25, 2015, 5 pages.
"Pi Pelican Imaging: Life in 3D", http://www.pelicanimaging.com, 2015, 3 pages.
Church, "Close Range Photogrammetry vs. 3D Scanning of Archeological Documentation", http://ncptt.nps.gov/blog/close-range-photogrammetry-vs-3d-scanning-for-archaeological-documentation/, Nov. 6, 2012, 10 pages.
Grussenmeyer, et al., "A comparison of photogrammetry software packages for the documentation of buildings", http://halshs.archives-ouvertes.fr/docs/00/28/12/54/PDF/grussenmeyer_alkhalil_FIG2000.PDF, May 21, 2008, 9 pages.
Hatch, "The Synergism of GPS Code and Carrier Measurements", Proceedings of the Third International Geodetic Symposium on Satellite Doppler Positioning, 1982, 1213-1232.
Landau, et al., "Virtual Reference Stations Versus Broadcast Solutions in Network RTK", GNSS 2003, Graz, Austria, Apr. 2003, 15 pages.
Thipparthi, "Imporving Prositional Accuracy Using Carrier Smoothing Techniques in Inexpensive GPS Receivers", MSEE Thesis, New Menixo State University, Las Cruces, NM, Feb. 2004, 101 Pages.
"PCT/US2013/078125 International Search Report and Written Opinion", dated Apr. 23, 2014, 25 pages.
Afzal, "Design Methodology for Dual Frequency Configurable GPD Receiver", ION GNSS 2010, Session E5, Portland, OR, Sep. 21-24, 2010, 9 Pages.
Brown, "TIDGET Mayday System for Motorists", Presented at IEEE Position Location and Navigation Symposium (PLANS) '94 Las Vegas, NV, Apr. 1994, 7 pages.
Rho, "Dual-Frequency GPS Precise Point Positioning with WADGPS Corrections", Department of Geodesy and Geomatics Engineering, University of new Brunswick, Fredericton, N.B. Canada, Sep. 13-16, 2005, 1470-1482.
"DS00 Laser Range Finder—Product Maunal Revision 0", www.lightware.com, 2012, 45 Pages.
"Tilt Measurement Using a Low-G 3-Axis Accelerometer", AN3182 Application Note. DOC ID 17289 Rev 1, Apr. 2010, 18 Pages.
"PCT/US2015/035328 International Search Report", dated Oct. 15, 2015, pp. 1-13.
"PCT/US2015/035346 International Search Report", dated Oct. 13, 2015, pp. 1-12.
Afzal, "Design Methodology for a Dual Frequency Configurable GPS Receiver", Proceedings of the 23rd International Technical Meeting of the Satellite Division of the Institute of Navigation (ION GNSS 2010), Sep. 24, 2010, pp. 2892-2900.
Guixens, et al., "System Aspects and Practical Results for Precise Car Navigation with Modern Civil Signals Using a Software Receiver", Proceedings of the 21st International Technical Meeting of the Satellite Division of the Institute of Navigation (ION GNSS 2008), Sep. 19, 2008, pp. 2280-2292.
Haak, "A Multi-Purpose Software GNSS Receiver for Automotive Applications", Proceedings of the 23rd International Technical Meeting of the Satellite Division of the Institute of Navigation (ION GNSS 2010), Sep. 24, 2010, pp. 1869-1874.
Ruegamer, et al., "A Flexible and Portable Multiband GNSS Front-end System", Proceedings of the 25th International Technical Meeting of the Satellite Division of the Institute of Navigation (ION GNSS 2012), Sep. 21, 2012, pp. 2378-2389.
U.S. Appl. No. 14/755,918, Non-Final Office Action dated Apr. 18, 2017, 12 pages.
U.S. Appl. No. 14/755,918 Final Office Action dated Aug. 3, 2017, 11 pages.
U.S. Appl. No. 14/755,918 Notice of Allowance dated Oct. 16, 2017, 9 pages.

* cited by examiner

1800

```
ACCESSING A GLOBAL NAVIGATION SATELLITE SYSTEM (GNSS) CHIPSET
WHICH IS PHYSICALLY REMOTE FROM A CELLULAR DEVICE, WHEREIN THE
GNSS CHIPSET PROVIDES RAW GNSS OBSERVABLES INFORMATION BASED
UPON SIGNALS RECEIVED FROM A CIRCULARLY POLARIZED GNSS ANTENNA
1810
```

↓

```
WIRELESSLY TRANSMITTING THE RAW GNSS OBSERVABLES INFORMATION
FROM THE GNSS CHIPSET TO THE CELLULAR DEVICE
1820
```

↓

```
EXTRACTING THE RAW GNSS OBSERVABLES INFORMATION BY A PROCESSOR
OF THE CELLULAR DEVICE
1830
```

↓

```
USING BY THE PROCESSOR THE RAW GNSS OBSERVABLES INFORMATION, IN
ADDITION TO GNSS CORRECTIONS FROM AT LEAST ONE CORRECTION
SOURCE, TO DETERMINE A POSITION OF THE CIRCULARLY POLARIZED GNSS
ANTENNA
1840
```

RECEIVING, OVER THE AIR WITH A FIRST ANTENNA OF A RADIO FREQUENCY (RF) HARDWARE COMPONENT, A FIRST ANALOG GLOBAL NAVIGATION SATELLITE SYSTEM (GNSS) SIGNAL IN A FIRST FREQUENCY BAND
3010

RECEIVING, OVER THE AIR WITH A SECOND ANTENNA OF THE RF HARDWARE COMPONENT, AT LEAST A SECOND ANALOG GNSS SIGNAL IN A SECOND FREQUENCY BAND, WHEREIN THE FIRST FREQUENCY BAND AND THE SECOND FREQUENCY BAND ARE SEPARATE AND DISTINCT
3020

DIGITIZING THE FIRST ANALOG GNSS SIGNAL INTO A FIRST DIGITALIZED GNSS SIGNAL WITH A DIGITIZER OF THE RF HARDWARE COMPONENT
3030

DIGITIZING THE SECOND ANALOG GNSS SIGNAL INTO A SECOND DIGITIZED GNSS SIGNAL WITH THE DIGITIZER OF THE RF HARDWARE COMPONENT
3040

RECEIVING THE DIGITIZED GNSS SIGNALS AT A COMMUNICATION DEVICE LOCATED PROXIMATE TO THE RADIO FREQUENCY HARDWARE COMPONENT, THE COMMUNICATION DEVICE COMPRISING A GNSS RECEIVER CHIPSET
3050

USING A SOFTWARE DEFINED GNSS RECEIVER OPERATING ON A PROCESSOR OF THE COMMUNICATION DEVICE TO OBTAIN FIRST INFORMATION FROM THE FIRST DIGITIZED GNSS SIGNAL, OBTAIN SECOND INFORMATION FROM THE SECOND DIGITIZED GNSS SIGNAL, AND DETERMINE A POSITION USING AT LEAST BOTH OF THE FIRST INFORMATION AND THE SECOND INFORMATION, WHEREIN THE PROCESSOR IS LOCATED OUTSIDE OF THE GNSS RECEIVER CHIPSET
3060

RECEIVING, OVER THE AIR WITH A FIRST ANTENNA OF A RADIO FREQUENCY (RF) HARDWARE COMPONENT THAT IS COUPLED WITH A VEHICLE, A FIRST ANALOG GLOBAL NAVIGATION SATELLITE SYSTEM (GNSS) SIGNAL IN A FIRST FREQUENCY BAND
3110

RECEIVING, OVER THE AIR WITH A SECOND ANTENNA OF THE RF HARDWARE COMPONENT, AT LEAST A SECOND ANALOG GNSS SIGNAL IN A SECOND FREQUENCY BAND, WHEREIN THE FIRST FREQUENCY BAND AND THE SECOND FREQUENCY BAND ARE SEPARATE AND DISTINCT
3120

DIGITIZING THE FIRST ANALOG GNSS SIGNAL INTO A FIRST DIGITALIZED GNSS SIGNAL WITH A DIGITIZER OF THE RF HARDWARE COMPONENT
3130

DIGITIZING THE SECOND ANALOG GNSS SIGNAL INTO A SECOND DIGITIZED GNSS SIGNAL WITH THE DIGITIZER OF THE RF HARDWARE COMPONENT
3140

RECEIVING THE DIGITIZED GNSS SIGNALS AT A COMMUNICATION DEVICE OF THE VEHICLE
3150

USING A SOFTWARE DEFINED GNSS RECEIVER OPERATING ON A PROCESSOR OF THE COMMUNICATION DEVICE TO OBTAIN FIRST INFORMATION FROM THE FIRST DIGITIZED GNSS SIGNAL, OBTAIN SECOND INFORMATION FROM THE SECOND DIGITIZED GNSS SIGNAL, AND DETERMINE A POSITION USING AT LEAST BOTH OF THE FIRST INFORMATION AND THE SECOND INFORMATION
3160

FIG. 31

GLOBAL NAVIGATION SATELLITE SYSTEM RECEIVER SYSTEM WITH RADIO FREQUENCY HARDWARE COMPONENT

CROSS-REFERENCE TO RELATED APPLICATIONS (CONTINUATION-IN-PART)

This application claims priority and is a continuation-in-part application of U.S. patent application Ser. No. 14/134,437, filed on Dec. 19, 2013 entitled, "GNSS RECEIVER POSITIONING SYSTEM," by Rudow et al., and assigned to the assignee of the present application now U.S. Pat. No. 9,612,341.

Application Ser. No. 14/134,437, filed on Dec. 19, 2013, now U.S. Pat. No. 9,612,341, claims priority and is a continuation-in-part application of U.S. patent application Ser. No. 14/035,884, filed on Sep. 24, 2013, now U.S. Pat. No. 9,369,843, entitled, "EXTRACTING PSEUDORANGE INFORMATION USING A CELLULAR DEVICE" by Rudow et al., and assigned to the assignee of the present application and to the extent not repeated herein.

Application Ser. No. 14/134,437, filed on Dec. 19, 2013, now U.S. Pat. No. 9,612,341, also claims priority to and benefit of U.S. Provisional Patent Application No. 61/746,916, filed on Dec. 28, 2012 entitled, "IMPROVED GPS/GNSS ACCURACY FOR A CELL PHONE" by Rudow et al.

Application Ser. No. 14/035,884, filed on Sep. 24, 2013, now U.S. Pat. No. 9,369,843, claims priority to and is a continuation-in-part to patent application Ser. No. 13/842,447, filed on Mar. 15, 2013, now U.S. Pat. No. 9,429,640, entitled "OBTAINING PSEUDORANGE INFORMATION USING A CELLULAR DEVICE," by Richard Rudow et al., and assigned to the assignee of the present application.

CROSS-REFERENCE TO RELATED APPLICATIONS

This application is related to U.S. patent application Ser. No. 14/304,835, now U.S. Pat. No. 9,645,248, filed on Jun. 13, 2014, entitled "VEHICLE-BASED GLOBAL NAVIGATION SATELLITE SYSTEM RECEIVER SYSTEM WITH RADIO FREQUENCY HARDWARE COMPONENT," by Greg Wallace et al., and assigned to the assignee of the present application.

BACKGROUND

The Global Positioning System (GPS) and its extensions in the Global Navigation Satellite Systems (GNSS) have become thoroughly pervasive in all parts of human society, worldwide. GPS and GNSS receivers in the form of chipsets have become widely incorporated into cell phones and other types of cellular devices with cellular-based communications equipment.

Typically, many communication devices such as cellular devices, tablet computers, and two-way radios, include highly integrated GNSS chipsets. In some instances these integrated GNSS chipsets are designed to work with the E-911 service primarily. In most instances these integrated GNSS chipsets are not designed to provide anywhere near a full range of features and outputs that may be available in special purpose GNSS receiver. Furthermore, when communication devices implementing integrated GNSS capabilities are used, they can exhibit reduced performance in positioning accuracy for a variety of reasons.

BRIEF DESCRIPTION OF THE DRAWING

The accompanying drawings, which are incorporated in and form a part of this application, illustrate embodiments of the subject matter, and together with the description of embodiments, serve to explain the principles of the embodiments of the subject matter. Unless noted, the drawings referred to in this brief description of drawings should be understood as not being drawn to scale. Herein, like items are labeled with like item numbers.

FIG. 18 is a flowchart of a method of extracting pseudorange information using a cellular device in accordance with various embodiments.

FIG. 30 is a flowchart of a method of position determination, in accordance with various embodiments.

FIG. 31 is a flowchart of a method of position determination, in accordance with various embodiments.

DESCRIPTION OF EMBODIMENTS

Figure 1A:
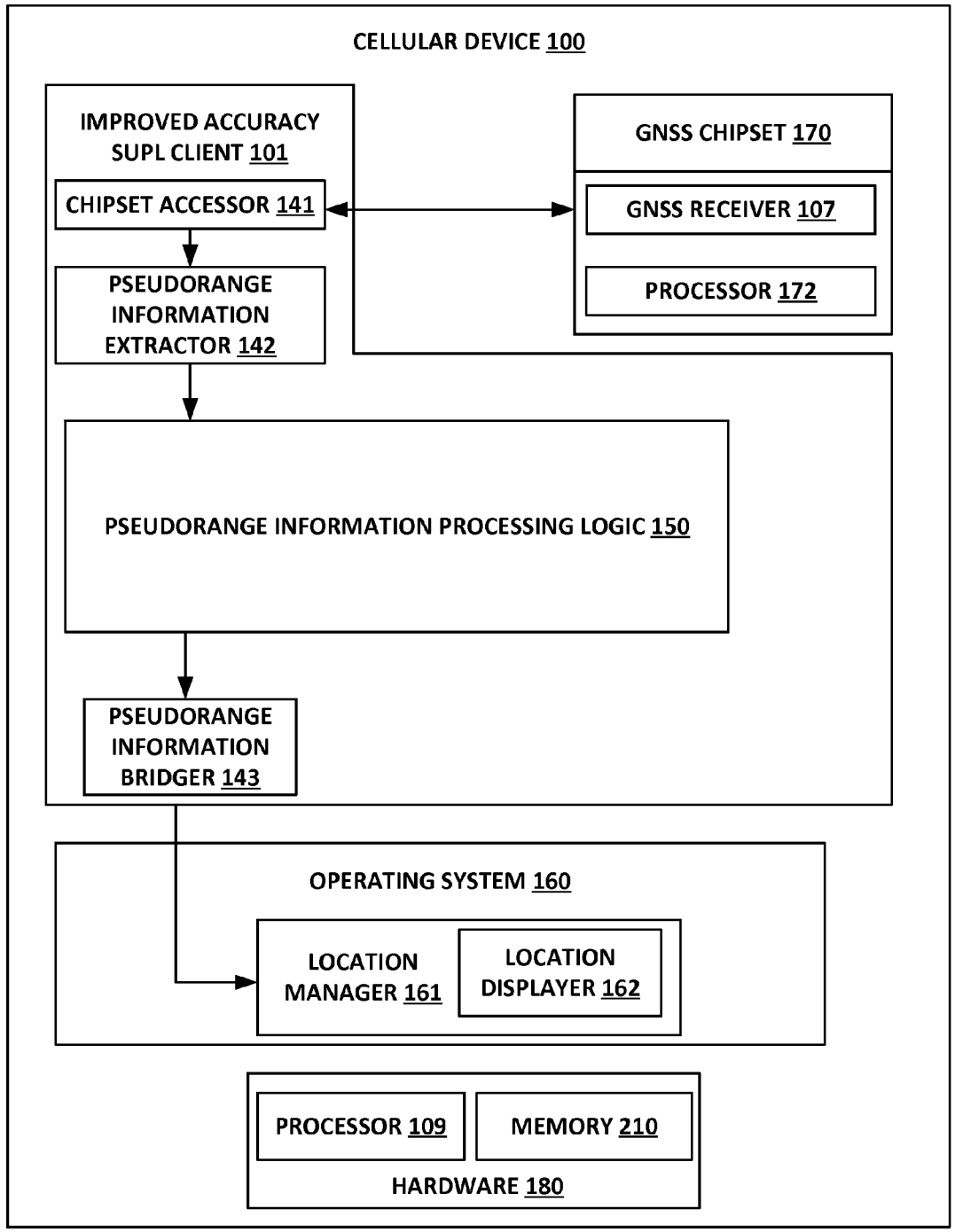
FIG. 1A depicts a block diagram of a cellular device for extracting pseudorange information, according to one embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "accessing," "transmitting," "extracting," "using," "smoothing," "correcting," "creating," "storing," "determining," "disposing," and "coupling" to transform the state of a computer system," "using a software defined GNSS receiver operating on a processor," "decoding," "performing carrier phase interferometry," or the like, refer to the actions and processes of a computer system, data storage system, storage system controller, microcontroller, hardware processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview

Communication devices include electronic devices such as cellular devices, tablet computers, and two-way radios. They may be vehicle based, hand-holdable by a human, or in some instances may be wearable, such as embedded all or partially in human headwear, clothing, or accessories (eyewear, rings, jewelry, or the like). Many of these communications devices have imbedded GNSS receivers, which have inherent limitations on their performance due to being very low-end receivers, being capable of receiving only a limited set of signals over-the-air, and/or being unable to process corrections to the signals that are received. Some of these communication devices do not have imbedded GNSS receivers. These communications devices have other processors such as central/host processors, microprocessors, digital signal processors and/or graphics processors for running other functions; and none of these are not involved in the internal operations of the GNSS chipset (if present). Herein, a radio frequency hardware component is described. In various embodiments, the radio frequency hardware component may be integrated with a communication device or may be a stand-alone radio frequency hardware component that can be removably communicatively coupled with communication device. For example, the coupling may be via a universal serial bus or other protocol suitable for coupling digitized information over an extremely short distance of that is less that approximately 7 meters and often less than three centimeters. The radio frequency hardware component includes a plurality of antennas that are used to receive at least an L1 and an L2 C GNSS signal and then transmit them to a communications device. The communication device is configured with a software defined GNSS receiver (Soft GNSS receiver) that runs as software on a processor which is not a part of a GNSS chipset. The Soft GNSS running on the processor decodes the GNSS signals and employs carrier phase interferometry to correct for ionospheric perturbations to the GNSS signals while determining a position fix associates with the GNSS antennas. A variety of techniques may be used by the Soft GNSS receiver to smooth or correct pseudoranges that are extracted from these GNSS signals. Many such techniques are described herein and may be employed.

Examples of Systems for Extracting Pseudorange Information

FIG. 1A depicts a block diagram of a cellular device 100 for extracting pseudorange information, according to one embodiment. Examples of a cellular device 100 include a cell phone, a non-voice enabled cellular device, and a mobile hand-held GNSS receiver. The cellular device may be mobile or stationary. The cellular device may be hand-holdable or incorporated as a portion of a system which is not hand-holdable. In some embodiments, a cellular device, such as cellular device 100, may be utilized as a portion of a navigation system, security system, safety system, telematics device/box, or the like. In some embodiments, cellular device 100 may be utilized as sub-system of the vehicle mounted portion of a vehicle safety system, security system, and/or navigation system. The vehicle mounted portion of the OnStar® vehicle safety, vehicle security, and vehicle navigation system that is utilized in many vehicles is one non-limiting example of a system which may include cellular device 100.

As depicted in FIG. 1A, the cellular device 100 includes a GNSS chipset 170, a GNSS receiver 107, a processor 172 that is part of the GNSS receiver 107, a chipset accessor logic 141, a pseudorange information extractor logic 142, an improved accuracy Secure User Platform Location (SUPL) client 101, a pseudorange information bridger logic 143, a pseudorange information processing logic 150, an operating system 160, a location manager logic 161, a location displayer logic 162, hardware 180 that is outside of the GNSS receiver 107. According to one embodiment, the chipset accessor logic 141, the pseudorange information extractor logic 142, the pseudorange information processing logic 150, and the pseudorange information bridger logic 143 are a part of the improved accuracy SUPL client 101.

According to one embodiment, the hardware 180 includes a hardware processor 109 and memory 210. An example of a hardware processor 109 is a central processing unit. An example of hardware memory 210 is computer readable storage, such as, but not limited to, a disk, a compact disk (CD), a digital versatile device (DVD), random access memory (RAM) or read only memory (ROM). The hardware memory 210 is physical and, therefore, tangible, according to one embodiment. The hardware memory 210, according to another embodiment, is non-transitory.

According to one embodiment, the processor 172 and the GNSS receiver 107 are a part of the GNSS chipset 170. According to one embodiment, the chipset accessor logic 141, pseudorange information extractor logic 142, the pseudorange information bridger logic 143, the improved accuracy SUPL client 101, the operating system 160, and the processor 109 are located in a portion of the cellular device 100 that is outside of the GNSS chipset 170. The location manager logic 161 can be a part of the operating system 160 and external to the GNSS chipset 170. According to one embodiment, the location displayer logic 162 is a part of the location manager logic 161. According to one embodiment, the chipset accessor logic 141, pseudorange information extractor logic 142, the pseudorange information processing logic 150, pseudorange information bridger logic 143, and improved accuracy SUPL client 101 are application programming interfaces (API) function applications that reside in memory of the cellular device 100 and are executed by a processor 109 of the cellular device 100.

According to one embodiment, the GNSS receiver 107 is capable of receiving signals from GPS satellites, GLONASS satellites, or from a combination of satellites from different constellations. The GNSS receiver 107 can perform GPS measurements to derive raw measurement data for a position of the cellular device 100. The raw measurement data can provide an instant location of the cellular device 100. According to one embodiment, the raw measurement data is the pseudorange information that is extracted (also referred to as "extracted pseudorange information"). Examples of the extracted pseudorange information are uncorrected pseudorange information, observed pseudorange information, or unsmoothed pseudorange information, or a combination thereof. Conventionally, the raw measurement data is only for use by the GNSS chipset 170 and the GNSS chipset 170 calculates pseudorange information that is only for use by the GNSS chipset 170. Examples of pseudorange information are uncorrected pseudorange information, smoothed pseudoranges, and corrected pseudoranges. Examples of corrections used to improve accuracy of a position fix include differential GNSS corrections (DGPS), high precision GNSS satellite orbital data, GNSS satellite broadcast ephemeris data, and ionospheric and tropospheric error corrections and error projections based on location.

The GNSS chipset 170 has a processor 172 and, therefore, is capable of processing information, such as pseudorange information, itself. However, according to various embodiments, information that the GNSS chipset 170 has can be extracted from the GNSS chipset 170 and processed outside of the GNSS chipset 170 instead of by the GNSS chipset 170 using its own processor 172, in order to provide an improved accuracy position fix.

The chipset accessor logic 141 is configured for accessing the GNSS chipset 170. The pseudorange information extractor logic 142 is configured for extracting the pseudorange information from the accessed GNSS chipset 170. The extracted pseudorange information can be received and stored continuously. The pseudorange information bridger logic 143 is configured for bridging the pseudorange information from the GNSS chipset 170 to the location manager logic 161 that resides in the operating system 160 of the cellular device 100.

According to one embodiment, the chipset accessor logic 141, the pseudorange information extractor logic 142, the pseudorange information processing logic 150 and pseudorange information bridger logic 143 are a part of an improved accuracy SUPL client 101. For example, The SUPL client 101 can interface between the GNSS chipset 170 and the location manager logic 161, which resides in the operating system 160.

The pseudorange information can be obtained from the processor 172 of the GNSS receiver 107. The GNSS chipset 170 may be designed, for example, by the manufacturer of the GNSS chipset 170, to provide requested information, such as pseudorange information, in response to receiving the command. The pseudorange information may be extracted from the GNSS chipset 170 using the command that the manufacturer has designed the GNSS chipset 170 with. For example, according to one embodiment, the GNSS chipset 170 is accessed using an operation that is a session started with a message that is an improved accuracy Secure User Platform Location (SUPL) start message or a high precision SUPL INIT message. According to one embodiment, the message is a custom command that is specific to the GNSS chipset 170 (also referred to as "a GNSS chipset custom command") and by which the improved accuracy SUPL client 101 can gain access to the raw measurements of the GNSS chipset 170. Access may be controlled by the chipset manufacturer and a suitable key made available for use in the SUPL for obtaining access to the pseudoranges. A suitable key is an example of a "custom command."

A worker thread associated with the SUPL client 101 can monitor the raw measurements delivered by the GNSS chipset 170 into the GNSS chipset 170's memory buffers, cache the raw measurements and use the raw measurements to determine a position fix. The pseudorange information extractor logic 142 and the pseudorange information processing logic 150 can be associated with the worker thread. For example, the pseudorange information extractor logic 142 can cache the raw measurements and the pseudorange information processing logic 150 can determine the location.

According to one embodiment, a worker thread is a light weight process that executes a specific sequence of tasks in the background. The tasks can be of long term and/or at times periodic in nature. The worker thread can assist in helping the main thread, which may also be referred to as the main program or main task, with specific functions. Worker threads can be started when these functions of the sequence of tasks are to be executed. A worker thread can remain in the active state as long as its respective functions are being executed. A worker thread may terminate itself, when it completes its functions or when it reaches a point where it can no longer continue to function, for example, due to an irrecoverable error. A worker thread can post its status to the main thread when it ends. Examples of posted status are completion or termination. A worker thread may also post to the main thread the level of progress of its functions periodically. At a given point in time, there may be many such worker threads in progress at the same time. Worker threads may maintain some sort of synchronization amongst themselves depending upon the tasks they are intended for. The main thread may terminate a worker thread, for example, when the functions of that worker thread are no longer needed or due to other execution changes in the system.

According to one embodiment, the cellular device 100 can improve the accuracy of the extracted pseudorange information. For example, the pseudorange information processing logic 150 can improve the accuracy of the extracted pseudorange information, as will become more evident.

The output of the pseudorange information processing logic 150 can be used for determining the location of the cellular device 100. For example, a latitude, longitude and altitude can be determined based on the output of the pseudorange information processing logic 150, which can be displayed by the location displayer logic 162.

According to one embodiment, the pseudorange information bridger logic 143 communicates the output from the pseudorange information processing logic 150 to the location manager logic 161 in the operating system 160. According to one embodiment, the output of the pseudorange information processing logic 150 is a location that is defined in terms of latitude, longitude, and altitude. The methods are well-known in the GPS arts. The pseudoranges are used to first determine a location the WGS-84 coordinate system of the Global Positioning System, and then converted into latitude, longitude, and elevation.

The location displayer logic 162 can display the location with respect to a digital representation of a map available, for example, from third parties via download to the cellular device.

Figure 1B:
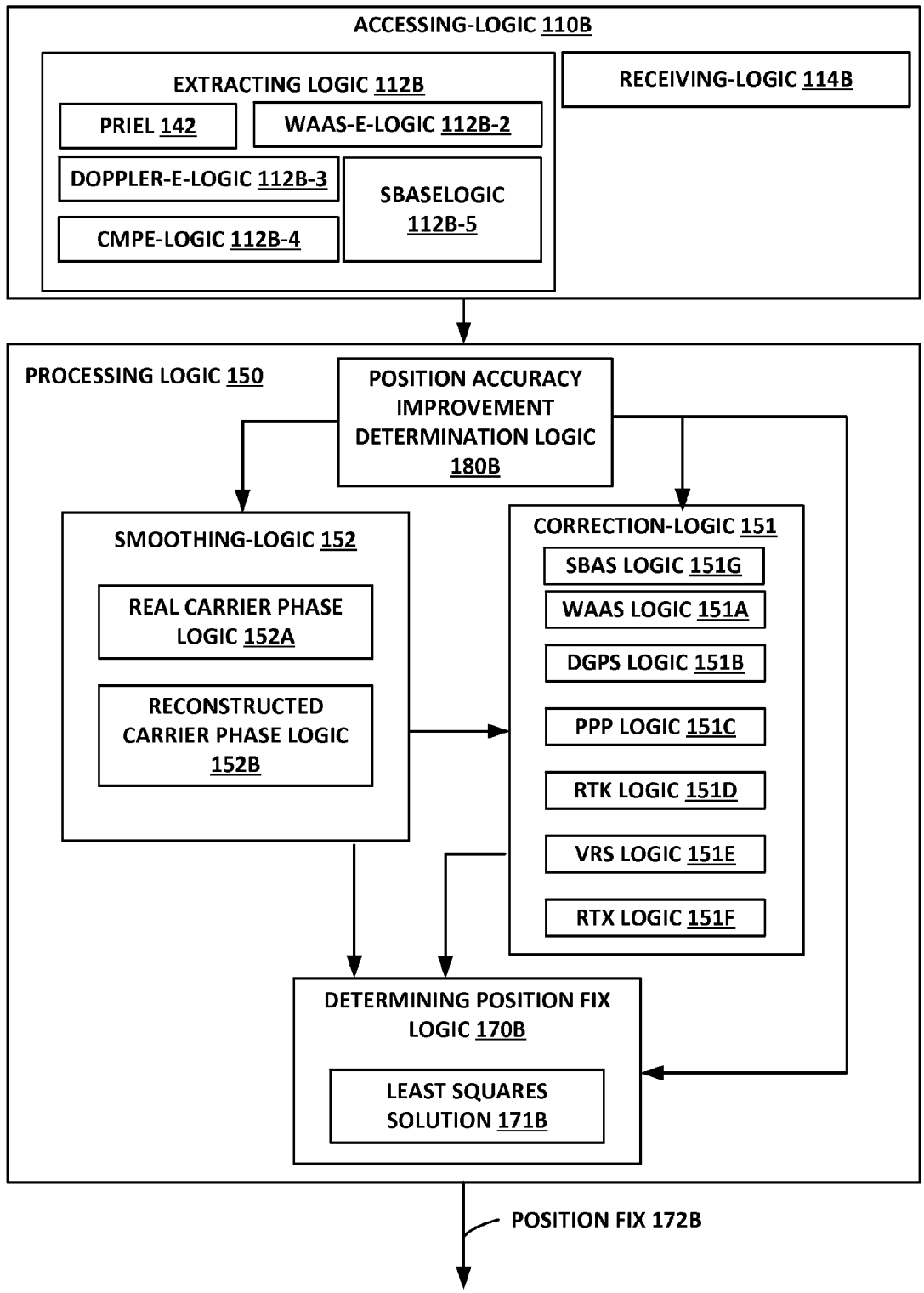
FIG. 1B depicts a block diagram of a cellular device for extracting and processing pseudorange information, according to one embodiment.

FIG. 1B depicts a block diagram of a portion of a cellular device 100, 100D for extracting pseudorange information, according to one embodiment. The cellular device 100, 100D includes accessing-logic 110B and processing logic 150. The accessing logic 110B includes extracting logic 112B and receiving logic 114B. The extracting logic 112B includes pseudorange information extracting logic 142, satellite-based augmentation system (SBAS), extracting logic 112B-5, WAAS extracting logic 112B-2, Doppler shift extracting logic 112B-3, and carrier phase measurement extracting logic 112B-4. According to one embodiment, WAAS is an example of SBAS. According to one embodiment, SBAS extracting logic 112B-5 includes WAAS extracting logic 112B-2.

Some non-limiting xamples of satellite-based augmentation system (SBAS) are Indian GPS aided Geo Augmented Navigation System (GAGAN), European Geostationary Navigation Overlay Service (EGNOS), Japanese Multi-functional Satellite Augmentation System (MSAS), John Deere's StarFire, WAAS, and Trimble's OmniSTAR and the like.

As depicted in FIG. 1B, the pseudorange information processing logic 150 includes pseudorange-correction-logic 151, pseudorange-carrier-phase-smoothing-logic 152, position accuracy improvement determination logic 180B and determining position fix logic 170B. Examples of "improving" are "smoothing" or "correcting," or a combination thereof. The pseudorange-correction-logic 151 includes WAAS logic 151A, DGPS logic 151B, Precise Point Positioning (PPP) logic 151C, RTK logic 151D, VRS (Virtual Reference Station) logic 151E, and RTX logic 151F. The pseudorange-carrier-phase-smoothing-logic 152 includes real carrier phase logic 152A and reconstructed carrier phase logic 152B. According to one embodiment, the accessing-logic 110B and the processing logic 150 reside in the improved accuracy SUPL client 101.

Examples of pseudorange information are extracted pseudoranges, corrected pseudoranges, smoothed pseudoranges, or a combination thereof, among other things. Examples of pseudorange corrections include Wide Area Augmentation System (WAAS) corrections, Differential Global Positioning System (DGPS) corrections, Precise Point Positioning (PPP) corrections, Real Time Kinematic (RTK) corrections, and Virtual Reference Station (VRS) corrections. Examples of carrier phase information include real carrier phase and reconstructed carrier phase information.

The extracting logic 112B can extract various types of information from the GNSS chipset 170, as discussed herein. For example, the extracting logic 112B includes pseudorange information extracting logic 142, WAAS extracting logic 112B-2, Doppler extracting logic 112B-3, and carrier phase measurement extracting logic 112B-4. According to one embodiment, the extracting logic 112B can be used to extract these various types of information from the GNSS chipset 170 in a similar manner that the pseudorange information extractor logic 142 extracts pseudorange information from the GNSS chipset 170, for example, using an SUPL Client 101 that employs a command designed or provided by the manufacturer of the GNSS chipset 170, as described herein. More specifically, the WAAS extracting logic 112B-2, the Doppler extracting logic 112B-3, and carrier phase measurement extracting logic 112B-4 can employ commands designed or provided by the manufacturer of the GNSS chipset 170 to extract respectively WAAS, Doppler information, and carrier phase measurements for real carrier phase information.

The receiving logic 114B receives other types of information that are not extracted from the GNSS chipset 170. The receiving logic 114B can receive the information in response to a request (also commonly known as "pulling") or receive the information without the information being requested (also commonly known as "pushing"). "Obtaining" and "accessing" can be used interchangeably, according to various embodiments.

Table 1 depicts the types of information that are extracted from the GNSS chipset or received without extraction, as discussed herein, according to various embodiments.

TABLE 1

Types of Information that are Extracted from the GNSS Chipset or Received without Extraction

| Extracted | Received |
|---|---|
| Pseudorange Information | WAAS/SBAS |
| Doppler Shift Information | DGPS |
| Carrier Phase Measurements for real carrier phase information | RTK |
| WAAS/SBAS | Not Applicable |

The information depicted in the extracted column can be extracted from the GNSS chipset 170 using the SUPL client 101 in a manner similar to extracting pseudorange information, as discussed herein. WAAS may be extracted or received, for example, over the Internet. When this Doppler shift information is available but real carrier phase information is not, the extracted Doppler shift information can be integrated by processor 109, for example, to reconstruct carrier phase information. Techniques for reconstructing carrier phase information from Doppler shift information are well known in the art. Any one or more of the information depicted in Table 1 can be processed by the cellular device 100, for example, using the processor 109 that is outside of the GNSS chipset 170.

The pseudorange-carrier-phase-smoothing-logic 152 can smooth pseudorange information by applying carrier phase information to the pseudorange information.

The pseudorange-carrier-phase-smoothing-logic 152 receives raw pseudorange information from the accessing logic 110B. The carrier phase information may be reconstructed carrier phase information or real carrier phase information.

The pseudorange-correction-logic 151 can correct pseudorange information. For example, the pseudorange-correction-logic 151 can receive pseudorange information and apply pseudorange corrections to the pseudorange information. Examples of the pseudorange information received by the pseudorange-correction-logic 151 include extracted pseudorange information, DGPS corrected pseudoranges, and smoothed pseudoranges that were smoothed, for example, using either real carrier phase information or reconstructed carrier phase information. Examples of pseudorange corrections that can be applied to the received pseudorange information are WAAS corrections, DGPS corrections, PPP corrections, RTK corrections and VRS corrections. The PPP logic 151C performs Precise Point Positioning (PPP) processing on pseudorange information. According to one embodiment, RTX™ is proprietary form of PPP developed by Trimble Navigation Limited. It should be appreciated that there are other forms of Precise Point Positioning which may operate using similar principles.

The pseudorange information processing logic 150 may also include a determining position fix logic 170B that performs, for example, a least squares solution 171B can be performed after the extracted pseudorange information is improved by the pseudorange-correction-logic 151 or the pseudorange-carrier-phase-smoothing-logic 152, or a combination thereof and prior to transmitting the output to the pseudorange information bridger logic 143. According to one embodiment, the determining position fix logic 170B resides in the processing logic 150. Least-squares solution methods are well-known in the position determination arts.

According to one embodiment, extracted pseudorange information is passed from the pseudorange information extractor logic 142 to the smoothing logic 152 where it is smoothed at either real carrier phase logic 152A or reconstructed carrier phase logic 152B. According to one embodiment, the smoothed pseudorange information is communicated from the smoothing logic 152 to the correcting logic 151 for further correction, where one or more corrections may be performed. If a plurality of corrections is performed, they can be performed in various combinations. If carrier phase smoothing is not possible, the extracted pseudorange information can be communicated from pseudorange information extractor logic 142 to correction logic 151. One or more of the logics 152A, 152B, 151A, 151E, 151F in the processing logic 150 can communicate with any one or more of the logics 152A, 152B, 151A, 151E 151F in various orders and combinations. Various embodiments are not limited to just the combinations and orders that are described herein. According to one embodiment, extracted pseudorange information may not be smoothed or corrected. In this case, unsmoothed uncorrected pseudorange information can be communicated from logic 142 to logic 170B.

The cellular device 100 may also include a position-accuracy-improvement-determination-logic 180B for determining whether to apply any improvements and if so, the one or more position accuracy improvements to apply to the extracted pseudorange information. For example, the cellular device 100 may be preconfigured based on the signals that are available to the cellular device 100 or a user of the cellular device 100 may manually configure the cellular device 100. For example, the cellular device 100 can display the signals that are available to the user and the user can select which signals they desire from the displayed list of signals. The configuration information, whether preconfigured or manually configured by the user, can be stored for example, in a look up table in the cellular device 100. Examples of position improvements that can be determined by the position accuracy improvement determination logic 180B are real carrier phase information, reconstructed carrier phase information, WAAS, DGPS, PPP, RTX™, RTK and VRS. The position accuracy improvement determination logic 180B can be used to determine to reconstruct carrier phase information based on Doppler shift if real carrier phase information is not available, for example. The position-accuracy-improvement-determination-logic 180B, according to one embodiment, is a part of the SUPL client 101.

Extracted pseudorange information without any additional improvements provides 4-5 meters of accuracy. Various combinations of position accuracy improvements can be applied to extracted pseudorange information (EPI) according to various embodiments, where examples of position accuracy improvements include, but are not limited to, Wide Area Augmentation System (WAAS) pseudorange corrections, Differential GPS (DGPS) pseudorange corrections, Precise Point Positioning (PPP) processing, RTX™, Real Time Kinematic (RTK), Virtual Reference Station (VRS)

corrections, real carrier phase information (real CPI) smoothing, and reconstructed carrier phase information (reconstructed CPI) smoothing.

One or more of the logics 110B, 112B, 114B, 142, 112B-2, 112B-3, 180B, 152, 152A, 152B, 151, 151Aj-151F, 170B, 171B can be executed, for example, by the processor 109 of the cellular device 100 that is located outside of the GNSS chipset 170.

Table 2 depicts combinations of information that result in a position fix 172B, according to various embodiments. However, various embodiments are not limited to the combinations depicted in Table 2.

TABLE 2

Combinations of Information that Result in a Position Fix

| Combination Identifier | Combinations of Information that Result in a Position Fix |
|---|---|
| 1 | Extracted pseudorange information (EPI) |
| 2 | EPI + Real or Reconstructed Carrier Phase Information (CPI) |
| 3 | EPI + CPI + WAAS |
| 4 | EPI + CPI + WAAS + DGPS |
| 5 | EPI + CPI + DGPS |
| 6 | EPI + CPI + DGPS + PPP |
| 7 | EPI + DGPS |
| 8 | EPI + DGPS + WAAS |
| 9 | EPI + DGPS + PPP |
| 10 | EPI + RTK |
| 11 | EPI + VRS |

Figure 1C:
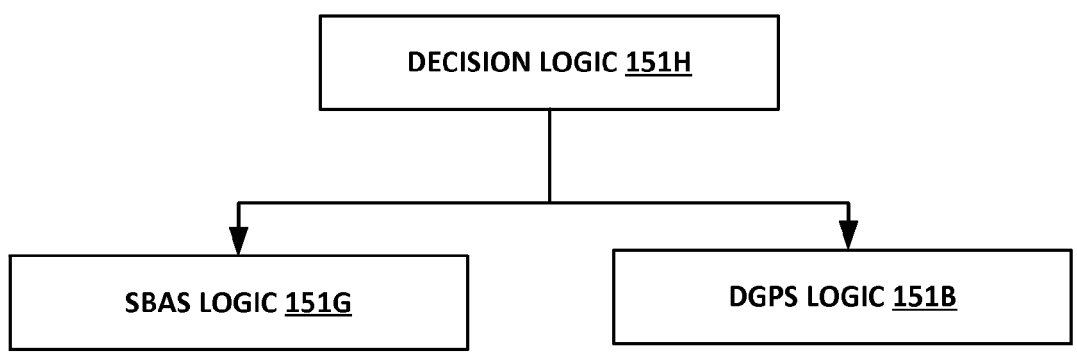
FIG. 1C depicts decision logic for determining whether to apply WAAS (Wide Area Augmentation System) corrections or DGPS (Differential Global Positioning System) corrections, according to one embodiment.

FIG. 1C depicts decision logic 151H for determining whether to apply SBAS corrections 151G, WAAS corrections 151A, PPP corrections 151C, RTX™ corrections 151F or DGPS corrections 151B, according to one embodiment. According to one embodiment, the SBAS corrections that are applied are WAAS corrections. According to one embodiment, the decision logic 151H is located in the position accuracy improvement determination logic 180B or the correction logic 151.

According to one embodiment, a first position is determined by an available means. For example, the first position may be based on uncorrected unsmoothed extracted pseudorange information, cellular tower triangulation, Wi-Fi (Wireless-Fidelity) triangulation or other means. A level of precision may be selected, for example, by a user or pre-configured into the cellular device, where DGPS or one or more of SBAS, WAAS, RTX™, PPP would be used to achieve that level of precision. The decision logic 151H can access the level of precision and receive two or more reference station locations by sending a message to a database enquiring about nearby reference stations for DGPS. The decision logic 151H can determine the distance between the cellular device 100 and the nearest reference station. If the distance is greater than some selected distance threshold, the decision logic 151H can use PPP, RTX™, SBAS or WAAS, instead of DGPS. If the distance is less than the selected distance threshold, the decision logic 151H can use DGPS instead of PPP, RTX™, SBAS or WAAS. According to one embodiment, a range for a distance threshold is approximately 20 to 60 miles. According to one embodiment, the distance threshold is approximately 60 miles.

If the decision logic 151H determines to apply DGPS corrections at DGPS logic 151B resulting in DGPS corrected smoothed pseudoranges, further corrections can be made using the orbit-clock information contained in the PPP corrections. For example, a position fix can be determined based on the DGPS corrected smoothed pseudoranges and the PPP corrections. The position fix can be determined external to the GNSS chipset, for example, at the processing logic 150.

The cellular device 100 may be configured with the distance threshold, for example, by the manufacturer of the cellular device 100 or by a user of the cellular device 100. The cellular device 100 may be configured with the distance threshold through service that is remote with respect to the cellular device 100 or may be configured locally. The distance threshold can be selected based on a degree of position accuracy that is desired.

Figure 1D:
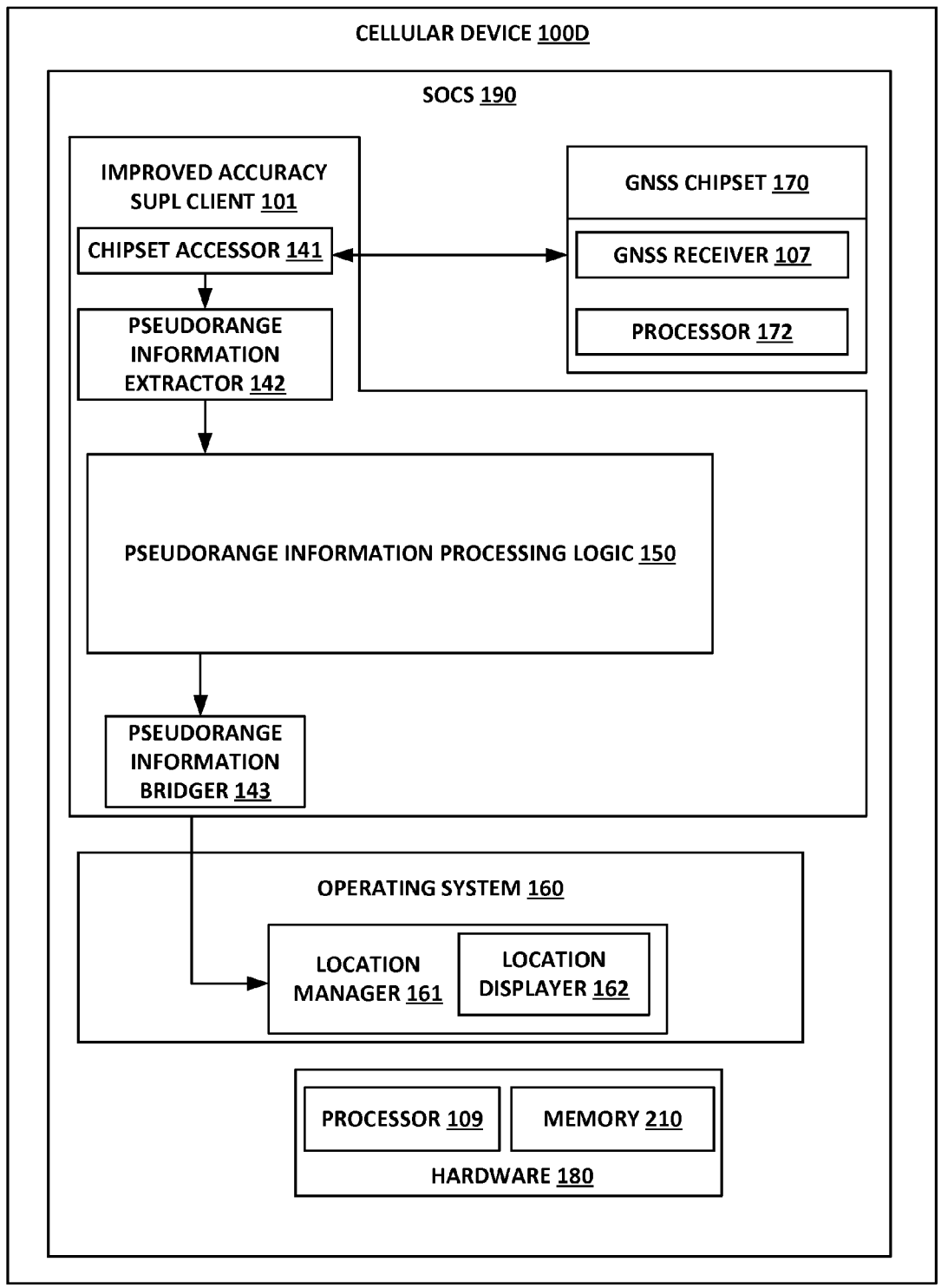
FIG. 1D depicts a block diagram of a cellular device for extracting pseudorange information, according to one embodiment.

FIG. 1D depicts a block diagram of a cellular device 100D for extracting pseudorange information, according to one embodiment.

As depicted in FIG. 1D, the GNSS chipset 170 is located on a system on a chip (SOC) substrate (SOCS) 190.

As described herein, various information can be extracted from the GNSS receiver 1130, such as pseudorange information, Doppler Shift Information, Real Carrier Phase Measurement, WAAS and SBAS. Other types of processing information output by the GNSS receiver 1130 can be ignored.

A Cell device 100D's hardware architecture includes discreet physical layout and interconnection of multiple chipsets for processing and for special purposes such as a GNSS chipset 170. In addition, newer architectures involve further integration of chipsets in the "system on a chip" (SoC) configuration. In this configuration, the GNSS chipset 170 can still be a complete element capable of delivering a PVT (position velocity and time) solution. However in an embodiment, the pseudorange information, carrier phase, and/or Doppler measurements, along with WAAS corrections if available, are extracted prior to further signal processing in the GNSS chipset 170 and are processed using different algorithms and corrections data for developing an improved accuracy PVT solution. In so doing the deleterious effects of multipath and other error sources may be minimized. Further the GNSS chipset 170 outputs are ignored and not displayed when the external processing is employed and the higher-accuracy PVT data is available.

Figure 2:
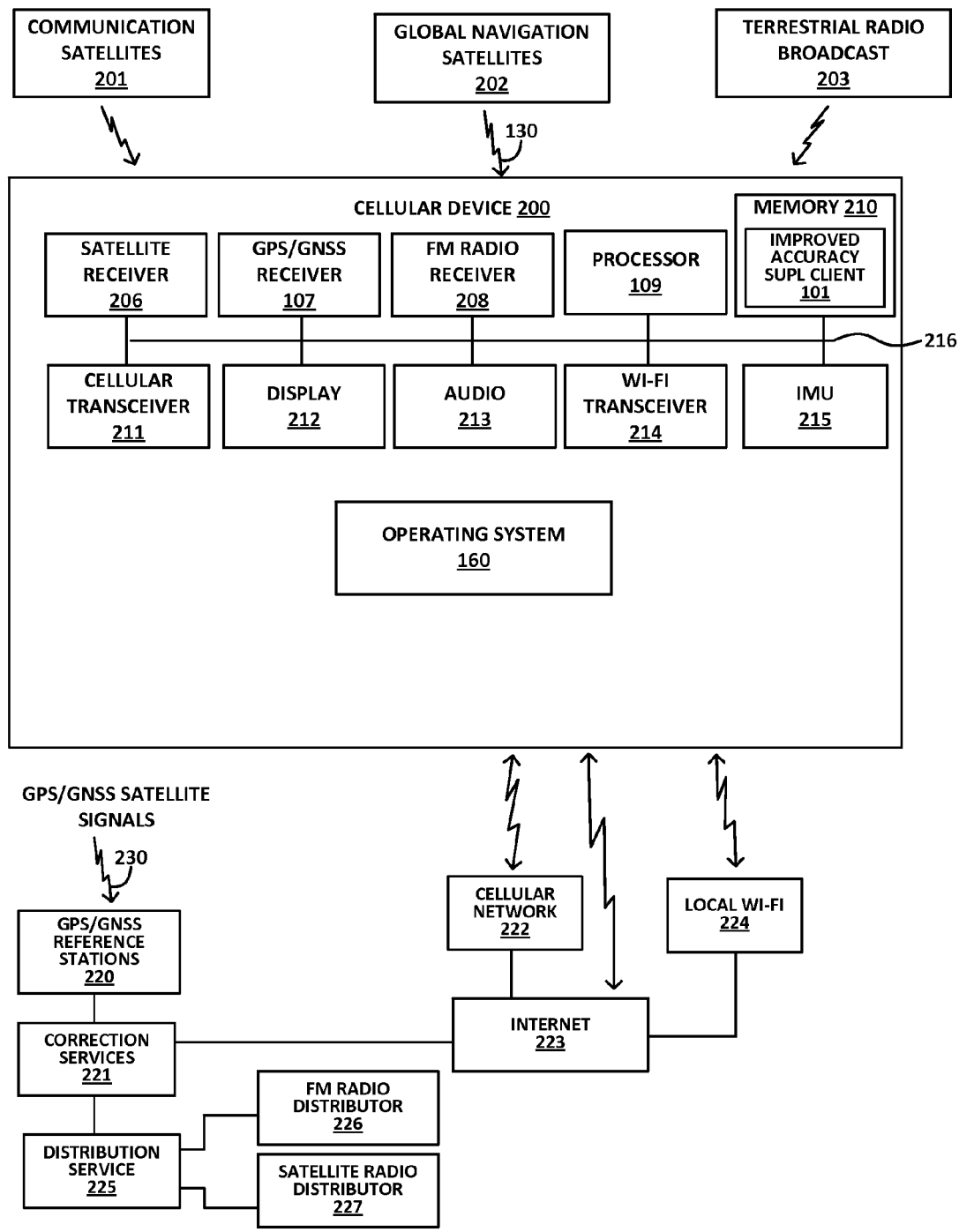
FIG. 2 depicts a block diagram of multiple sources for providing positioning correction information to a cellular device for processing pseudorange information, according to one embodiment.

FIG. 2 depicts a block diagram of a set of correction delivery options for providing positioning information to a cellular device for extracting pseudorange information, according to one embodiment. Examples of a cellular device 200 include a cell phone, a non-voice enabled cellular device, and a mobile hand-held GNSS receiver. The cellular device may be mobile or stationary.

The cellular device 200 includes a bus 216, a satellite receiver 206, a GNSS receiver 107, an FM radio receiver 208, a processor 109, memory 210, a cellular transceiver 211, a display 212, audio 213, Wi-Fi transceiver 214, IMU 215, image capturing device 240, and operating system 160. Components 206, 107, 208, 109, 210, 211, 212, 213, 214, 215, and 240 are all connected with the buss 216.

In FIG. 2, a plurality of broadcast sources is used to convey data and media to a cellular device 200. As an example, cellular device 200 can receive broadcast signals from communication satellites 201 (e.g., two-way radio, satellite-based cellular such as the Inmarsat or Iridium communication networks, etc.), global navigation satellites 202 which provide radio navigation signals (e.g., the GPS, GNSS, GLONASS, GALILEO, BeiDou/Compass, etc.), and terrestrial radio broadcast (e.g., FM radio, AM radio, short-wave radio, etc.).

A cellular device 200 can be configured with a satellite radio receiver 206 coupled with a communication bus 216 for receiving signals from communication satellites 201, a GNSS receiver 107 coupled with bus 216 for receiving radio navigation signals from global navigation satellites 202 and for deriving a position of cellular device 200 based thereon. Cellular device 200 further comprises an FM radio receiver 208 coupled with bus 216 for receiving broadcast signals from terrestrial radio broadcast 203. Other components of cellular device 200 comprise a processor 109 coupled with bus 216 for processing information and instructions, a memory 210 coupled with bus 216 for storing information and instructions for processor 109. It is noted that memory 210 can comprise volatile memory and non-volatile memory, as well as removable data storage media in accordance with various embodiments. Cellular device 200 further comprises a cellular transceiver 211 coupled with bus 216 for communicating via cellular network 222. Examples of cellular networks used by cellular device 200 include, but are not limited to GSM: cellular networks, GPRS cellular networks, GDMA cellular networks, and EDGE cellular networks. Cellular device 200 further comprises a display 212 coupled with bus 216. Examples of devices which can be used as display 212 include, but are not limited to, liquid crystal displays, LED-based displays, and the like. It is noted that display 212 can be configured as a touch screen device (e.g., a capacitive touch screen display) for receiving inputs from a user as well as displaying data. Cellular device 200 further comprises an audio output 213 coupled with bus 216 for conveying audio information to a user. Cellular device 200 further comprises a Wi-Fi transceiver 214 and an inertial measurement unit (IMU) 215 coupled with bus 216. Wi-Fi transceiver 114 may be configured to operate on/in compliance with any suitable wireless communication protocol including, but not limited to: Wi-Fi, WiMAX, implementations of the IEEE 802.11 specification, implementations of the IEEE 802.15.4 specification for personal area networks, and a short range wireless connection operating in the Instrument Scientific and Medical (ISM) band of the radio frequency spectrum in the 2400-2484 MHz range (e.g., implementations of the Bluetooth® standard).

Improvements in GNSS/GPS positioning may be obtained by using reference stations with a fixed receiver system to calculate corrections to the measured pseudoranges in a given geographical region. Since the reference station is located in a fixed environment and its location can be determined very precisely via ordinary survey methods, a processor associated with the Reference Station GNSS/GPS receivers can determine more precisely what the true pseudoranges should be to each satellite in view, based on geometrical considerations. Knowing the orbital positions via the GPS almanac as a function of time enables this process, first proposed in 1983, and widely adopted ever since. The difference between the observed pseudorange and the calculated pseudorange for a given Reference station is called the pseudorange correction. A set of corrections for all the global navigation satellites 202 in view is created second by second, and stored, and made available as a service, utilizing GPS/GNSS reference stations 220 and correction services 221. The pseudoranges at both the cellular device 200 GPS receiver 107 and those at the reference stations 220 are time-tagged, so the corrections for each and every pseudorange measurement can be matched to the local cell phone pseudoranges. The overall service is often referred to as Differential GPS, or DGPS. Without any corrections, GNSS/GPS receivers produce position fixes with absolute errors in position on the order of 4.5 to 5.5 m per the GPS SPS Performance Standard, $4^{th}$ Ed. 2008. In FIG. 2, one or more correction services 221 convey these corrections via a cellular network 222, or the Internet 223. Internet 223 is in turn coupled with a local Wi-Fi network 224 which can convey the corrections to cellular device 200 via Wi-Fi transceiver 214. Alternatively, cellular network 222 can convey the corrections to cellular device 200 via cellular transceiver 211. In some embodiments, correction services 221 are also coupled with a distribution service 225 which conveys the corrections to an FM radio distributor 226. FM radio distributor 226 can broadcast corrections as a terrestrial radio broadcast 103. It should be appreciated that an FM signal is being described as a subset of possible terrestrial radio broadcasts which may be in a variety of bands and modulated in a variety of manners. In some embodiments, cellular device 200 includes one or more integral terrestrial radio antennas associated with integrated terrestrial receivers; FM radio receiver 208 is one example of such a terrestrial receiver which would employ an integrated antenna designed to operate in the correct frequency band for receiving a terrestrial radio broadcast 103. In this manner, in some embodiments, cellular device 200 can receive the corrections via FM radio receiver 208 (or other applicable type of integrated terrestrial radio receiver). In some embodiments, correction services 221 are also coupled with a distribution service 225 which conveys the corrections to a satellite radio distributor 227. Satellite radio distributor 227 can broadcast corrections as a broadcast from one or more communications satellites 201. In some embodiments, cellular device 200 includes one or more integral satellite radio antennas associated with integrated satellite radio receivers 206. Satellite radio receiver 206 is one example of such a satellite receiver which would employ an integrated antenna designed to operate in the correct frequency band for receiving a corrections or other information broadcast from communication satellites 201. In this manner, in some embodiments, cellular device 200 can receive the corrections via satellite radio receiver 206.

Examples of a correction source that provides pseudorange corrections are at least correction service 221, FM radio distribution 226, or satellite radio distributor 227, or a combination thereof. According to one embodiment, a correction source is located outside of the cellular device 200.

Examples of image capturing device 240 are a camera, a video camera, a digital camera, a digital video camera, a digital camcorder, a stereo digital camera, a stereo video camera, a motion picture camera, and a television camera. The image capturing device 240 may use a lens or be a pinhole type device.

The blocks that represent features in FIGS. 1A-2 can be arranged differently than as illustrated, and can implement additional or fewer features than what are described herein. Further, the features represented by the blocks in FIGS. 1A-2 can be combined in various ways. A cellular device 100, 200 (FIGS. 1A-3) can be implemented using software, hardware, hardware and software, hardware and firmware, or a combination thereof. Further, unless specified otherwise, various embodiments that are described as being a part of the cellular device 100, 200, whether depicted as a part of the cellular device 100, 200 or not, can be implemented using software, hardware, hardware and software, hardware and firmware, software and firmware, or a combination thereof. Various blocks in FIGS. 1A-2 refer to features that are logic, such as but not limited to, 150, 180B, 152, 152A, 152B, 151, 151A-151G, 170B, which can be implemented using software, hardware, hardware and software, hardware and firmware, software and firmware, or a combination thereof.

The cellular device 100, 200, according to one embodiment, includes hardware, such as the processor 109, memory 210, and the GNSS chipset 170. An example of hardware memory 210 is a physically tangible computer readable storage medium, such as, but not limited to a disk, a compact disk (CD), a digital versatile device (DVD), random access memory (RAM) or read only memory (ROM) for storing instructions. An example of a hardware processor 109 for executing instructions is a central processing unit. Examples of instructions are computer readable instructions for implementing at least the SUPL Client 101 that can be stored on a hardware memory 210 and that can be executed, for example, by the hardware processor 109. The SUPL client 101 may be implemented as computer readable instructions, firmware or hardware, such as circuitry, or a combination thereof.

Pseudorange Information

A GNSS receiver 107 (also referred to as a "receiver"), according to various embodiments, makes a basic measurement that is the apparent transit time of the signal from a satellite to the receiver, which can be defined as the difference between signal reception time, as determined by the receiver's clock, and the transmission time at the satellite, as marked in the signal. This basic measurement can be measured as the amount of time shift required to align the C/A-code replica generated at the receiver with the signal received from the satellite. This measurement may be biased due to a lack of synchronization between the satellite and receiver clock because each keeps time independently. Each satellite generates a respective signal in accordance using a clock on board. The receiver generates a replica of each signal using its own clock. The corresponding biased range, also known as a pseudorange, can be defined as the transit time so measured multiplied by the speed of light in a vacuum.

There are three time scales, according to one embodiment. Two of the time scales are the times kept by the satellite and receiver clocks. A third time scale is a common time reference, GPS Time (GPST), also known as a composite time scale that can be derived from the times kept by clocks at GPS monitor stations and aboard the satellites.

Let $\tau$ be the transit time associated with a specific code transition of the signal from a satellite received at time t per GPST. The measured apparent range r, called pseudorange, can be determined from the apparent transmit time using equation 1 as follows:

measured pseudorange at $(t)=c$[arrival time at $(t)-$ emission time at $(t-\tau)$]. Eq. 1

Both t and $\tau$ are unknown, and can be estimated. In this discussion of pseudoranges, measurements from a GPS satellite are dealt with in a generic way to make the notation simple, making no reference to the satellite ID or carrier frequency (L1 or L2).

Figure 3:
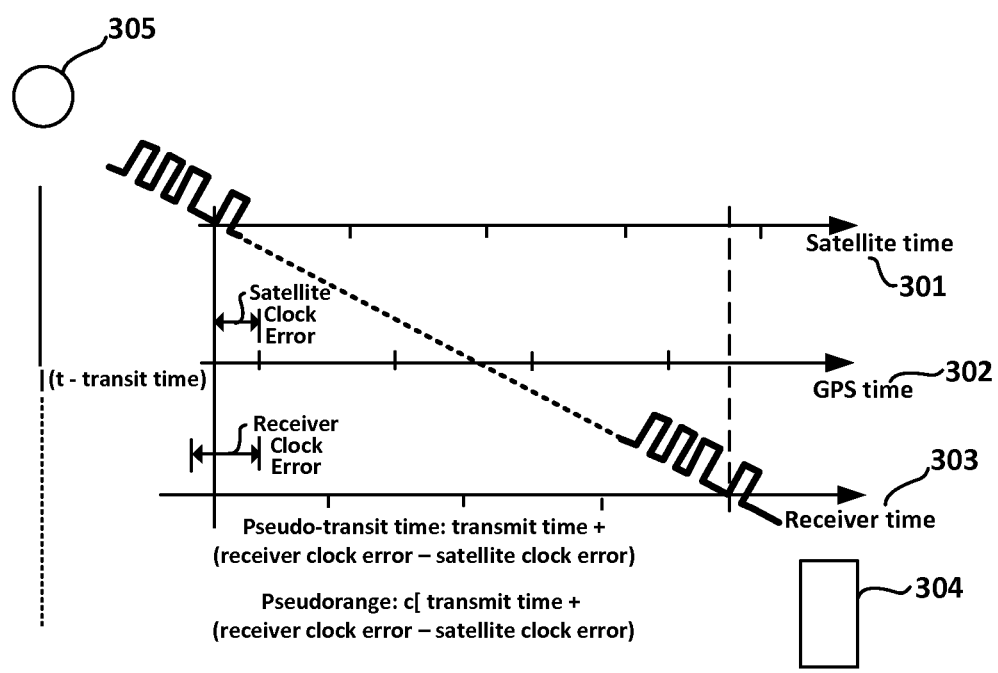
FIG. 3 depicts a conceptual view of pseudorange measurements, according to various embodiments.

Equations 2 and 3 depict how to relate the time scales of the receiver and the satellite clocks with GPST:

arrival time at $(t)=t+$receiver clock at $(t)$ eq. 2 arrival time at $(t-\tau)=(t-\tau)+$satellite clock error at $(t-\tau)$ eq. 3 where receiver clock error represents the receiver 304's clock bias 303 and satellite clock error represents the bias 301 in the satellite 305's clock, and both the receiver clock and the satellite clock are measured relative to GPST 302, as shown in FIG. 3. Receiver clock error and satellite clock error represent the amounts by which the satellite 305 and receiver 304 clocks are advanced in relation to GPST. The satellite clock error 301 is estimated by the Control Segment and specified in terms of the coefficients of a quadratic polynomial in time. The values of these coefficients can be broadcast in the navigation message.

Accounting for the clock biases, the measured pseudorange (eq. 1) can be written as indicated in equation 4:

$PR(t)=c[t+$receiver clock error at $(t)-(t-\tau+$satellite clock error at $(t-\tau))]+$miscellaneous errors at $(t)=c\tau+c[$receiver clock errors at $(t)-$satellite clock error at $(t-\tau)]+$miscellaneous errors at $(t)$  eq. 4 where miscellaneous errors represent unmodeled effects, modeling error, and measurement error. The transmit time multiplied by the speed of light in a vacuum can be modeled as satellite position at $(t-\tau)$. Ionosphere error and troposphere error reflect the delays associated with the transmission of the signal respectively through the ionosphere and the troposphere. Both ionosphere error and troposphere error are positive.

For simplicity, explicitly reference to the measurement epoch t has been dropped, and the model has been rewritten for the measured pseudorange as indicated in equation 5.

$PR=r+$[receiver clock error−satellite clock error]+ ionosphere error+troposphere error+miscellaneous errors  eq. 5 where PR is the measured pseudorange, r is the true range from the receiver to the satellite, receiver clock error is the difference between the receiver clock and the GPSTIME, satellite clock error is the difference between the satellite clock and GPSTIME, GPSTIME is ultimately determined at the receiver as part of the least squared solution determined by the least squares solution 171B so that all clock errors can be resolved to some level of accuracy as part of the position determination process, and miscellaneous errors include receiver noise, multipath and the like.

At least one source of error is associated with satellite positions in space. The navigation message in the GPS signal contains Keplerian parameters which define orbital mechanics mathematics and, thus, the positions of the satellites as a function of time. One component of WAAS and RTX™ contains adjustments to these parameters, which form part of the constants used in solving for the position fix at a given time. Taking account of the corrections is well-known in the GPS position determining arts.

Ideally, the true range r to the satellite is measured. Instead, what is available is PR, the pseudorange, which is a biased and noisy measurement of r. The accuracy of an estimated position, velocity, or time, which is obtained from these measurements, depends upon the ability to compensate for, or eliminate, the biases and errors.

The range to a satellite is approximately 20,000 kilometers (km) when the satellite is overhead, and approximately 26,000 km when the satellite is rising or setting. The signal transit time varies between about 70 millisecond (ms) and 90 ms. The C/A-code repeats each millisecond, and the code correlation process essentially provides a measurement of pseudo-transmit time modulo 1 ms. The measurement can be ambiguous in whole milliseconds. This ambiguity, however, is easily resolved if the user has a rough idea of his location within hundreds of kilometers. The week-long P(Y)-code provides unambiguous pseudoranges.

The receiver clocks are generally basic quartz crystal oscillators and tend to drift. The receiver manufacturers attempt to limit the deviation of the receiver clock from GPST, and schedule the typical once-per-second measurements at epochs that are within plus or minus 1 millisecond (ms) of the GPST seconds. One approach to maintaining the receiver clock within a certain range of GPST is to steer the receiver clock 'continuously.' The steering can be implemented with software. The second approach is to let the clock drift until it reaches a certain threshold (typically 1 ms), and then reset it with a jump to return the bias to zero.

An example of pseudorange measurements with a receiver using the second approach shall now be described in more detail. Assume that there are pseudorange measurements from three satellites which rose about the same time but were in different orbits. Assume that one comes overhead and stays in view for almost seven hours. Assume that the other two stay lower in the sky and could be seen for shorter periods. There are discontinuities common to all three sets of measurements due to the resetting of the receiver clock. A determination can be made as to whether the receiver clock is running fast or slow, and its frequency offset from the nominal value of 10.23 megahertz (MHz) can be estimated.

For more information on pseudorange information, refer to "Global Positioning Systems," by Pratap Misra and Per Enge, Ganga-Jamuna Press, 2001; ISBN 0-9709544-0-9.

Position Accuracy Improvements

The pseudorange information processing logic 150 can include various types of logic for improving the position accuracy of the extracted pseudorange information, as described herein. Table 2, as described herein, depicts various combinations of position accuracy improvements for improving extracted pseudorange information, according to various embodiments. Table 3 also depicts various combinations of position accuracy improvements for improving extracted pseudorange information, according to various embodiments.

applied to extracted pseudorange information (EPI) according to various embodiments, where examples of position accuracy improvements include, but are not limited to, Wide Area Augmentation System (WAAS) pseudorange corrections, real carrier phase smoothing (real CPI) information, reconstructed carrier phase smoothing information (reconstructed CPI), Differential GPS (DGPS) pseudorange corrections, and Precise Point Positioning (PPP) processing. The accuracy column specifies levels of accuracy provided by the corresponding combination.

Combination 1 is extracted pseudorange information without any additional improvements, which provides 4-5 meters of accuracy. Combination 1 is described in Table 3 to provide a comparison with the other combinations 2-13.

According to one embodiment, the SUPL client 101 can also include a position-accuracy-improvement-determination-logic 180B for determining the one or more position accuracy improvements to apply to the extracted pseudorange information based on one or more factors such as cost, quality of service, and one or more characteristics of the cellular device. For example, different costs are associated with different position accuracy improvements. More specifically, extracted pseudorange information, WAAS and Doppler information are typically free. There is a low cost typically associated with DGPS and real carrier phase information. There is typically a higher cost associated with PPP. Therefore, referring to Table 3, according to one embodiment, combinations 1, 2, and 3 are typically free, combinations 4-7 typically are low cost, and combinations 8-12 are typically higher cost.

Various cellular devices have different characteristics that make them capable of providing different types of position accuracy improvements. For example, one type of cellular

TABLE 3

Various Combinations of Position Accuracy Improvements for Improving Extracted Pseudorange Information

Figure 6:
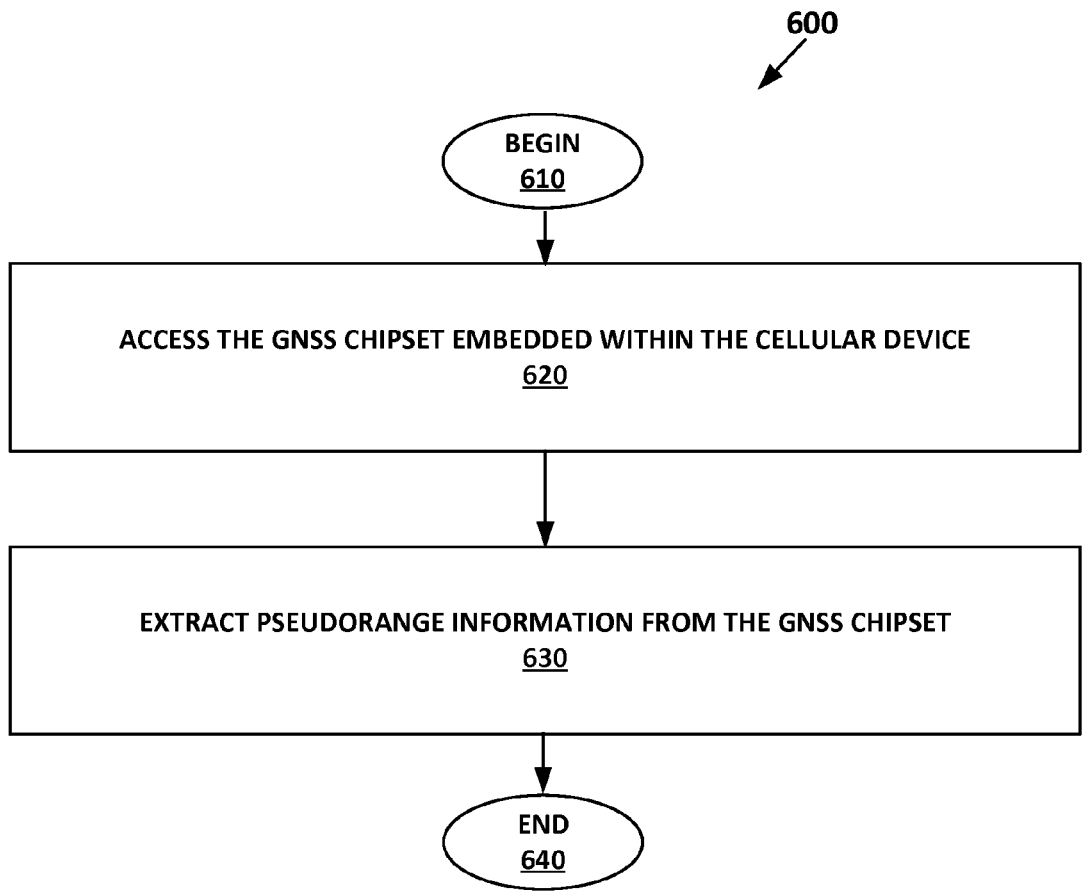
FIG. 6 depicts a flowchart of a method of extracting pseudorange information using a cellular device, according to one embodiment.
Figure 7A:
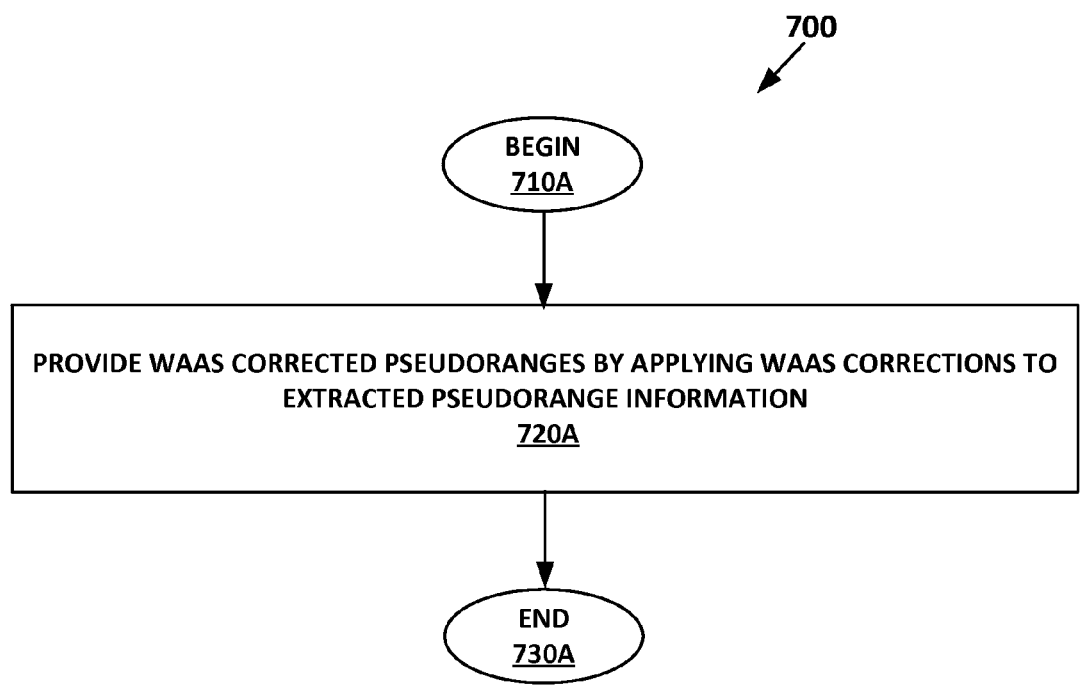
FIGS. 7A-10 depict flowcharts of methods of improving the position accuracy using one or more position accuracy improvements, according to various embodiments.
Figure 7B:
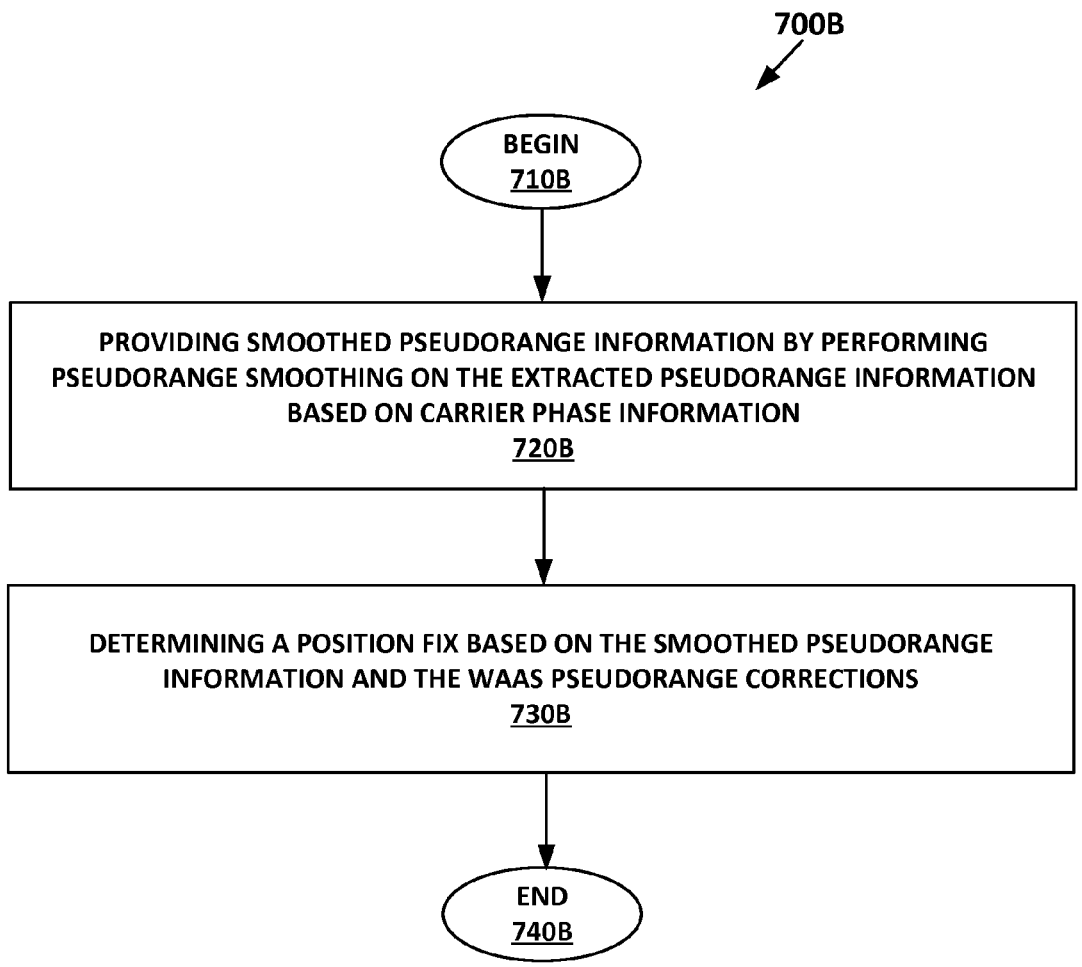
Figure 8A:
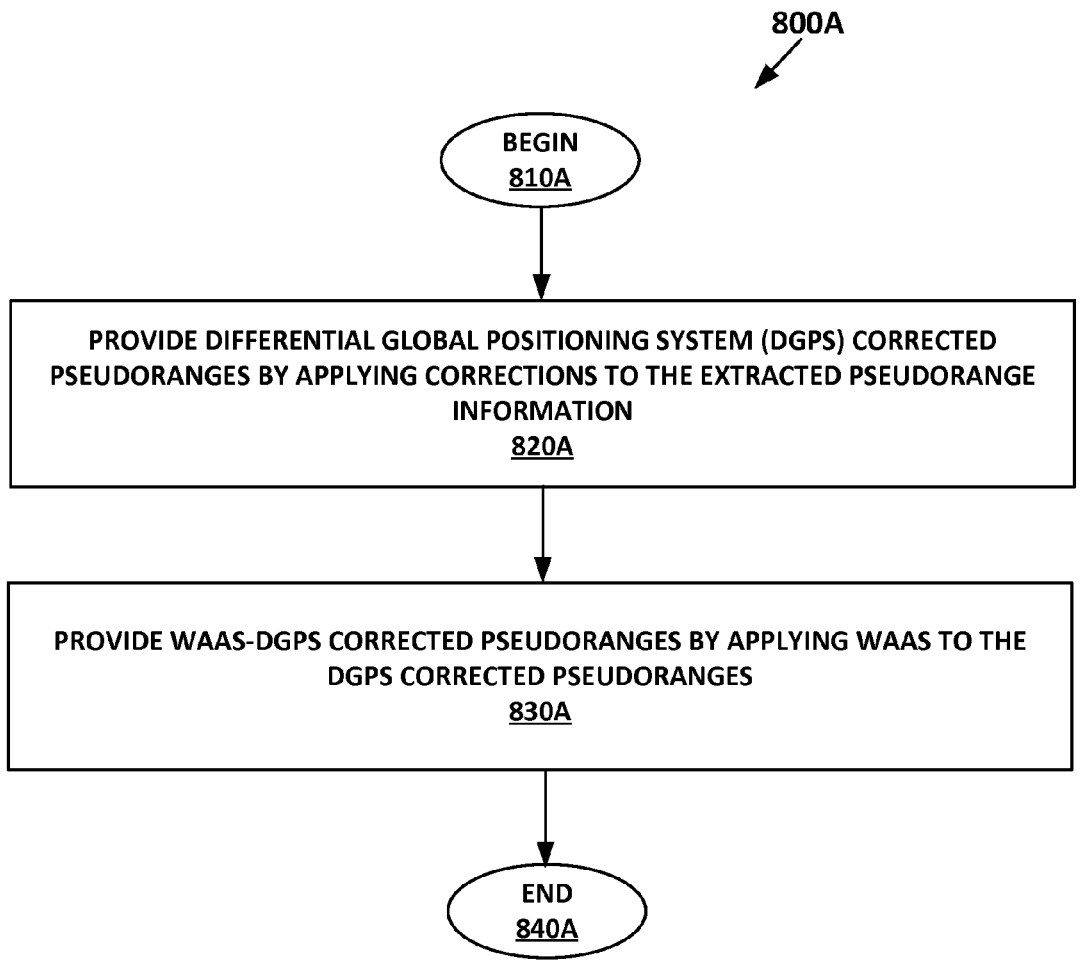
Figure 8B:
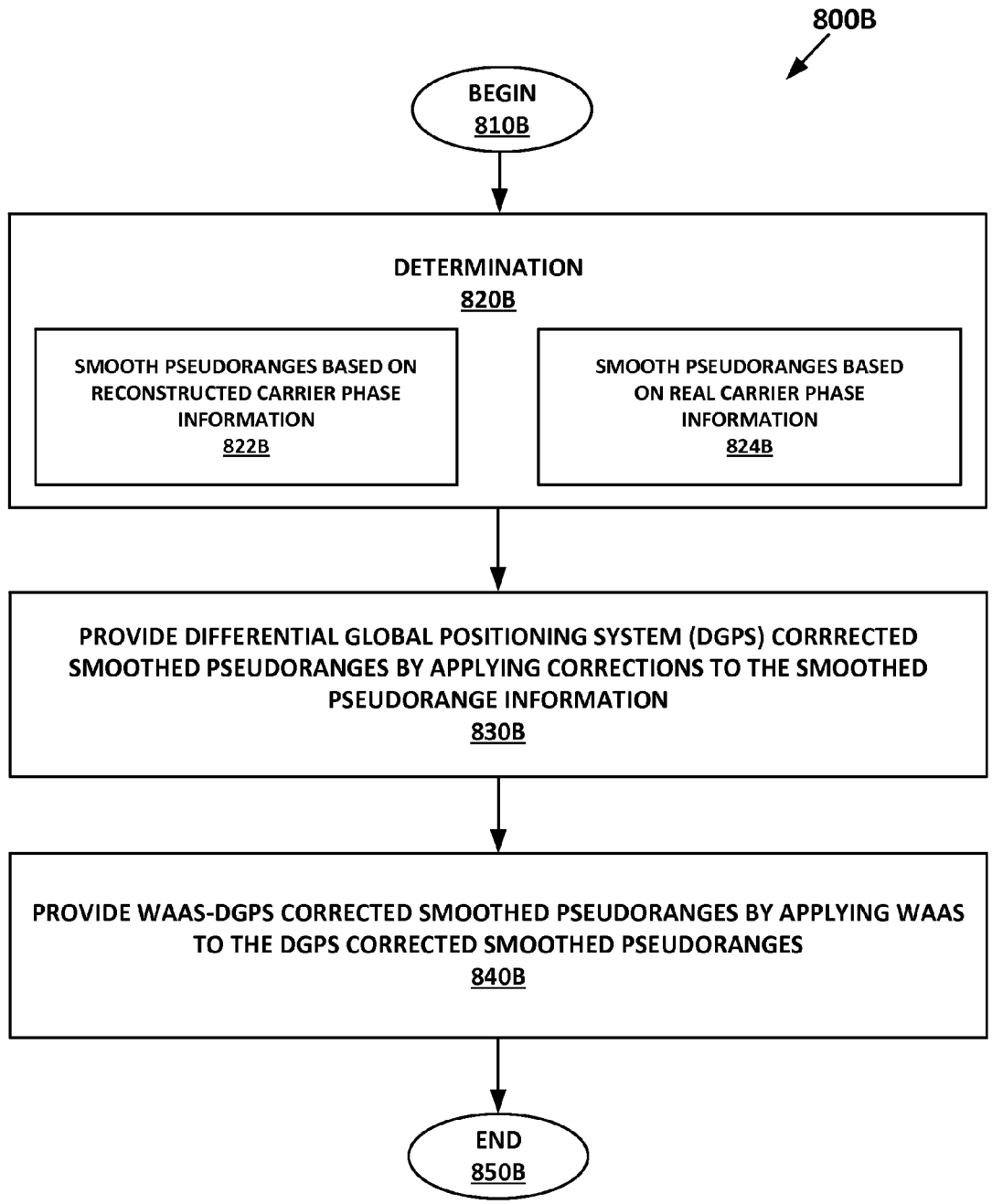
Figure 9A:
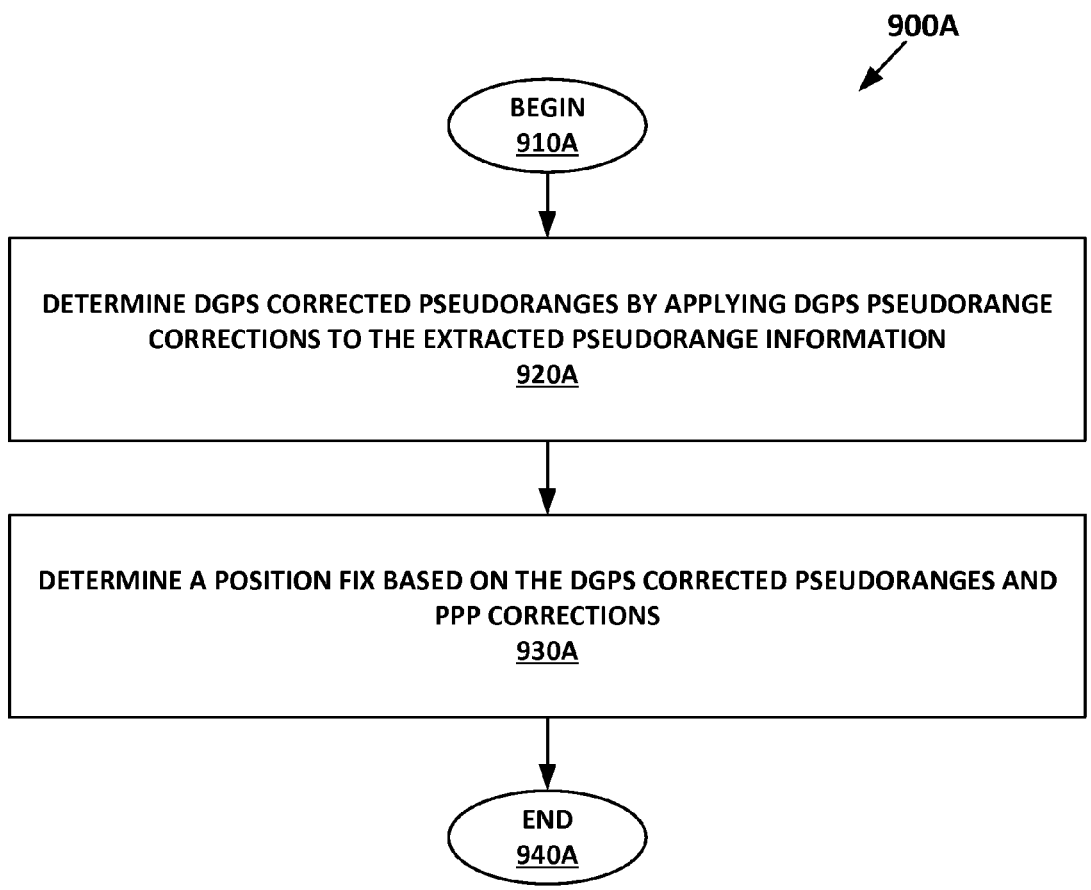
Figure 9B:
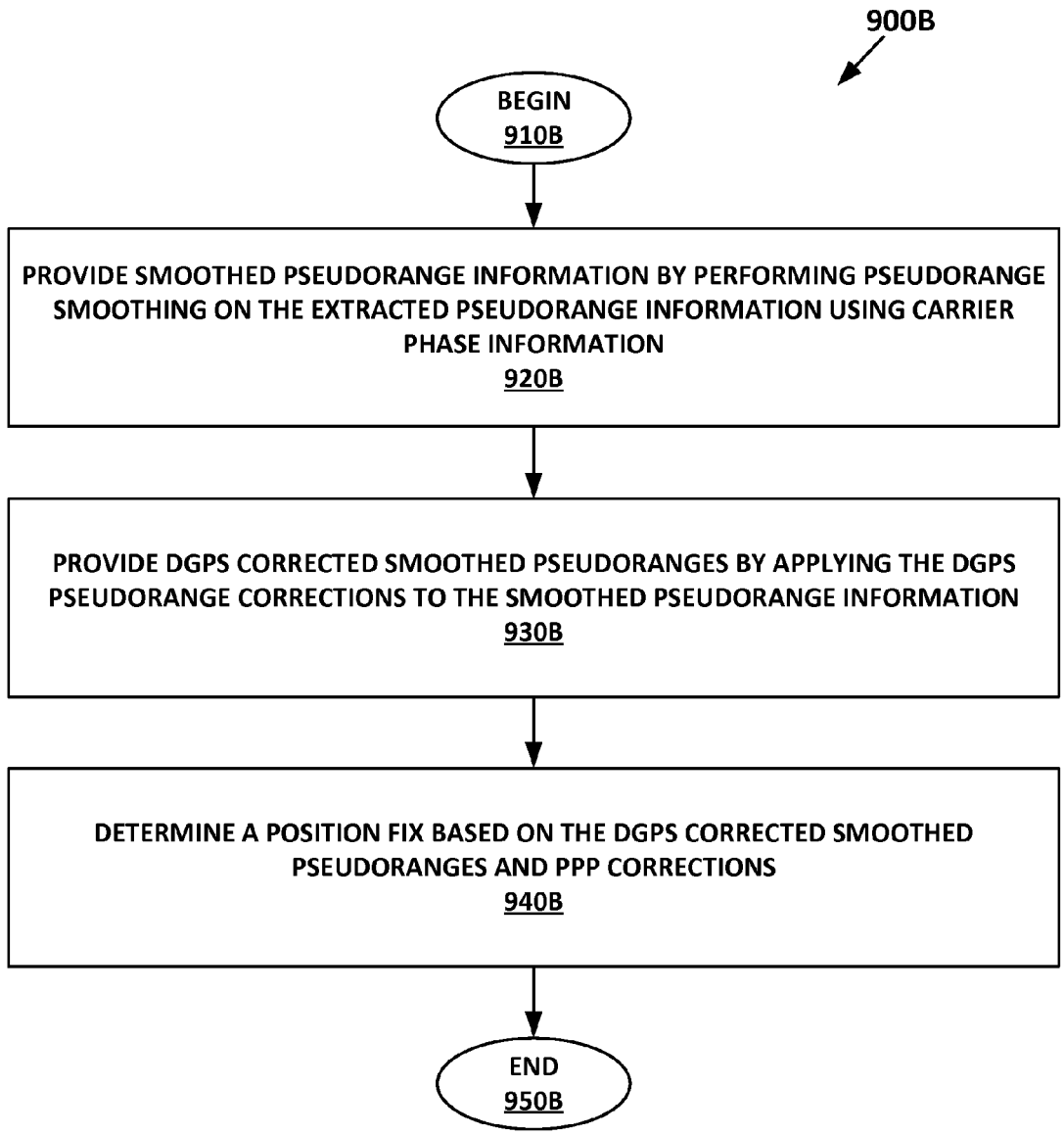

| Combination Identifier | Operation | Description | Accuracy |
|---|---|---|---|
| 1 | 620 (FIG. 6) | Extracted Pseudorange Information (EPI) | 4-5 meters (m) |
| 2 | 720A (FIG. 7A) | EPI + WAAS | approx. 1.7 m |
| 3 | FIG. 7B | EPI + reconstructed CPI + WAAS | <1 m |
| 4 | 820A (FIG. 8A) | EPI + DGPS | ~1 m |
| 5 | 830A (FIG. 8A) | EPI + DGPS + WAAS | <1 m |
| 6 | 820B, 822B, 830B, 840B FIG. 8B | EPI + reconstructed CPI + DGPS + WAAS | <1 m |
| 7 | 820B, 824B, 830B, 840B (FIG. 8B) | EPI + real CPI + DGPS + WAAS | <1 m |
| 8 | 920A (FIG. 9A) | EPI + PPP | <1 m |
| 9 | 930A (FIG. 9A) | EPI + PPP + DGPS | <1 m |
| 10 | FIG. 9B | EPI + reconstructed CPI + PPP + DGPS | <1 m |
| 11 | 1020 and 1030 (FIG. 10) | EPI + CPI + PPP | <<1 m |
| 12 | 1040 (FIG. 10) | EPI + CPI + PPP + DGPS | approx. 10 cm |
| 13 |  | EPI + RTK | approx. 2-10 cm |

Table 3 includes columns for combination identifier, operation, description, and accuracy. The combination identifier column indicates an identifier for each combination of improvements. The operation column specifies operations of various flowcharts in FIGS. 6-10 for the corresponding combination. The description column specifies various combinations of position accuracy improvements that can be device may be capable of providing WAAS but not be capable of providing Doppler information. In another example, some types of cellular devices may be capable of providing DGPS but not capable of providing PPP. In yet another example, different activities may require different levels of improvement. For example, some activities and/or people may be satisfied with 4-5 meters, others may be satisfied with 1.7 meters. Yet others may be satisfied with less than 1 meter, and still others may only be satisfied with 2 centimeters. Therefore, different users may request different levels of accuracy.

Table 4 depicts sources of the various position accuracy improvements, according to various embodiments.

TABLE 4

Sources of the Various Position Accuracy Improvements

| Position Accuracy Improvement Name | Source |
|---|---|
| Pseudorange Information | extracted from GNSS chipset |
| WAAS | extracted from GNSS chipset or satellite broadcast via Internet or radio delivery |
| Real Carrier Phase Information | extracted from GNSS chipset |
| Doppler for reconstructing carrier phase information | extracted from GNSS chipset |
| Differential Global Positioning System (DGPS) | from a reference station delivered by dialing up, wired/wireless internet/intranet connection, or by receiving a broadcast subcarrier modulation concatenated to an FM carrier frequency. DGPS can be obtained at least from Trimble ® |
| Real Time Kinematic (RTK) | from a reference station |

The first column of Table 4 provides the name of the position accuracy improvement. The second column of Table 4 specifies the source for the corresponding position accuracy improvement.

According to various embodiments, a cellular device 100, 200 can initially provide a position that is within 4-5 meters using, for example, unimproved extracted pseudorange information and the position can continually be improved, using various position accuracy improvements as described herein, as long as the antennas of the cellular device 100, 200 is clear of obstructions to receive various position accuracy improvements.

The following describes various position accuracy improvements and related topics in more detail.

Global Navigation Satellite Systems

A Global Navigation Satellite System (GNSS) is a navigation system that makes use of a constellation of satellites orbiting the earth to provide signals to a receiver, such as GNSS receiver 107, which estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU).

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequencies, a pseudo-random number (PRN) code, and satellite navigation data. Two different PRN codes are transmitted by each satellite: A coarse acquisition (C/A) code and a precision (P/Y) code which is encrypted for use by authorized users. A receiver, such as GNSS receiver 107, designed for precision positioning contains multiple channels, each of which can track the signals on both L1 and L2 frequencies from a GPS satellite in view above the horizon at the receiver antenna, and from these computes the observables for that satellite comprising the L1 pseudorange, possibly the L2 pseudorange and the coherent L1 and L2 carrier phases. Coherent phase tracking implies that the carrier phases from two channels assigned to the same satellite and frequency will differ only by an integer number of cycles.

Each GLONASS satellite conventionally transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz respectively. The code and carrier signal structure is similar to that of NAVSTAR. A GNSS receiver designed for precision positioning contains multiple channels each of which can track the signals from both GPS and GLONASS satellites on their respective L1 and L2 frequencies, and generate pseudorange and carrier phase observables from these. Future generations of GNSS receivers will include the ability to track signals from all deployed GNSSs. It should be noted that in the near future a modernized L1 Glonass signal will be added that is centered at 1575.42 MHz, the same center frequency as L1 GPS. Additionally, this modernized Glonass signal will be in a code division multiple access (CDMA) format rather than in a frequency division multiple access (FDMA) like its conventional counterpart that is centered at 1602.0 MHz.

Differential Global Positioning System (DGPS)

Differential GPS (DGPS) utilizes a reference station which is located at a surveyed position to gather data and deduce corrections for the various error contributions which reduce the precision of determining a position fix. For example, as the GPS signals pass through the ionosphere and troposphere, propagation delays may occur. Other factors which may reduce the precision of determining a position fix may include satellite clock errors, GPS receiver clock errors, and satellite position errors (ephemerides). The reference station receives essentially the same GPS signals as cellular devices 100, 200 which may also be operating in the area. However, instead of using the timing signals from the GPS satellites to calculate its position, it uses its known position to calculate timing. In other words, the reference station determines what the timing signals from the GPS satellites should be in order to calculate the position at which the reference station is known to be. The difference in timing can be expressed in terms of pseudorange lengths, in meters. The difference between the received GPS signals and what they optimally should be is used as an error correction factor for other GPS receivers in the area. Typically, the reference station broadcasts the error correction to, for example, a cellular device 100, 200 which uses this data to determine its position more precisely. Alternatively, the error corrections may be stored for later retrieval and correction via post-processing techniques.

DGPS corrections cover errors caused by satellite clocks, ephemeris, and the atmosphere in the form of ionosphere errors and troposphere errors. The nearer a DGPS reference station is to the receiver 107 the more useful the DGPS corrections from that reference station will be.

The system is called DGPS when GPS is the only constellation used for Differential GNSS. DGPS provides an accuracy on the order of 1 meter or 1 sigma for users in a range that is approximately in a few tens of kilometers (kms)

from the reference station and growing at the rate of 1 m per 150 km of separation. DGPS is one type of Differential GNSS (DGNSS) technique. There are other types of DGNSS techniques, such as RTK and Wide Area RTK (WARTK), that can be used by high-precision applications for navigation or surveying that can be based on using carrier phase measurements. It should be appreciated that other DGNSS which may utilize signals from other constellations besides the GPS constellation or from combinations of constellations. Embodiments described herein may be employed with other DGNSS techniques besides DGPS.

A variety of different techniques may be used to deliver differential corrections that are used for DGNSS techniques. In one example, DGNSS corrections are broadcast over an FM subcarrier. U.S. Pat. No. 5,477,228 by Tiwari et al. describes a system for delivering differential corrections via FM subcarrier broadcast method.

Real-Time Kinematic System

An improvement to DGPS methods is referred to as Real-time Kinematic (RTK). As in the DGPS method, the RTK method, utilizes a reference station located at determined or surveyed point. The reference station collects data from the same set of satellites in view by the cellular device 100, 200 in the area. Measurements of GPS signal errors taken at the reference station (e.g., dual-frequency code and carrier phase signal errors) and broadcast to one or more cellular devices 100, 200 working in the area. The one or more cellular devices 100, 200 combine the reference station data with locally collected position measurements to estimate local carrier-phase ambiguities, thus allowing a more precise determination of the cellular device 100, 200's position. The RTK method is different from DGPS methods in that the vector from a reference station to a cellular device 100, 200 is determined (e.g., using the double differences method). In DGPS methods, reference stations are used to calculate the changes needed in each pseudorange for a given satellite in view of the reference station, and the cellular device 100, 200, to correct for the various error contributions. Thus, DGPS systems broadcast pseudorange correction numbers second-by-second for each satellite in view, or store the data for later retrieval as described above.

RTK allows surveyors to determine a true surveyed data point in real time, while taking the data. However, the range of useful corrections with a single reference station is typically limited to about 70 km because the variable in propagation delay (increase in apparent path length from satellite to a receiver of the cellular device 100, 200, or pseudo range) changes significantly for separation distances beyond 70 km. This is because the ionosphere is typically not homogeneous in its density of electrons, and because the electron density may change based on, for example, the sun's position and therefore time of day.

Thus for surveying or other positioning systems which must work over larger regions, the surveyor must either place additional base stations in the regions of interest, or move his base stations from place to place. This range limitation has led to the development of more complex enhancements that have superseded the normal RTK operations described above, and in some cases eliminated the need for a base station GPS receiver altogether. This enhancement is referred to as the "Network RTK" or "Virtual Reference Station" (VRS) system and method.

Figure 4:
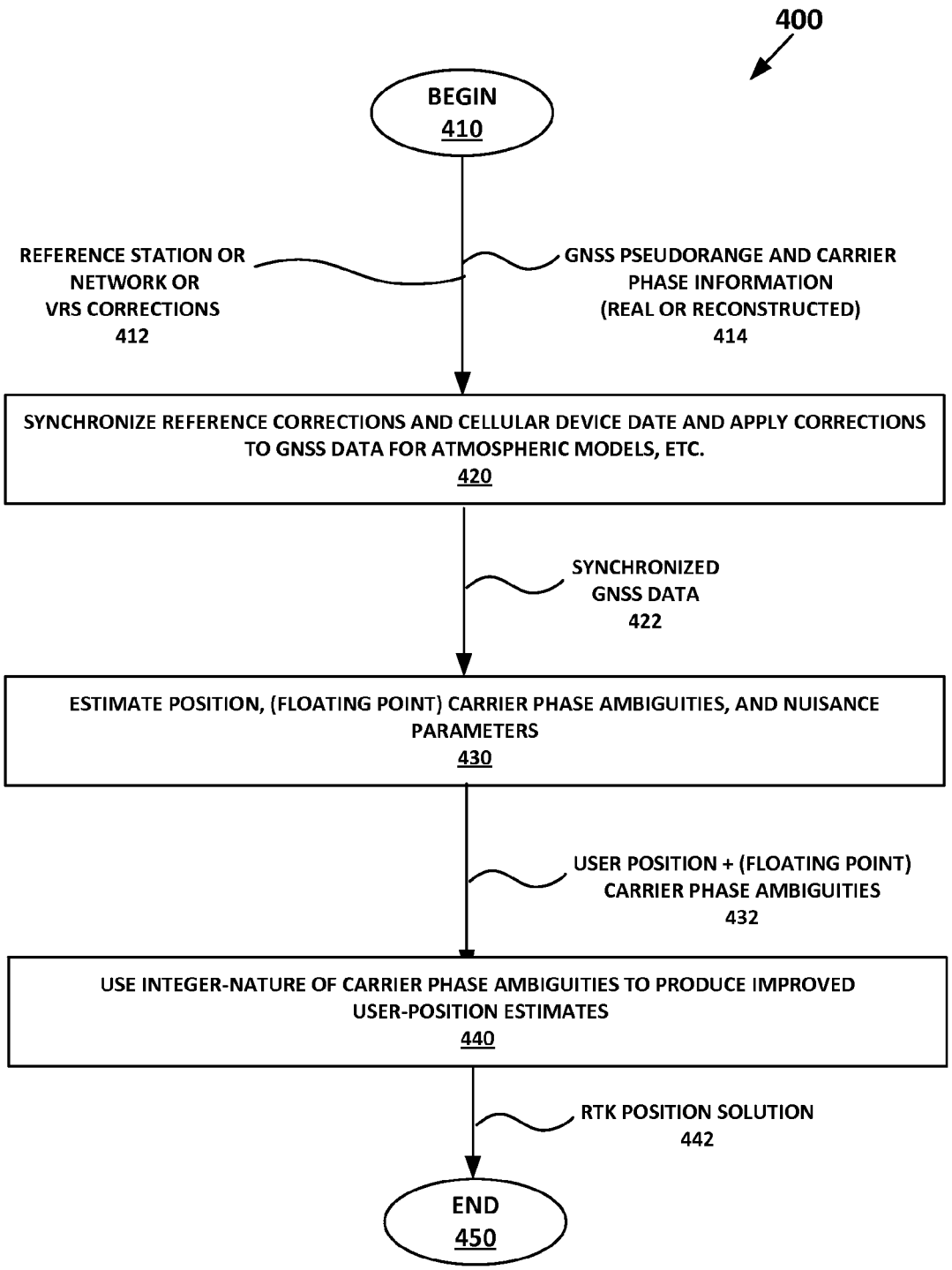
FIG. 4 depicts a flowchart for determining an RTK (Real Time Kinematic) position solution, according to one embodiment.

FIG. 4 depicts a flowchart 400 for determining an RTK position solution, according to one embodiment. At 410, the method begins. The inputs to the method are reference station network or VRS corrections 412 and GNSS pseudorange plus carrier phase information from the cellular device 414. At 420, reference corrections and cellular device data are synchronized and corrections are applied to the GNSS data for atmospheric models and so on. The output of 420 is synchronized GNSS data 422, which is received by operation 430. At 430, position, carrier phase ambiguities in floating point, and nuisance parameters are estimated. The output 432 of 430 is user position plus carrier phase ambiguities in floating point. Operation 440 receives the output 432 and produces improved user-position estimates using the integer-nature of carrier phase ambiguities. The output 442 of 440 is an RTK position solution, which can be used according to various embodiments. The method ends at 450.

Network RTK

Network RTK typically uses three or more GPS reference stations to collect GPS data and extract information about the atmospheric and satellite ephemeris errors affecting signals within the network coverage region. Data from all the various reference stations is transmitted to a central processing facility, or control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudo range correction comprising the actual pseudo ranges that can be used to create a virtual reference station. The control center then performs a series of calculations and creates a set of correction models that provide the cellular device 100, 200 with the means to estimate the ionospheric path delay from each satellite in view from the cellular device 100, 200, and to take account other error contributions for those same satellites at the current instant in time for the cellular device 100, 200's location.

The cellular device 100, 200 is configured to couple a data-capable cellular telephone to its internal signal processing system. The user operating the cellular device 100, 200 determines that he needs to activate the VRS process and initiates a call to the control center to make a connection with the processing computer.

The cellular device 100, 200 sends its approximate position, based on raw GPS data from the satellites in view without any corrections, to the control center. Typically, this approximate position is accurate to approximately 4-7 meters. The user then requests a set of "modeled observables" for the specific location of the cellular device 100, 200. The control center performs a series of calculations and creates a set of correction models that provide the cellular device 100, 200 with the means to estimate the ionospheric path delay from each satellite in view from the cellular device 100, 200, and to take into account other error contributions for those same satellites at the current instant in time for the cellular device 100, 200's location. In other words, the corrections for a specific cellular device 100, 200 at a specific location are determined on command by the central processor at the control center and a corrected data stream is sent from the control center to the cellular device 100, 200. Alternatively, the control center may instead send atmospheric and ephemeris corrections to the cellular device 100, 200 which then uses that information to determine its position more precisely.

These corrections are now sufficiently precise that the high performance position accuracy standard of 2-3 cm may be determined, in real time, for any arbitrary cellular device 100, 200's position. Thus a GPS enabled cellular device 100, 200's raw GPS data fix can be corrected to a degree that makes it behave as if it were a surveyed reference location; hence the terminology "virtual reference station."

An example of a network RTK system is described in U.S. Pat. No. 5,899,957, entitled "Carrier Phase Differential GPS Corrections Network," by Peter Loomis, assigned to the assignee of the present application.

The Virtual Reference Station method extends the allowable distance from any reference station to the cellular devices 100, 200. Reference stations may now be located hundreds of miles apart, and corrections can be generated for any point within an area surrounded by reference stations. However, there are many construction projects where cellular coverage is not available over the entire physical area under construction and survey.

Virtual Reference Stations

To achieve very accurate positioning (to several centimeters or less) of a terrestrial mobile platform of a cellular device 100, 200, relative or differential positioning methods are commonly employed. These methods use a GNSS reference receiver located at a known position, in addition to the data from a GNSS receiver 107 on the mobile platform, to compute the estimated position of the mobile platform relative to the reference receiver.

The most accurate known method uses relative GNSS carrier phase interferometry between the GNSS cellular device 100, 200's receiver and GNSS reference receiver antennas plus resolution of integer wavelength ambiguities in the differential phases to achieve centimeter-level positioning accuracies. These differential GNSS methods are predicated on the near exact correlation of several common errors in the cellular device 100, 200 and reference observables. They include ionosphere and troposphere signal delay errors, satellite orbit and clock errors, and receiver clock errors.

When the baseline length between the mobile platform and the reference receiver does not exceed 10 kilometers, which is normally considered a short baseline condition, the ionosphere and troposphere signal delay errors in the observables from the cellular device 100, 200 and reference receivers are almost exactly the same. These atmospheric delay errors therefore cancel in the cellular device 100, 200's reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the cellular device 100, 200 and reference receiver antennas become increasingly different, so that their presence in the cellular device 100, 200's-reference differential GNSS observables and their influence on the ambiguity resolution process increases. Ambiguity resolution on single cellular device 100, 200's reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as an aircraft.

A network GNSS method computes the estimated position of a cellular device 100, 200's receiver using reference observables from three or more reference receivers that approximately surround the cellular device 100, 200's receiver trajectory. This implies that the cellular device 100, 200's receiver trajectory is mostly contained by a closed polygon whose vertices are the reference receiver antennas. The cellular device 100, 200's receiver 107 can move a few kilometers outside this polygon without significant loss of positioning accuracy. A network GNSS algorithm calibrates the ionosphere and troposphere signal delays at each reference receiver position and then interpolates and possibly extrapolates these to the cellular device 100, 200's position to achieve better signal delay cancellation on long baselines than could be had with a single reference receiver. Various methods of signal processing can be used, however they all yield essentially the same performance improvement on long baselines.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the cellular device 100, 200 and reference receivers so as to establish a relative phase interferometry position of the cellular device 100, 200's antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the cellular device 100, 200 and reference receivers result in the cancellation of all common mode range errors except the integer ambiguities. An ambiguity resolution algorithm uses redundant carrier phase observables from the cellular device 100, 200 and reference receivers, and the known reference antenna position, to estimate and thereby resolve these ambiguities.

Once the integer cycle ambiguities are known, the cellular device 100, 200's receiver 107 can compute its antenna position with accuracies generally on the order of a few centimeters, provided that the cellular device 100, 200 and reference antennas are not separated by more than 10 kilometers. This method of precise positioning performed in real-time is commonly referred to as real-time kinematic (RTK) positioning. The separation between a cellular device 100, 200 and reference antennas shall be referred to as "cellular device reference separation."

The reason for the cellular device-reference separation constraint is that KAR positioning relies on near exact correlation of atmospheric signal delay errors between the cellular device 100, 200 and reference receiver observables, so that they cancel in the cellular device 100, 200's reference observables combinations (for example, differences between cellular device 100, 200 and reference observables per satellite). The largest error in carrier-phase positioning solutions is introduced by the ionosphere, a layer of charged gases surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

When the cellular device 100, 200 reference separation exceeds 10 kilometers, as maybe the case when the cellular device 100, 200 has a GNSS receiver 107 that is a LEO satellite receiver, the atmospheric delay errors become de-correlated and do not cancel exactly. The residual errors can now interfere with the ambiguity resolution process and thereby make correct ambiguity resolution and precise positioning less reliable.

The cellular device 100, 200's reference separation constraint has made KAR positioning with a single reference receiver unsuitable for certain mobile positioning applications where the mission of the mobile platform of the cellular device 100, 200 will typically exceed this constraint. One solution is to set up multiple reference receivers along the mobile platform's path so that at least one reference receiver falls within a 10 km radius of the mobile platform's estimated position.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the cellular device 100, 200's receiver, so that the cellular device 100, 200's receiver 107 can perform reliable ambiguity resolution on combinations of carrier phase observables from the cellular device 100, 200 and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 1003-1004) for a comparison of different network GNSS implementations and comparisons of their respective performances.

A virtual reference station (VRS) network method is a particular implementation of a network GNSS method that is characterized by the method by which it computes corrective data for the purpose of cellular device 100, 200's position accuracy improvement. A VRS network method comprises a VRS corrections generator and a single-baseline differential GNSS position generator such as a GNSS receiver 107 with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., Global Positioning System: Theory and Practice, 5th Edition, 1001 (hereinafter "Hofmann-Wellenhof [1001]"), gives comprehensive descriptions of different methods of differential GNSS position computation, ranging in accuracies from one meter to a few centimeters. The single-baseline differential GNSS position algorithm typically computes differences between the cellular device 100, 200 and reference receiver observables to cancel atmospheric delay errors and other common mode errors such as orbital and satellite clock errors. The VRS position is usually specified to be close to or the same as the roving receiver's estimated position so that the actual atmospheric errors in the cellular device 100, 200 receiver 107's observables approximately cancel the estimated atmospheric errors in the VRS observables in the cellular device 100, 200's reference observables differences.

The VRS corrections generator computes the synthetic observables at each sampling epoch (typically once per second) from the geometric ranges between the VRS position and the M satellite positions as computed using well-known algorithms such as those given in IS-GPS-200G interface specification tilted "Naystar GPS Space Segment/Navigation User Interfaces," and dated 5 Sep. 2012. It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the GNSS cellular device 100, 200's receiver 107. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-cellular-device-bi-directional data communication channels. Each server-cellular device bi-directional communication channel serves one cellular device 100, 200. The reference stations provide their observables to the VRS server via the server-reference receiver bi-directional communication channels. These channels can be implemented by a public network such as the Internet. The bi-directional server-cellular-device communication channels can be radio modems or cellular telephone links, depending on the location of the server with respect to the cellular device 100, 200.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va. 22209. The synthetic observables are the observables that a reference receiver located at the VRS position would measure. The VRS position is selected to be close to the cellular device 100, 200's estimated position so that the cellular device 100, 200's VRS separation is less than a maximum separation considered acceptable for the application. Consequently, the cellular device 100, 200 receiver 107 must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited; and in H. Landau et al., Virtual Reference Stations versus Broadcast Solutions in Network RTK, GNSS 2003 Proceedings, Graz, Austria (2003).

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Precise Positioning Point (PPP)

Descriptions of a Precise Point Positioning (PPP) technique are provided in U.S. Patent application publication 20110187590, of Leandro, which is assigned to Trimble Navigation Limited. Trimble Navigation Limited has commercialized a version of PPP corrections which it calls RTX™. PPP corrections can be any collection of data that provides corrections from a satellite in space, clock errors, ionosphere or troposphere, or a combination thereof. According to one embodiment, PPP corrections can be used in instead of WAAS or RTX™.

The term Precise Point Positioning (PPP), as used henceforth in this document, is used as shorthand to refer to any system or technique which has the characteristics and functionality of PPP described or referenced herein and is not necessarily limited to a system from Trimble Navigation Ltd. Hence, the term "PPP" is used in this document merely to facilitate description and is used without derogation to any trademark rights of Trimble Navigation Ltd. or any subsidiary thereof or other related entity. Techniques for generating PPP corrections are well known in the art. In general, a PPP system utilizes a network (which may be global) of GNSS reference receivers tracking navigation satellites such as GPS and GLONASS satellites and feeding data back to a centralized location for processing. At the centralized location, the precise orbits and precise clocks of all of the tracked navigation satellites are generated and updated in real time. A correction stream is produced by the central location; the correction stream contains the orbit and clock information. This correction stream is broadcast or otherwise provided to GNSS receivers, such as a GNSS receiver 107, in the field (conventionally by satellite service or cellular link). Corrections processors in the GNSS receivers utilize the corrections to produce centimeter level positions after a short convergence time (e.g., less than 30 minutes). A main difference between PPP and VRS is that PPP networks of reference receivers are typically global while VRS networks may be regional or localized with shorter spacing between the reference stations in a VRS network.

Wide Area Augmentation System (WAAS)

Wide Area Augmentation System (WAAS) corrections are corrections of satellite position and their behavior. WAAS was developed by the Federal Aviation Administration (FAA). WAAS includes a network of reference stations that are on the ground located in North America and Hawaii. The reference stations transmit their respective measurements to master stations which queue their respective received measurements. The master stations transmit WAAS corrections to geostationary WAAS satellites, which in turn broadcast the WAAS corrections back to earth where cellular devices 100, 200 that include WAAS-enabled GPS receivers can receive the broadcasted WAAS corrections. According to one embodiment, the GNSS receiver 107 is a WAAS-enabled GPS receiver. The WAAS corrections can be used to improve the accuracy of the respective cellular devices 100, 200' positions, for example, by applying the WAAS corrections to extracted pseudoranges. WAAS operation and implementation is well known in the art.

Real Carrier Phase Information

According to one embodiment, a GNSS chipset 170 provides real carrier phase information (also referred to as "actual carrier phase information"). The cellular device 100, 200 can extract real carrier phase information from the GNSS chipset 170 in a manner similar to extracting pseudorange information from the GNSS chipset 170, where the extracted carrier phase information is for use elsewhere in the cellular device 100, 200 outside of the GNSS chipset 170 as described herein, for example, with flowchart 600 of FIG. 6.

Figure 5A:
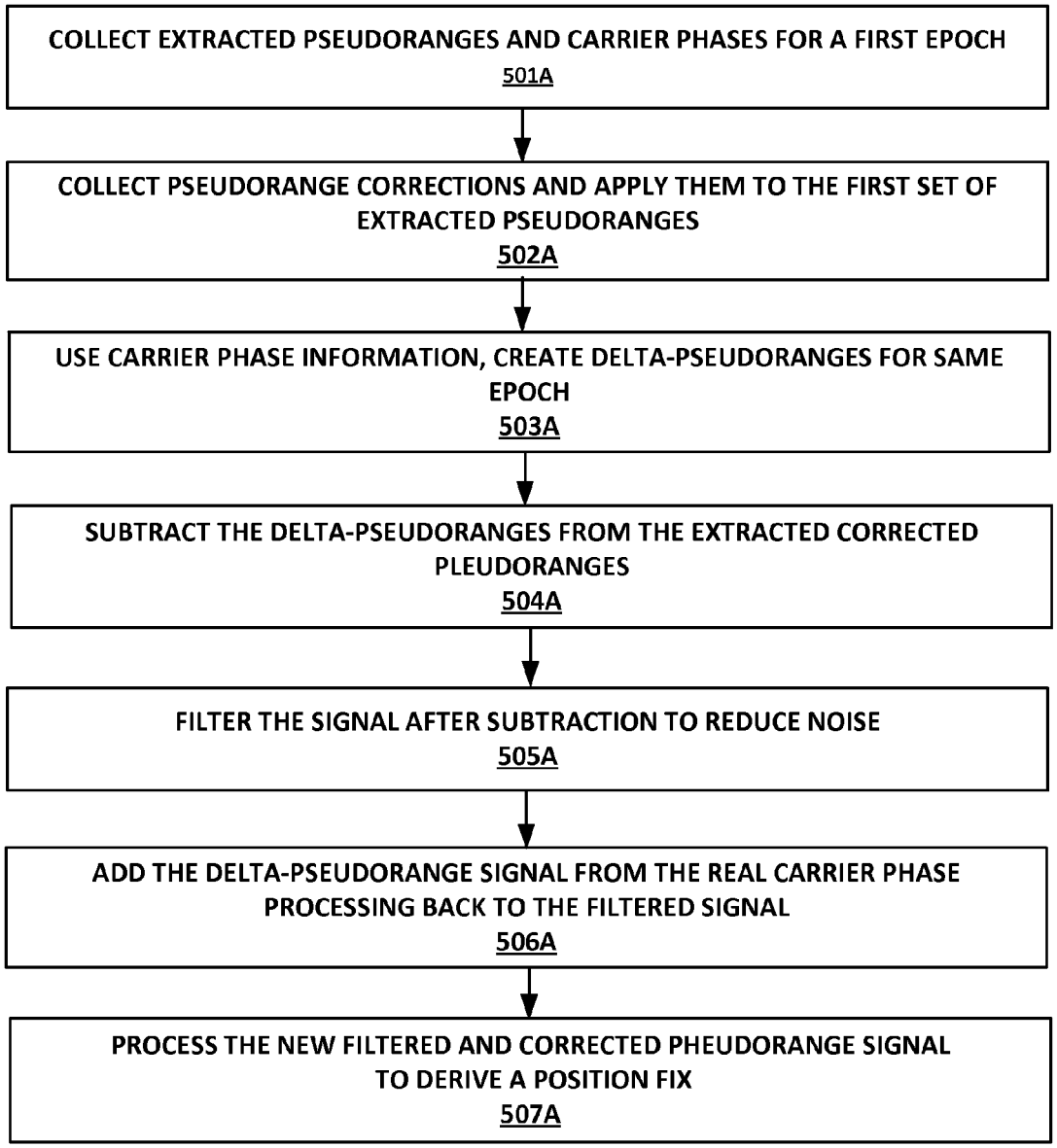
FIG. 5A is a flowchart of a method for performing a carrier phase smoothing operation using real carrier phase information, according to one embodiment.

FIG. 5A is a flowchart 500A of a method for performing a carrier phase smoothing operation using real carrier phase information, according to one embodiment. In various embodiments, carrier phase smoothing logic 152 may be implemented by either a range domain hatch filter, or a position domain hatch filter, or by any of other implementations known in the literature. The range domain hatch filter method is described in U.S. Pat. No. 5,471,217 by Hatch et al., entitled "Method and Apparatus for Smoothing Coded Measurements in a Global Positioning System Receiver," filed Feb. 1, 1993, and the Hatch paper entitled "The synergism of GPS code and carrier measurements," published in the Proceedings of the Third International Geodetic symposium on satellite Doppler Positioning, New Mexico, 1982: 1213-1232. See also p 45 of the Master's Thesis by Sudha Neelima Thipparthi entitled "Improving Positional Accuracy using Carrier Smoothing Techniques in Inexpensive GPS Receivers," MSEE thesis, New Mexico State University, Las Cruces, N. Mex., February 2004.

The filtering/processing described herein lies in the family of errors in pseudorange processing that affect code and carrier measurements in the same way. In various embodiments, the code phase pseudorange measurements are "disciplined" by subtracting out a more constant equivalent pseudorange-like distance measurement derived from the carrier phase. Next, a filtering on the net subtracted signal is performed which allows various embodiments to eliminate multipath induced errors in the raw, and corrected, pseudorange data. This method does not deal with ionospheric effects, according to one embodiment.

In operation 501A of FIG. 5A, extracted pseudorange information and carrier phases for a first epoch are collected. In one embodiment, these extracted pseudorange information and carrier phases are received at carrier phase smoothing logic 152 from the GNSS receiver 107.

In operation 502A of FIG. 5A, pseudorange corrections are collected and applied to the first set of extracted pseudoranges collected in operation 501A. In one embodiment, these corrections themselves may be smoothed at the reference receiver (e.g., at GPS/GNSS reference stations 220) so that the delivered pseudorange corrections themselves are less noisy. Smoothing the pseudorange corrections derived at the GPS/GNSS reference stations 220 using the same carrier phase method of flowchart 500A can vastly improve the quality of the delivered pseudorange corrections delivered to cellular device 100, 200 for use by a position determination processor (e.g., GNSS receiver 107 or pseudorange information processing logic 150). Such corrected pseudoranges that are also smoothed may be used by the cellular device 100, 200 and fetched if available.

In operation 503A of FIG. 5A, delta carrier phase measurements for the same epoch are created using real carrier phase information. In accordance with various embodiments, this replicates creating a second distance measurement, similar to the reconstructed carrier phase information, based on integrated Doppler Shift.

In operation 504A of FIG. 5A, the delta carrier phase measurements are subtracted from the corrected extracted pseudoranges. In accordance with various embodiments, this provides a fairly constant signal for that epoch and is equivalent to the corrected extracted pseudorange at the start of the integration interval. In accordance with various embodiments, this is referred to as a "disciplining" step that smoothes out the corrected extracted pseudorange signal and therefore reduces the instant errors in the later-computed position fixes.

In operation 505A of FIG. 5A, the signal is filtered after the subtraction of operation 504A to reduce noise. In accordance with one embodiment, this is performed by averaging the carrier phase "yardsticks" over a series of epochs.

In operation 506A of FIG. 5A, the delta carrier phase measurements from the real carrier phase processing operation is added back into the filtered signal of operation 505A.

In operation 507A of FIG. 5A, the new filtered and corrected extracted pseudorange signal is processed, for example, at the pseudorange information processing logic 150, to derive a position fix 172B.

Reconstructing Carrier Phase Information Based on Doppler Shift

Carrier Phase Information can be reconstructed (referred to herein as "reconstructed carrier phase") based on Doppler Shift. Doppler Shift is the change in frequency of a periodic event (also known as a "wave") perceived by an observer that is moving relative to a source of the periodic event. For example, Doppler shift refers to the change in apparent received satellite signal frequency caused by the relative motion of the satellites as they either approach the cellular device 100, 200 or recede from it. Thus any measurement of Doppler frequency change is similar to differentiating carrier phase. It is therefore possible to reconstruct the carrier phase by integrating the Doppler shift data. In an embodiment, the GNSS chipset 170 of GNSS receiver 107 may provide Doppler information it determines through other means. This Doppler frequency shift information or "Doppler" may be collected at each GPS timing epoch (e.g., one second) and integrated over a sequence of the one-second epochs, to produce a model of carrier phase. This Doppler-derived carrier phase model may be substituted for the real carrier phase data, and used in the same manner as shown in the flow chart for carrier phase smoothing of FIG. 5A. Doppler Shift signal processing is well known in the art.

Figure 5B:
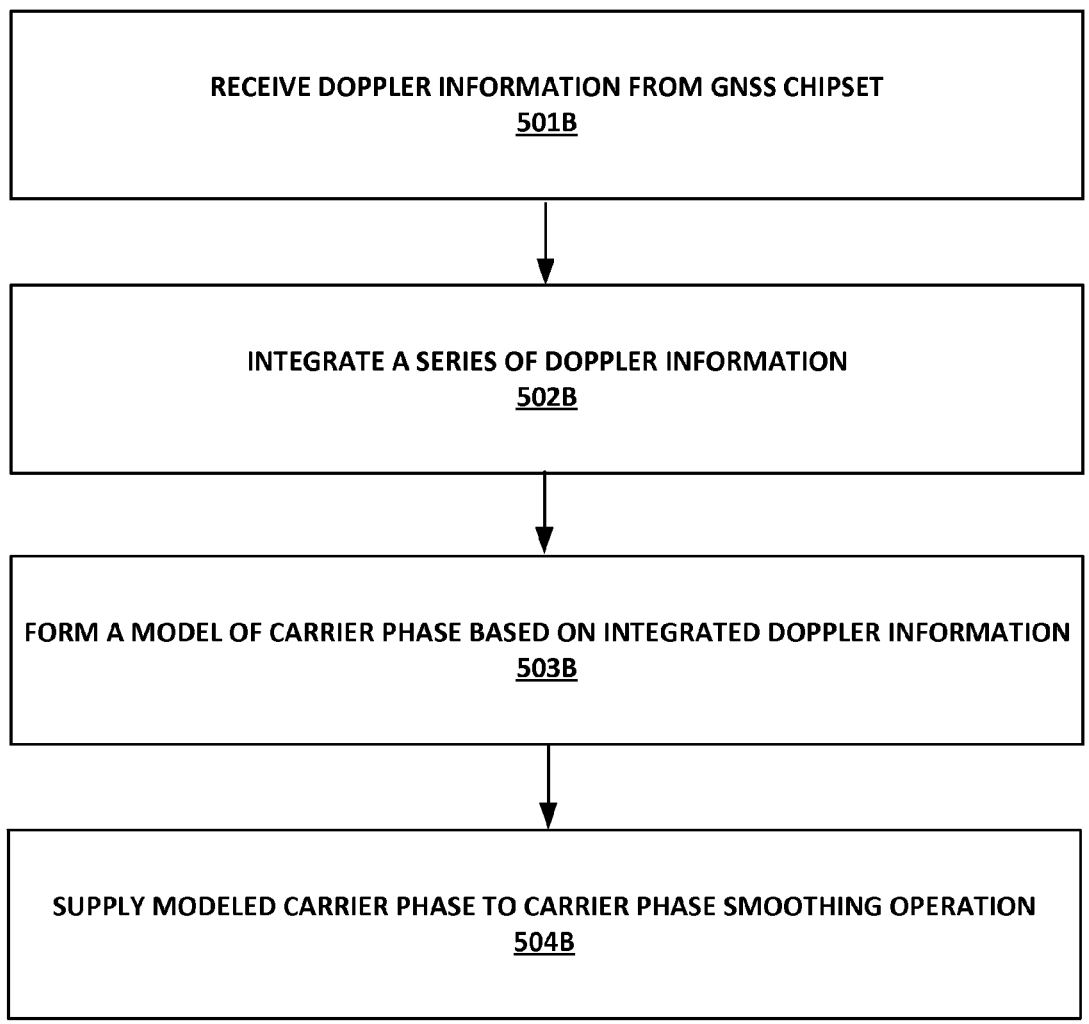
FIG. 5B is a flowchart of a method for generating reconstructed carrier phase information based on Doppler shift, according to one embodiment.

FIG. 5B is a flowchart 500B of a method for generating reconstructed carrier phase information (also referred to as a "Doppler-derived carrier phase model") based on Doppler Shift, according to one embodiment. In accordance with one embodiment, method of flowchart 500B is implemented at GPS/GNSS reference stations and the modeled carrier phase is provided to cellular device 100, 200 via one of the communication networks described above.

In operation 501B of FIG. 5B, Doppler information from a GNSS receiver 107 of a GNSS chipset 170 is received by pseudorange-carrier-phase-smoothing-logic 152.

In operation 502B of FIG. 5B, a series of Doppler information is integrated. As described above, Doppler frequency shift information may be collected at each GPS timing epoch (e.g., one second) and stored for use in producing a model of carrier phase.

In operation 503B of FIG. 5B, a model of carrier phase is created based on integrated Doppler information. As discussed above with reference to operation 502B, a series of Doppler information for a plurality of timing epochs is integrated. In one embodiment, this Doppler information is integrated over a sequence of the one-second epochs, to produce a model of carrier phase. The sequence may include 10-100 epochs, or seconds. The model of carrier phase smoothing is used as the reconstructed carrier phase information.

In operation 504B of FIG. 5B, the modeled carrier phase, which is also referred to as "reconstructed carrier phase information", is supplied to pseudorange-carrier-phase-smoothing-logic 152. As described above, method of flowchart 500B can be implemented at GPS/GNSS reference stations 220 and the reconstructed carrier phase information can then be broadcast to cellular device 100, 200.

Method of Extracting Pseudorange Information

FIG. 6 depicts a flowchart 600 of a method of extracting pseudorange information using a cellular device, according to one embodiment.

At 610, the method begins.

At 620, the cellular device 100, 200 accesses the GNSS chipset 170 embedded within the cellular device 100, 200 where the GNSS chipset 170 calculates pseudorange information for use by the GNSS chipset 170. For example, the GNSS receiver 107 can perform GPS measurements to derive raw measurement data for a position of the cellular device 100. The raw measurement data provides an instant location of the cellular device 100. The GNSS chipset 170 calculates pseudorange information that is for use by the GNSS chipset 170. According to one embodiment, the raw measurement data is the pseudorange information that will be extracted. Examples of pseudorange information are uncorrected pseudorange information, differential GNSS corrections, high precision GNSS satellite orbital data, GNSS satellite broadcast ephemeris data, and ionospheric projections.

A chipset accessor logic 141, according to one embodiment, is configured for accessing the GNSS chipset 170. According to one embodiment, the chipset accessor logic 141 is a part of an SUPL client 101.

The pseudorange information can be obtained from the processor 172 of the GNSS receiver 107 using a command. The GNSS chipset 170 may be designed, for example, by the manufacturer of the GNSS chipset 170, to provide requested information, such as pseudorange information, in response to receiving the command. The pseudorange information may be extracted from the GNSS chipset 170 using the command that the manufacturer has designed the GNSS chipset 170 with. For example, according to one embodiment, the GNSS chipset 170 is accessed using an operation that is a session started with a message that is an improved accuracy Secure User Platform Location (SUPL) start message or a high precision SUPL INIT message. According to one embodiment, the message is a custom command that is specific to the GNSS chipset 170 (also referred to as "a GNSS chipset custom command") and the improved accuracy SUPL client 101 can access to the raw measurements of the GNSS chipset 170.

Examples of chipset manufacturers include Qualcomm, Texas Instruments, FastraX, Marvel, SIRF, Trimble, SONY, Furuno, Nemerix, Phillips, and XEMICS, to name a few.

At 630, the cellular device 100, 200 extracts the pseudorange information from the GNSS chipset 170 for use elsewhere in the cellular device 100, 200 outside of the GNSS chipset 170. For example, pseudorange information extractor logic 142 may be associated with a worker thread of the SUPL client 101. The worker thread associated with the SUPL client 101 can monitor the raw measurements delivered by the GNSS chipset 170 into the GNSS chipset 170's memory buffers, cache the raw measurements and use the raw measurements to determine a position fix. The pseudorange information extractor logic 142 and the pseudorange information processing logic 150 can be associated with the worker thread. For example, the pseudorange information extractor logic 142 can cache the raw measurements and the pseudorange information processing logic 150 can determine the location.

According to one embodiment, the raw measurement data is the pseudorange information that is extracted. According to one embodiment, the raw measurement data is pseudorange information that is calculated by the GNSS chipset 170 and is only for use by the GNSS chipset 170.

According to one embodiment, a determining position fix logic 170B may perform a least squares solution 171B on the extracted pseudorange information prior to transmitting the output to the pseudorange information bridger logic 143. According to another embodiment, the extracted pseudorange information is improved using various embodiments described in FIGS. 7A-10 prior to performing a least squares solution 171B, as will be described herein.

Methods of Improving Position Accuracy of Extracted Pseudorange Information

The extracted pseudorange information without further improvements can be used to provide an instant location, as described herein. The extracted pseudorange information can be improved by applying position accuracy improvements that include, but are not limited to, those depicted in Tables 2 and 3. The instant location or the improved location can be communicated to location manager logic 161, as discussed herein, that displays the instant location or the improved location with respect to a map.

FIG. 7A depicts a flowchart 700A of a method of improving the position accuracy using one or more position accuracy improvements, according to one embodiment.

At 710A, the method begins.

At 720A, the pseudorange-correction-logic 151 provides Wide Area Augmentation System (WAAS) corrected pseudoranges by applying WAAS corrections to the extracted pseudorange information. For example, the pseudorange-correction-logic 151 receives the extracted pseudorange information that was extracted from the GNSS chipset 170 at 630 of FIG. 6. The cellular device 100, 200 receives the WAAS corrections, as described herein, and provides the WAAS corrections to the pseudorange-correction-logic 151. The pseudorange-correction-logic 151 provides Wide Area Augmentation System (WAAS) corrected pseudoranges by applying the received WAAS corrections to the extracted pseudorange information.

At 730A the method ends.

FIG. 7B depicts a flowchart 700B of a method of improving the position accuracy using one or more position accuracy improvements, according to one embodiment.

At 710B, the method begins.

At 720B, the pseudorange-carrier-phase-smoothing-logic 152 provides smoothed pseudorange information by performing pseudorange smoothing on the extracted pseudorange information based on carrier phase information. For example, if real carrier phase information is available, the cellular device 100, 200 can extract it as discussed herein. Otherwise, the cellular device 100, 200 can derive reconstructed carrier phase information as described herein and provide the reconstructed carrier phase information to the pseudorange-carrier-phase-smoothing-logic 152. The pseudorange-carrier-phase-smoothing-logic 152 can receive the extracted pseudorange information that was extracted from the GNSS chipset 170 at 630 of FIG. 6. The pseudorange-carrier-phase-smoothing-logic 152 can apply either the real carrier phase information or the real carrier phase information to the extracted pseudorange information to provide smoothed pseudorange information.

At 730B, a position fix is determined based on the smoothed pseudorange information and WAAS pseudorange corrections. For example, the pseudorange-correction-logic 151 receives the smoothed pseudorange information and receives WAAS pseudorange corrections and determines a position fix based on the smoothed pseudorange information and the WAAS pseudorange corrections.

At 740B, the method ends.

According to one embodiment, a determining position fix logic 170B may perform a least squares solution 171B on the output of flowchart 700A and 700B prior to transmitting the output to the pseudorange information bridger logic 143.

FIG. 8A depicts a flowchart 800A of a method of improving the position accuracy using one or more position accuracy improvements, according to one embodiment.

At 810A, the method begins.

At 820A, the pseudorange-correction-logic 151 provides Differential Global Positioning System (DGPS) corrected pseudoranges by applying DGPS corrections to the extracted pseudorange information.

For example, the pseudorange-correction-logic 151 receives the extracted pseudorange information that was extracted from the GNSS chipset 170 at 630 of FIG. 6. The cellular device 100, 200 receives the DGPS corrections as described herein and provides the DGPS corrections to the pseudorange-correction-logic 151. The pseudorange-correction-logic 151 provides Differential Global Positioning System (DGPS) corrected pseudoranges by applying the received DGPS corrections to the extracted pseudorange information.

At 830A, the pseudorange-correction-logic 151 provides WAAS-DGPS corrected pseudoranges by applying Wide Area Augmentation System (WAAS) to the DGPS corrected pseudoranges.

For example, the pseudorange-correction-logic 151 accesses the DGPS corrected pseudoranges determined at 820A of FIG. 8A. The cellular device 100, 200 receives the WAAS corrections as described herein and provides the WAAS corrections to the pseudorange-correction-logic 151. The pseudorange-correction-logic 151 provides WAAS-DGPS corrected pseudoranges by applying Wide Area Augmentation System (WAAS) to the DGPS corrected pseudoranges.

At 840A, the method ends.

FIG. 8B depicts a flowchart 800B of a method of improving the position accuracy using one or more position accuracy improvements, according to one embodiment.

At 810B, the method begins.

At 820B, a position determination decision is made as to whether to proceed to 822B or 824B. For example, at operation 820B, the position accuracy improvement determination logic 180B can determine whether to proceed to 822B or 824B as discussed herein.

At 830B, DGPS corrected smoothed pseudoranges are provided by applying corrections to the smoothed pseudorange information. For example, the pseudorange-correction-logic 151 can provide DGPS corrected smoothed pseudoranges by applying DGPS corrections to the smoothed pseudoranges determined at either 822B or 824B.

At 840B, WAAS-DGPS corrected smoothed pseudoranges are provided by applying WAAS to the DGPS corrected smoothed pseudoranges. For example, the pseudorange-correction-logic 151 can provide WAAS-DGPS corrected smoothed pseudoranges by applying WAAS corrections to the DGPS corrected smoothed pseudoranges.

At 850B, the method ends.

According to one embodiment, a determining position fix logic 170B may perform a least squares solution 171B on the output of flowcharts 800A or 800B prior to transmitting the output to the pseudorange information bridger logic 143.

FIG. 9A depicts a flowchart 900A of a method of improving the position accuracy using one or more position accuracy improvements, according to one embodiment.

At 910A, the method begins.

At 920A, DGPS corrected pseudoranges are determined by applying DGPS pseudorange corrections to extracted pseudorange information. For example, the pseudorange-correction-logic 151 receives extracted pseudorange information from the pseudorange information extractor logic 142 and applies the DGPS pseudorange corrections to the extracted pseudorange information.

At 930A, the pseudorange-correction-logic 151 can determine a position fix based on the DGPS corrected pseudoranges and PPP corrections.

At 940A, the method ends.

FIG. 9B depicts a flowchart 900B of a method of improving the position accuracy using one or more position accuracy improvements, according to one embodiment.

At 910B, the method begins.

At 920B, smoothed pseudorange information is provided by performing pseudorange smoothing on the extracted pseudorange information using carrier phase information. For example, the pseudorange-carrier-phase-smoothing-logic 152 provides smoothed pseudorange information by performing pseudorange smoothing on the extracted pseudorange information, which can be obtained as discussed herein, based on carrier phase information. If real carrier phase information is available, the cellular device 100, 200 can extract the real carrier phase information, as discussed herein. Otherwise, the cellular device 100, 200 can derive reconstructed carrier phase information, as described herein, and provide the reconstructed carrier phase information to the pseudorange-carrier-phase-smoothing-logic 152.

At 930B, DGPS corrected smoothed pseudoranges are provided by applying DGPS pseudorange corrections to the smoothed pseudorange information. For example, the pseudorange-correction-logic 151 can receive the smoothed pseudorange information from the pseudorange-carrier-phase-smoothing-logic 152. The pseudorange-correction-logic 151 can determine the corrected smoothed pseudoranges by applying DGPS pseudorange corrections to the smoothed pseudorange information.

At 940B, a position fix can be determined based on the DGPS corrected smoothed pseudoranges and PPP corrections. For example, the pseudorange-correction-logic 151 can determine a position fix based on the DGPS corrected smoothed pseudoranges and PPP corrections.

At 950B, the method ends.

According to one embodiment, a determining position fix logic 170B may perform a least squares solution 171B on the output of flowcharts 900A and 900B prior to transmitting the output to the pseudorange information bridger logic 143.

Figure 10:
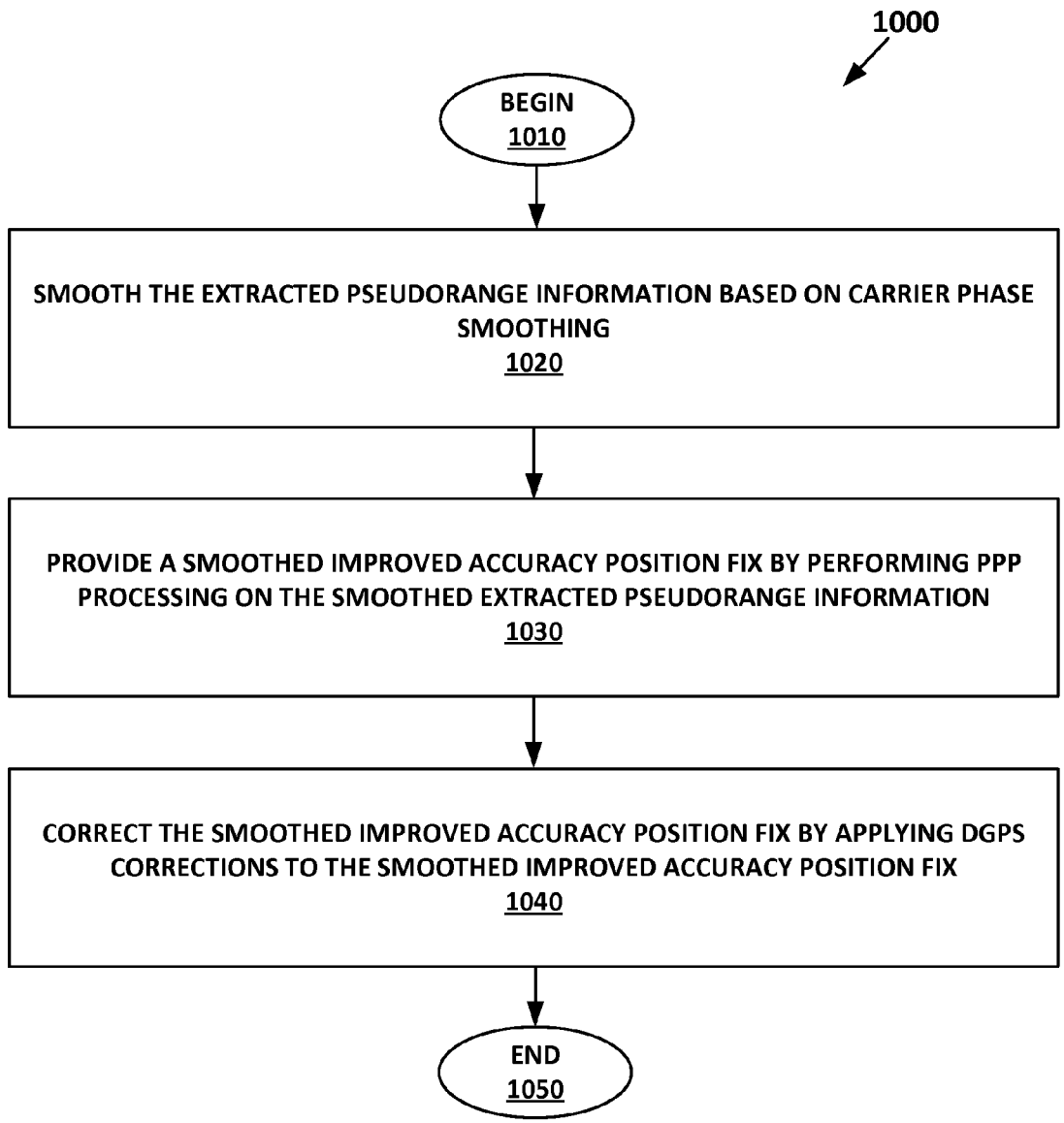

FIG. 10 depicts a flowchart 1000 of a method of improving the position accuracy using one or more position accuracy improvements, according to one embodiment.

At 1010, the method begins.

At 1020, the pseudorange-carrier-phase-smoothing-logic 152 smoothes the extracted pseudorange information based on carrier phase smoothing. For example, the pseudorange-carrier-phase-smoothing-logic 152 receives extracted pseudorange information from the pseudorange information extractor logic 142 and receives carrier phase information, which may be either real carrier phase information or reconstructed carrier phase information, as described herein. The pseudorange-carrier-phase-smoothing-logic 152 smoothes the extracted pseudorange information based on carrier phase smoothing.

At 1030, the PPP logic 151C provides a smoothed improved accuracy position fix by performing Precise Point Positioning (PPP) processing on the smoothed extracted pseudorange information. For example, the PPP logic 151C receives the smoothed extracted pseudorange information provided by the pseudorange-carrier-phase-smoothing-logic 152 at 1020. The PPP logic 151C provides a smoothed improved accuracy position fix by performing Precise Point Positioning (PPP) processing on the smoothed extracted pseudorange information At 1040, the pseudorange-correction-logic 151 can optionally correct the smoothed improved accuracy position fix by applying Differential Global Positioning System (DGPS) corrections to the smoothed improved accuracy position fix. For example, pseudorange-correction-logic 151 receives the smoothed improved accuracy position fix provided by the PPP logic 151C at 1030. The pseudorange-correction-logic 151 receives DGPS corrections as described herein. The pseudorange-correction-logic 151 corrects the smoothed improved accuracy position fix by applying Differential Global Positioning System (DGPS) corrections to the smoothed improved accuracy position fix, thus, providing a corrected smoothed improved accuracy position fix. Operation 1040 is optional, according to one embodiment.

At 1050, the method ends.

According to one embodiment, a determining position fix logic 170B may perform a least squares solution 171B on the output of flowchart 1000 prior to transmitting the output to the pseudorange information bridger logic 143.

Figure 11:
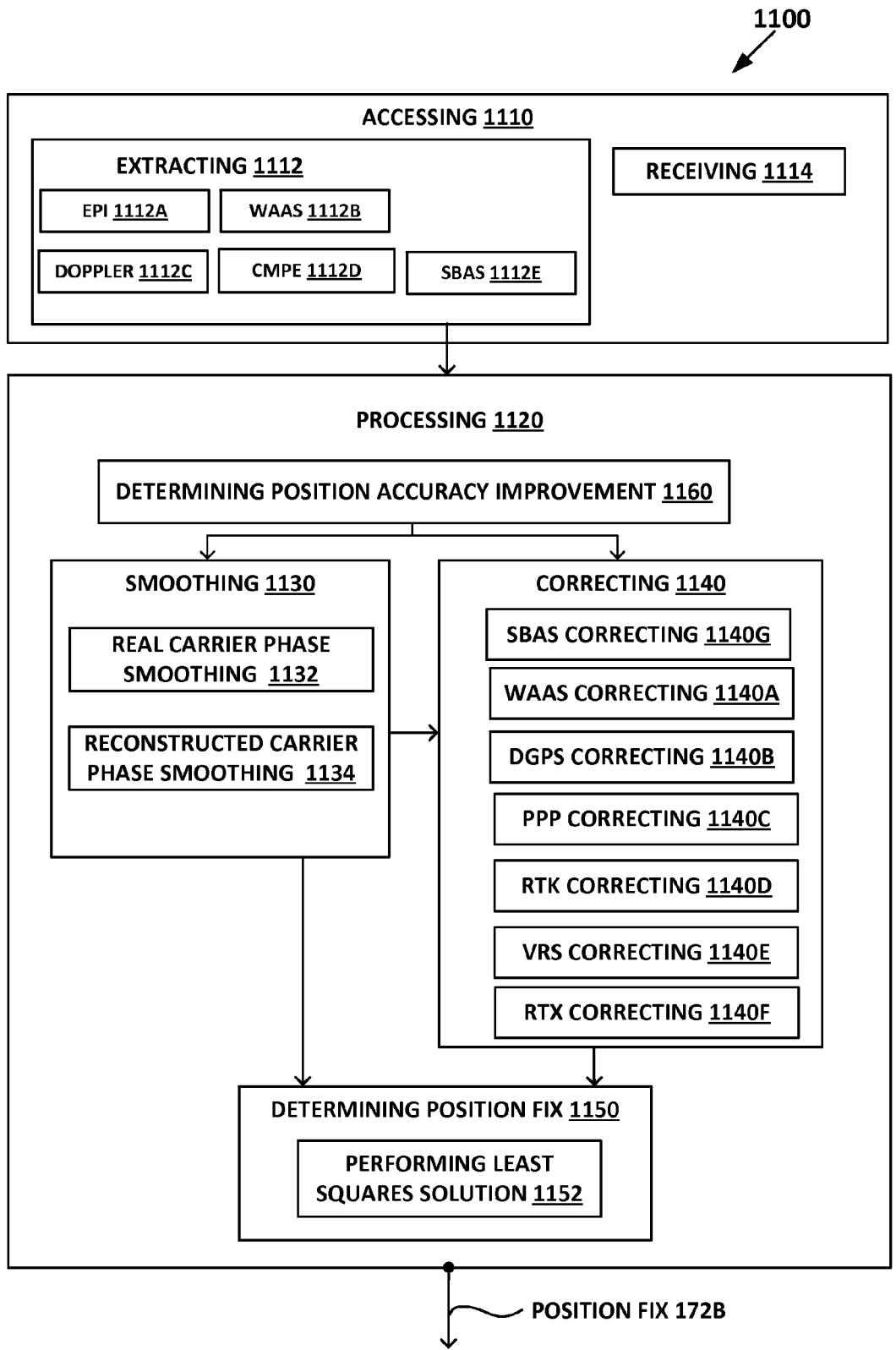
FIG. 11 depicts a flowchart a method of accessing and processing extracted pseudorange information, according to one embodiment.

FIG. 11 depicts a flowchart 1100 of a method of accessing and processing extracted pseudorange information, according to one embodiment.

At 1110, various types of information can be accessed. Examples of accessing are extracting 1112 information and receiving 1114 information. Unsmoothed uncorrected pseudorange information can be extracted at 1112A, WAAS corrections can be extracted at 1112B, SBAS corrections can be extracted at 1112E, Doppler shift can be extracted at 1112C, and carrier phase measurements can be extracted at 1112D. "Accessing" and "obtaining" can be used interchangeably. Table 1 depicts types of information that can be extracted at operation 1112 from the GNSS chipset 170 and types of information that are received at operation 1114 instead of being extracted. However, various embodiments are not limited to the types of information that can be extracted or received depicted in Table 1.

The received or extracted information or a combination thereof, can be processed at 1120.

What or whether to apply position accuracy improvements can be determined at 1160, for example, by the position accuracy improvement determination logic 180B. Examples of position accuracy improvements are real carrier phase information, reconstructed carrier phase information, WAAS, SBAS, DGPS, PPP, RTK, VRS and RTX™ corrections. The determination logic 180B can determine whether one or more and in what order logics 152A, 152B, 151A-151F are performed, according to one embodiment. Tables 2 and 3 are examples of carrier phase information or corrections or a combination thereof, that the position accuracy improvement determination logic 180B may determine, as discussed herein.

The information can be smoothed at 1130. Examples of smoothing 1130 are real carrier phase smoothing 1132 and reconstructed carrier phase smoothing 1134.

Either unsmoothed information or smoothed information can be corrected at 1140. For example, unsmoothed information from 1110 or smoothed information from 1130 can be corrected at 1140. Examples of correcting are SBAS correcting 1140G, WAAS correcting 1140A, DGPS correcting 1140B, PPP correcting 1140C, RTK correcting 1140D, VRS correcting 1140E, and RTX correcting 1140F. The smoothed information or unsmoothed information can be corrected using one or more of operations 1140A-1140G. According to one embodiment, WAAS correcting 1140A is an example of SBAS correcting 1140G.

Unsmoothed information from 1110, smoothed information from 1112, corrected unsmoothed information from 1140 or corrected smoothed information from 1140 can be used to determine a position fix 172B at 1150, for example, by performing a least squares solution 171B at 1152. The output of flowchart 1100 is a position fix 172B. Table 2 and Table 3 depict combinations of information that result in a position fix 172B, according to various embodiments.

According to one embodiment, accessing 1110, extracting 1112, extracting pseudorange information 1112A, extracting SBAS 1112E, extracting WAAS 1112B, extracting Doppler 1112C, extracting carrier phase measurement 1112D, receiving 1114, smoothing 1130, correcting 1140, determining a position fix 1150, and performing a least squares solution 1152 can be performed respectively by logic 110B, 142, 112B-5, 112B-2, 112B-3, 112B-4, 114B, 150, 152, 151, and 170B. Real carrier phase smoothing 1132, reconstructed carrier phase smoothing 1134, correcting 1140A-1140G can be performed respectively by logic 152A, 152B, 151A-151E, 151F, 151G.

Any one or more of 1112, 1112A-1112E, 1132, 1134, 1140A-1140G can be performed. Further, any one or more of 1112, 1112A-1112E, 1112B, 1112C, 1112E, 1132, 1134, 1140A-1140G can be performed in various orders. Various embodiments are not limited to just the combinations that are described herein.

According to one embodiment, a Global Navigation Satellite System (GNSS) chipset embedded within the cellular device is accessed at 620 (FIG. 6) where the GNSS chipset calculates pseudorange information for use by the GNSS chipset. The pseudorange information is extracted at 640 (FIG. 6), 112 (FIG. 11) from the GNSS chipset for use elsewhere in the cellular device outside of the GNSS chipset. The accessing 620 and the extracting 640, 1112A can be performed by the cellular device 100, 200 that includes hardware 180.

The extracted pseudorange information can be smoothed at 1130. The smoothing 1130 can be based on reconstructed carrier phase information or real carrier phase information. The smoothed pseudorange information can be corrected at 1140. Examples of the types of corrected pseudoranges are Wide Area Augmentation System (WAAS), Differential Global Positioning System (DGPS), Precise Point Positioning (PPP), and Real Time Kinematic (RTK). Pseudorange corrections can be accessed 1110. The corrected pseudorange information can be derived, for example at 1140, by applying the pseudorange corrections to the extracted pseudorange information.

FIGS. 4-11 depict flowcharts 400-1100, according to one embodiment. Although specific operations are disclosed in flowcharts 400-1100, such operations are exemplary. That is, embodiments described herein are well suited to performing various other operations or variations of the operations recited in flowcharts 400-1100. It is appreciated that the operations in flowcharts 400-1100 may be performed in an order different than presented, and that not all of the operations in flowcharts 400-1100 may be performed.

The operations depicted in FIGS. 4-11 transform data or modify data to transform the state of a cellular device 100, 200. For example, by extracting pseudorange information from a GNSS chipset 170 for use elsewhere, the state of the cellular device 100, 200 is transformed from a cellular device that is not capable of determining a position fix itself into a cellular device that is capable of determining a position fix itself. In another example, operations depicted in flowcharts 400-1100 transform the state of a cellular device 100, 200 from not being capable of providing an improved accuracy position fix to be capable of providing an improved accuracy position fix.

The above illustration is only provided by way of example and not by way of limitation. There are other ways of performing the method described by flowcharts 400-1100.

The operations depicted in FIGS. 4-11 can be implemented as computer readable instructions, hardware or firmware. According to one embodiment, hardware associated with a cellular device 100, 200 can perform one or more of the operations depicted in FIGS. 4-11.

Example GNSS Receiver

Figure 12:
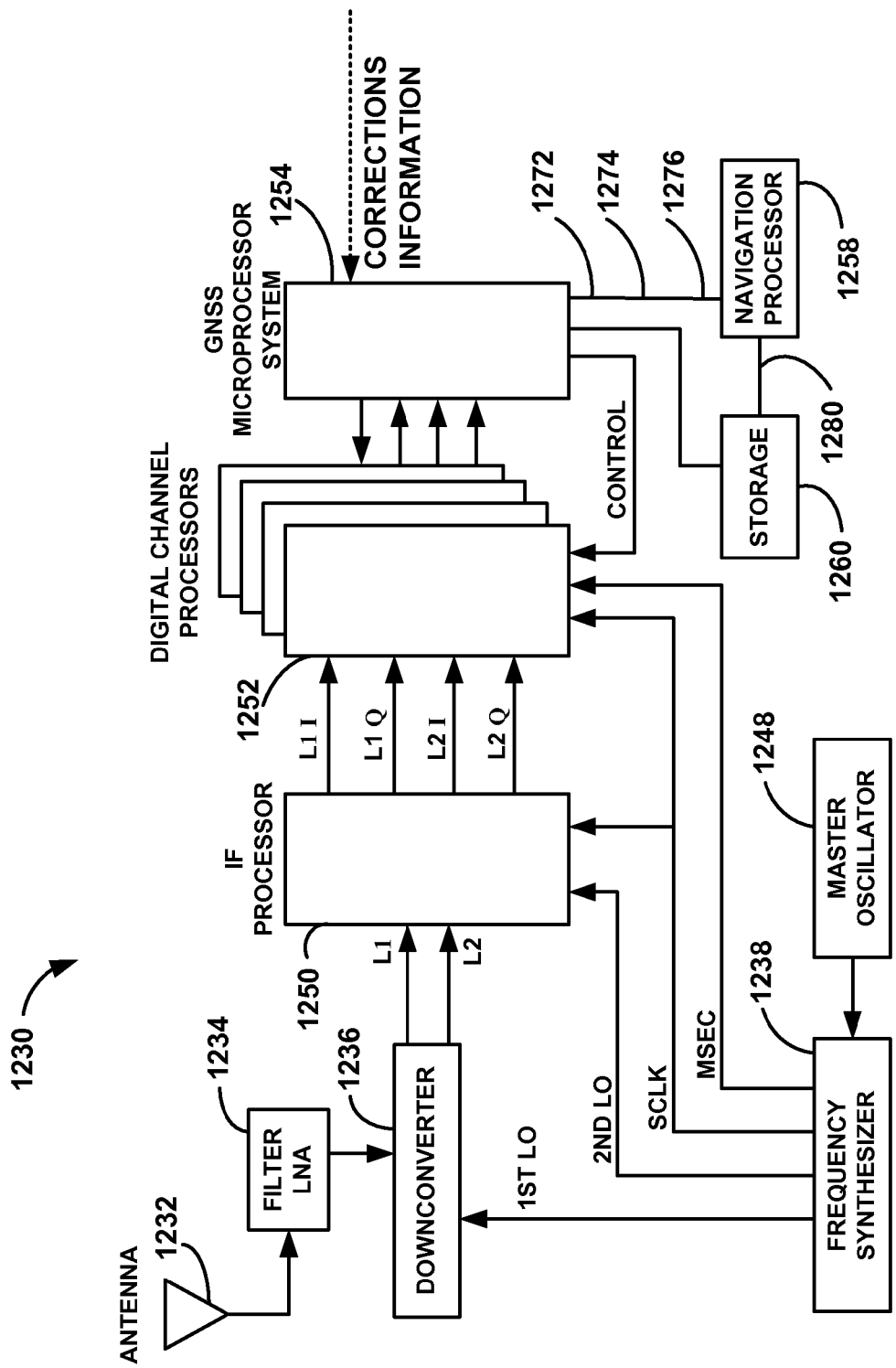
FIG. 12 depicts a block diagram of a GNSS receiver, according to one embodiment.

With reference now to FIG. 12, a block diagram is shown of an embodiment of an example GNSS receiver which may be used in accordance with various embodiments described herein. In particular, FIG. 12 illustrates a block diagram of a GNSS receiver in the form of a GPS receiver 1230 capable of demodulation of the L1 and/or L2 signal(s) received from one or more GPS satellites. A more detailed discussion of the function of a receiver such as GPS receiver 1230 can be found in U.S. Pat. No. 5,621,416, by Gary R. Lennen, is titled "Optimized processing of signals for enhanced cross-correlation in a satellite positioning system receiver," and includes a GPS receiver very similar to GPS receiver 1230 of FIG. 12.

In FIG. 12, received L1 and L2 signals are generated by at least one GPS satellite. Each GPS satellite generates different signal L1 and L2 signals and they are processed by different digital channel processors 1252 which operate in the same way as one another. FIG. 12 shows GPS signals (L1=1575.42 MHz, L2=1227.60 MHz) entering GPS receiver 1230 through a dual frequency antenna 1232. Antenna 1232 may be a magnetically mountable model commercially available from Trimble Navigation of Sunnyvale, Calif. Master oscillator 1248 provides the reference oscillator which drives all other clocks in the system. Frequency synthesizer 1238 takes the output of master oscillator 1248 and generates important clock and local oscillator frequencies used throughout the system. For example, in one embodiment frequency synthesizer 1238 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1234 performs filtering and low noise amplification of both L1 and L2 signals. The noise figure of GPS receiver 1230 is dictated by the performance of the filter/LNA combination. The downconvertor 1236 mixes both L1 and L2 signals in frequency down to approximately 175 MHz and outputs the analog L1 and L2 signals into an IF (intermediate frequency) processor 1250. IF processor 1250 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1252 inputs the digitally sampled L1 and L2 inphase and quadrature signals. All digital channel processors 1252 are typically are identical by design and typically operate on identical input samples. Each digital channel processor 1252 is designed to digitally track the L1 and L2 signals produced by one satellite by tracking code and carrier signals and to from code and carrier phase measurements in conjunction with the GNSS microprocessor system 1254. One digital channel processor 1252 is capable of tracking one satellite in both L1 and L2 channels. Microprocessor system 1254 is a computing device (such as computer system 1000 of FIG. 10) which facilitates tracking and measurements processes, providing pseudorange and carrier phase measurements for a determining position fix logic 1258. In one embodiment, microprocessor system 1254 provides signals to control the operation of one or more digital channel processors 1252. According to one embodiment, the GNSS microprocessor system 1254 provides one or more of pseudorange information 1272, Doppler Shift information 1274, and real Carrier Phase Information 1276 to the determining position fix logic 1258. One or more of pseudorange information 1272, Doppler Shift information 1274, and real Carrier Phase Information 1276 can also be obtained from storage 1260. One or more of the signals 1272, 1274, 1276 can be conveyed to the cellular device's processor, such as processor 109 (FIG. 1A) that is external to the GNSS chipset 170 (FIG. 1A). Determining position fix logic 1258 performs the higher level function of combining measurements in such a way as to produce position, velocity and time information for the differential and surveying functions, for example, in the form of a position fix 1280. Storage 1260 is coupled with determining position fix logic 1258 and microprocessor system 1254. It is appreciated that storage 1260 may comprise a volatile or non-volatile storage such as a RAM or ROM, or some other computer readable memory device or media. In some embodiments, determining position fix logic 1258 performs one or more of the methods of position correction described herein.

In some embodiments, microprocessor 1254 and/or determining position fix logic 1258 receive additional inputs for use in receiving corrections information. According to one embodiment, an example of the corrections information is WAAS corrections. According to one embodiment, examples of corrections information are differential GPS corrections, RTK corrections, signals used by the previously referenced Enge-Talbot method, and wide area augmentation system (WAAS) corrections among others.

Although FIG. 12 depicts a GNSS receiver 1130 with navigation signals L1I, L1Q, L2I, L2Q, various embodiments are well suited different combinations of navigational signals. For example, according to one embodiment, the GNSS receiver 1130 may only have an L1I navigational signal. According to one embodiment, the GNSS receiver 1130 may only have L1I, L1Q and L2I.

Various embodiments are also well suited for future navigational signals. For example, various embodiments are well suited for the navigational signal L2C that is not currently generally available. However, there are plans to make it available for non-military receivers.

According to one embodiment, either or both of the accessing logic 110B and the processing logic 150 reside at either or both of the storage 1260 and GNSS microprocessor system 1254.

According to one embodiment, the GNSS receiver 1230 is an example of a GNSS receiver 107 (see e.g., FIG. 1A and FIG. 1D). According to one embodiment, the determining position fix logic 1258 is an example of determining position fix logic 170B (FIG. 1B). According to one embodiment, position fix 1280 is an example of a position fix 172B (FIG. 1B).

Kalman Filtering

Figure 13:
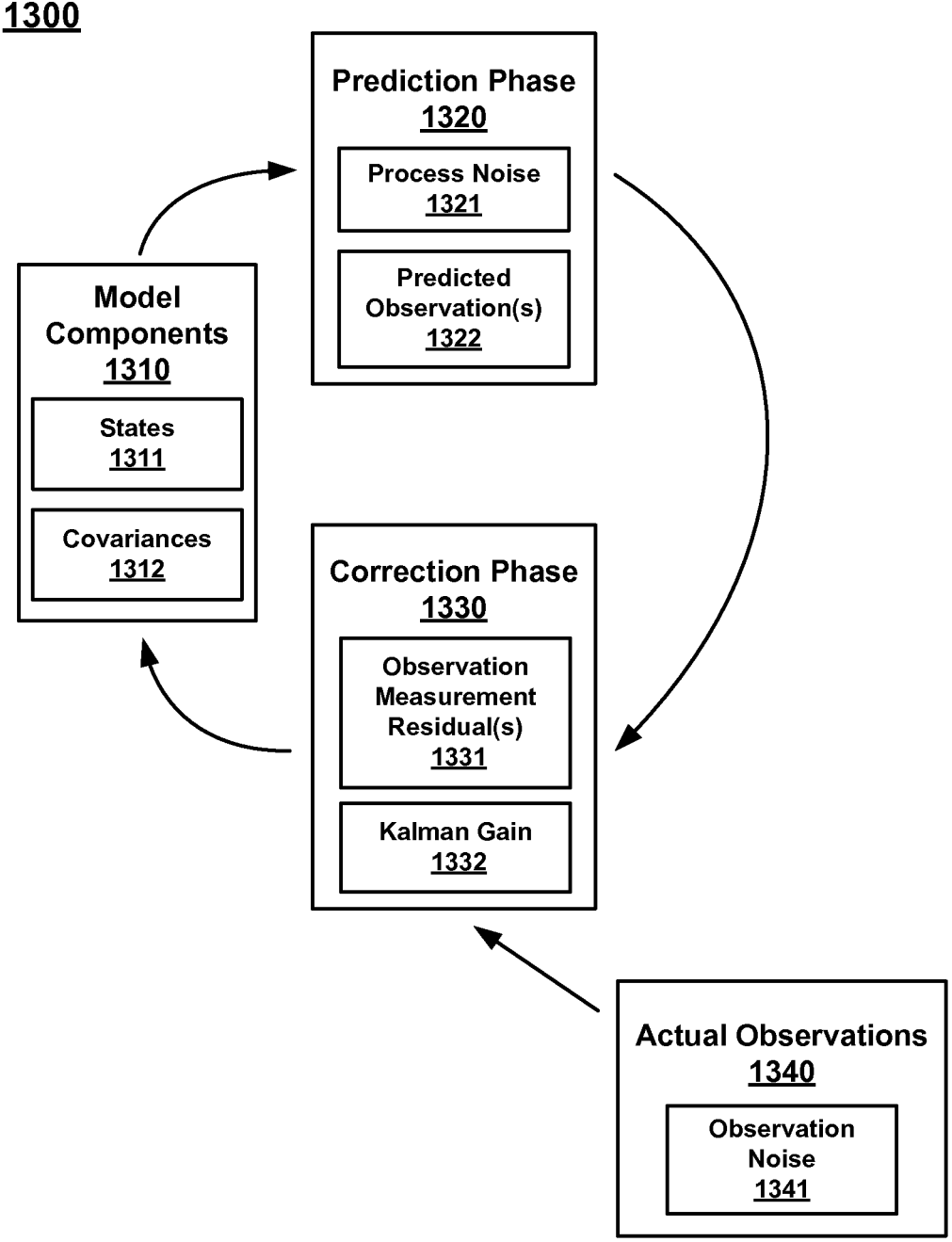
FIG. 13 depicts an example Kalman filtering process, according to various embodiments.

FIG. 13 depicts an example Kalman filtering process 1300, according to some embodiments. It should be appreciated that Kalman filtering is well known. As such, FIG. 13 and the associated discussion are utilized only to provide a high-level general description. Variations in the described procedures will occur during specific implementations of Kalman filtering. The extended Kalman filter and the unscented Kalman filter represent some of the variations to the basic method. Such variations are normal and expected. Generally speaking, Kalman filtering is a basic two-step predictor/corrector modeling process that is commonly used model dynamic systems. A dynamic system will often be described with a series of mathematical models. Models describing satellites in a Global Navigation Satellite System (GNSS) are one example of a dynamic system. Because the position of any satellite and/or the positions of all the satellites in a system constantly and dynamically change and the satellites output a signal that can be measured by a GNSS receiver, Kalman filtering can be used in determining positions of the satellites.

A basic Kalman filter implemented using Kalman filtering process 1300 typically has at least two major components 1310: states 1311 and covariances 1312. States 1311 represent variables that are used to describe a system being modeled, at a particular moment in time. Covariances 1312 are represented in a covariance matrix that describes uncertainty, or lack of confidence, of states 1311 with respect to each other at that same moment in time. Kalman filtering process 1300 also handles noise, or unpredictable variability, in the model. There are two principle types of noise, observation noise 1341 and process noise 1321. A Kalman filter may handle additional noise types, in some embodiments. Process noise 1321 describes noise of the states 1311 as a function of time. Observation noise 1341 is noise that relates to the actual observation(s) 1340 (e.g., observed measurements) that are used as an input/update to Kalman filtering process 1300.

A prediction phase 1320 is the first phase of Kalman filtering process 1300. Prediction phase 1320 uses predictive models to propagate states 1311 to the time of an actual observation(s) 1340. Prediction phase 1320 also uses process noise 1321 and predictive models to propagate the covariances 1312 to time of the actual observation(s) 1340 as well. The propagated states 1311 are used to make predicted observation(s) 1322 for the time of actual observation(s) 1340.

A correction phase 1330 is the second phase in the Kalman filtering process 1300. During correction phase 1330, Kalman filtering process 1300 uses the difference between the predicted observation(s) 1322 and the actual observation(s) 1340 to create an observation measurement residual 1331, which may commonly be called the "measurement residual." Observation noise 1341 can be noise in actual observation(s) 1340 and/or noise that occurs in the process of taking the actual observation(s) 1340. A Kalman gain 1332 is calculated using both the covariances 1312 and the observation noise 1341. The states 1311 are then updated using the Kalman Gain 1332 multiplied by the observation measurement residual 1331. The covariances 1312 are also updated using a function related to the Kalman gain 1332; for example, in one embodiment where Kalman gain is limited to a value between 0 and 1, this function may be 1 minus the Kalman gain. This updating is sometimes referred to as the "covariance update." In some embodiments, if no actual observation 1340 is available, Kalman filtering process 1300 can simply skip correction phase 1330 and update the states 1311 and covariances 1312 using only the information from prediction phase 1320, and then begin again. Using the new definitions of the states 1311 and covariances 1312, Kalman filtering process 1300 is ready to begin again and/or to be iteratively accomplished.

Computer Readable Storage Medium

Unless otherwise specified, any one or more of the embodiments described herein can be implemented using non-transitory computer readable storage medium and computer readable instructions which reside, for example, in computer-readable storage medium of a computer system or like device. The non-transitory computer readable storage medium can be any kind of physical memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments described herein are realized, in some instances, as a series of computer readable instructions (e.g., software program) that reside within non-transitory computer readable storage memory of a cellular device 100, 200 (FIGS. 1A-2) and are executed by a hardware processor of the cellular device 100, 200. When executed, the instructions cause a computer system to implement the functionality of various embodiments described herein. For example, the instructions can be executed by a central processing unit associated with the cellular device 100, 200. According to one embodiment, the non-transitory computer readable storage medium is tangible.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause the cellular device 100, 200 to implement the functionality of various embodiments. For example, according to one embodiment, the SUPL client 101 and the operations of the flowcharts 400-1100 depicted in FIGS. 4-11 are implemented with computer readable instructions that are stored on computer readable storage medium, which can be tangible or non-transitory or a combination thereof, and can be executed by a hardware processor 109 of a cellular device 100, 200. According to one embodiment, the non-transitory computer readable storage medium is tangible.

GNSS Receiver Positioning System

Figure 14:
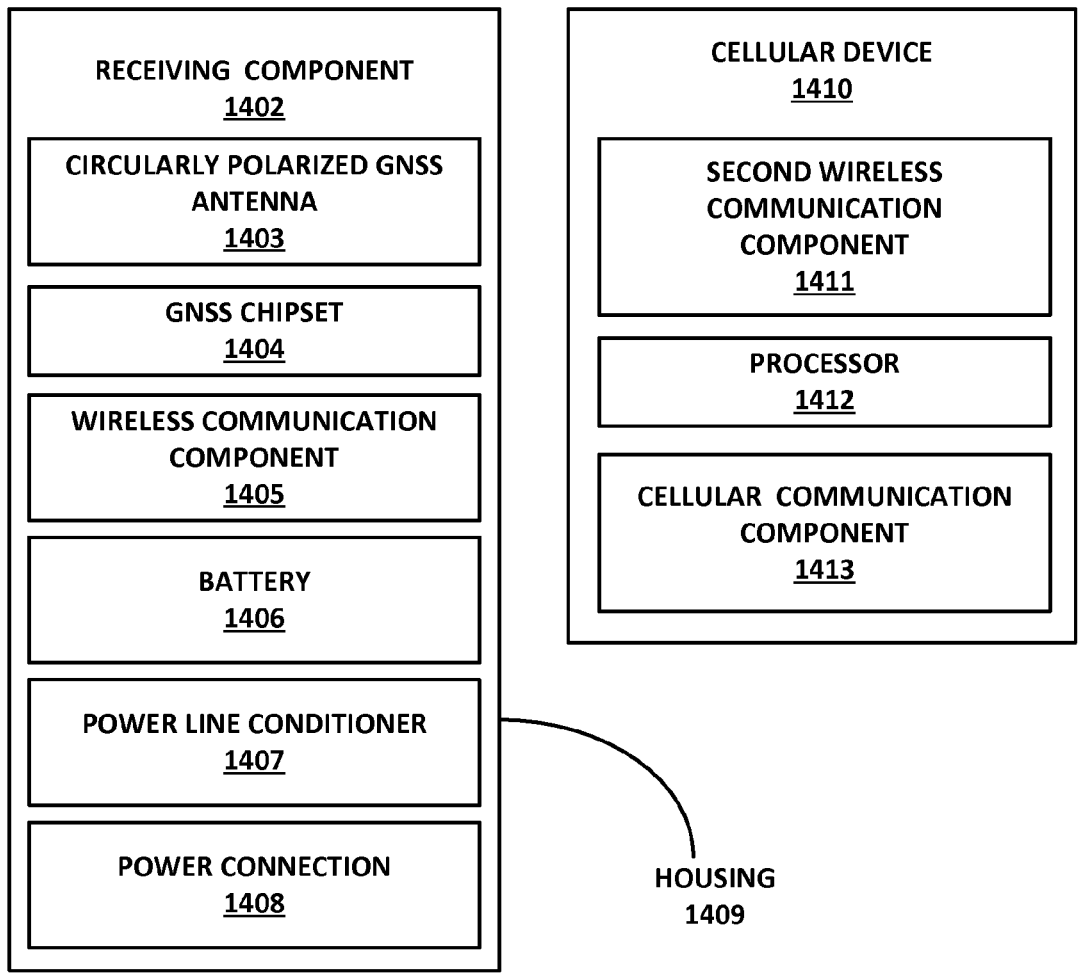
FIG. 14 is a block diagram of components of a GNSS receiver positioning system in accordance with various embodiments.

FIG. 14 is a block diagram of components of a GNSS positioning system 1400 in accordance with various embodiments. In FIG. 14 GNSS positioning system 1400 comprises receiving component 1402 and a cellular device 1410. In accordance with various embodiments, receiving component 1402 is a stand-alone device which can be coupled via a wireless communication link with cellular device 1410 to provide improved reception of GNSS satellite signals, thereby improving the performance of cellular device 1410 in deriving a position fix. In accordance with various embodiments, receiving component 1402 can be coupled with other devices and/or articles of clothing using, for example, hook and loop (e.g., Velcro®) strips, adhesives, mechanical fasteners, snap fit, receptacles, or the like, or integrated into those devices such as in a dedicated compartment. As will be described in greater detail below, in various embodiments receiving component 1402 is disposed in such a manner as to provide a better view of the sky which in turn results in better reception of radio signals of GNSS satellites which are in view. In accordance with at least one embodiment, receiving component 1402 comprises a circularly polarized (CP) GNSS antenna 1403 typically realized in a flat "patch" configuration, but may also be realized in a quadrifiler helix configuration, a GNSS chipset 1404, and a wireless communication component 1405 There are a variety of antenna designs which can be implemented as GNSS antenna 1403 in accordance with various embodiments such as, but not limited to, patch antennas, quadrifiler helix antennas, and planar quadrifiler antennas. In typical GNSS antennas currently used in cellular devices, the GNSS antenna is usually configured for linear polarization and not a circularly polarized design. This results in a significant loss of signal from orbiting GNSS satellites, at least 3 dB. However, receiving component 1402 utilizes a circularly polarized GNSS antenna such as circularly polarized GNSS antenna 1403 to provide better signal reception than would typically be exhibited by a cellular device. In various embodiments, GNSS chipset 1404 comprises the GNSS chipset of the type that may be found in a cellular telephone, or the GNSS chipset of a dedicated GNSS handheld data collector. In other words, in accordance with one embodiment, GNSS chipset 1404 solely comprises the components of a GNSS receiver such as described above with reference to FIG. 12. Due to the increasing use of location-services applications, GNSS chipsets are in widespread use in virtually every type of handheld device being manufactured including, but not limited to cellular telephones, digital cameras, etc. As a result, the cost, size, and weight of GNSS chipsets has dropped. As an example, a cellular telephone GNSS chipset can have a footprint as small as 25 mm². Thus, integrating a GNSS chipset into receiving component 1402 does not incur a significant penalty in terms of size or weight. In another embodiment, GNSS chipset 1404 comprises a complete integrated circuit component as in use in cellular telephones including integrated circuits for GNSS signal processing, cellular communications, processor(s), and other short-range wireless communication links as will be discussed in greater detail below.

The GNSS chipset normally processes the GNSS signals from space to determine a number of signal observables, referred to a raw GNSS observables, which include pseudoranges for up to 12 satellites that may be in view, Doppler shift information for each satellite signal, or signals in the case of dual frequency L1 and L2 tracking, and carrier phase information for each signal being tracked. These observables may be processed locally in the chipset via stored program algorithms, or in an embodiment, transferred from the chipset to a nearby cellular phone for enhanced processing via the services available in the cellphone.

Wireless communication component 1405 comprises a wireless radio transmitter, or transceiver configured to transmit GNSS data including, but not limited to, raw GNSS observables from GNSS chipset 1404 to cellular device 1410. In accordance with various embodiments, wireless communication component 1405 may operate on/in compliance with any suitable wireless communication protocol including, but not limited to: mesh networking, implementations of the IEEE 802.15.4 specification for personal area networks, and implementations of the Bluetooth® standard. Personal area networks refer to short-range, and often low-data-rate, wireless communications networks. In accordance with embodiments of the present technology, components of a wireless personal area network are configured for automatic detection of other components and for automatically establishing wireless communications. In another embodiment, receiving component 1402 may also include another wireless communication component (not shown) which is capable of communicating across longer distances. This second wireless communication component of receiving component 1402, when included, may operate on any suitable wireless communication protocol including, but not limited to: Wi-Fi, WiMAX, WWAN, implementations of the IEEE 802.11 specification, cellular, two-way radio, and satellite-based cellular (e.g., via the Inmarsat or Iridium communication networks). The discussion above and the depiction in FIG. 14 indicates that all of the sub-components of receiving component 1402 are disposed proximate to each other, or within a single unit; however, in various embodiments, the components of receiving component 1402 can be distributed, but are not components of cellular device 1410 itself.

It is noted that in accordance with various embodiments, GNSS chipset 1404 and wireless communication component 1405 are integrated as components of a larger chipset such as a cellular telephone chipset having cellular communication, GNSS, processing, and Bluetooth®/wireless personal area network capabilities integrated into a single product. Additionally, various embodiments can utilize GNSS chipsets of varying quality as GNSS chipset 1404. For example, there is a wide range of capabilities and prices of GNSS chipsets on the market today ranging from a few dollars to a hundred dollars or more depending in part upon what features are supported by the chipset. Cellular device GNSS chipsets are typically configured to deliver an "abbreviated feature set." In an embodiment, GNSS chipset 1404 may be configured and accessed to obtain raw GNSS observables data by other devices within the network, in manners described herein, for further processing. This additional, further processing is due to processing limitations of the chipset. Thus, while it may be possible for receiving component 1402 to derive its own position in one or more embodiments, or be capable of more advanced operations, it instead is used to derive data such as raw pseudorange information and carrier phase information which is then wirelessly transmitted to cellular device 1410 for further processing. In at least one embodiment, receiving component 1402 also wirelessly transmits other data to cellular device 1410 such as, but not limited to, Doppler frequency shift data. In FIG. 14, receiving component 1402 further comprises a battery 1406, a power line conditioner 1407, and a power connection 1408. Battery 1406 is for providing power to receiving component 1402. Power line conditioner 1407 is for converting and/or conditioning power received via power connection 1408 to a proper voltage and/or characteristics suitable for re-charging battery 1406, or for directly powering receiving component 1402. In accordance with various embodiments, circularly polarized GNSS antenna 1403, GNSS chipset 1404, wireless communication component 1405, battery 1406, power line conditioner 1407, and power connection 1408 are disposed within a housing 1409. In accordance with one or more embodiments, power connection 1408 comprises a power socket configured to receive a power plug. In accordance with at least one embodiment, power connection 1408 comprises a wireless power connection such as, for example, an inductive power charger, or a capacitive power charger. In accordance with various embodiments, power line conditioner 1407 may be an optional component in the event that the power connection is configured to provide voltage in accordance with the requirements of receiving component 1402.

In accordance with various embodiments, cellular device 1410 comprises a cellular telephone, a dedicated GNSS data collector, or another portable electronic device configured to communicate via a cellular network. For example, cellular device 1410 can be implemented as cellular device 100 of FIG. 1A, SOCS 190 of FIG. 1D, cellular device 200 of FIG. 2, etc. Furthermore, it is noted that all of the functionality described above with reference to improved accuracy SUPL client 101, as well as all components thereof, and operating system 160 and its sub-components are operable upon cellular device 1410. In FIG. 14, cellular device 1410 comprises second wireless communication component 1411, processor 1412, and cellular communication component 1413. In various embodiments, second wireless communication component 1411 is configured to wirelessly communicate with wireless communication component 1405 of receiving component 1402. Thus, second wireless communication component 1411 may also operate on/in compliance with any suitable wireless communication protocol including, but not limited to: mesh networking, implementations of the IEEE 802.15.4 specification for personal area networks, and implementations of the Bluetooth® standard as appropriate to communicate with wireless communication component 1405. Processor 1412 is configured to process data conveyed from receiving component 1402 via second wireless communication component 1411 to determine the location of GNSS antenna 1403. It is noted that processor 1412 is analogous with processor 109 described above with reference to FIGS. 1A, 1D, and FIG. 2. Cellular communication component 1413 may operate on any suitable wireless communication protocol including, but not limited to: Wi-Fi, WiMAX, WWAN, implementations of the IEEE 802.11 specification, cellular, two-way radio, FM radio, and satellite-based cellular (e.g., via the Inmarsat or Iridium communication networks) and is operable for receiving pseudorange correction data from various sources including, but not limited to, WAAS pseudorange corrections, DGPS pseudorange corrections, and PPP pseudorange corrections.

In operation, GNSS antenna 1403 receives GNSS signals from GNSS satellites in view. As will discussed in greater detail below, due to its disposition apart from cellular device 1410, receiving component 1402 is better located to receive GNSS signals than may be the case using a cellular telephone, or other portable electronic device, alone. As stated above, in at least one embodiment, GNSS chipset 1404 comprises a GNSS chipset operable for processing the respective GNSS signals received by GNSS antenna 1403. In one embodiment, GNSS chipset 1404 provides one or more of pseudorange information, Doppler shift information, and real carrier phase information to wireless communication component 1405 which in turn forwards that data to cellular device 1410 via second wireless communication component 1411. In one embodiment, this can be performed automatically and this automatic forwarding of data from receiving component 1402 can be initiated when a cellular device 1410 is detected in the vicinity. This can further comprise a login/handshake procedure. In another embodiment, chipset accessor logic 141 is configured to access the GNSS chipset comprising GNSS chipset 1404. Thus, chipset accessor logic 141 will generate a message which initiates the sending of pseudorange data from receiving component 1402. Furthermore, accessing logic 1110-B can initiate accessing carrier phase data from receiving component 1402. In response to requests for this data, GNSS chipset 1404 can process the signals from the GNSS satellites in view and send the pseudorange and carrier phase data to cellular device 1410 via wireless communication component 1405. Processor 1412 of cellular device 1410 can then use this data to derive the position of GNSS antenna 1403. Additionally, using pseudorange corrections received via cellular communication component 1413, cellular device 1410 can further refine the processing of received GNSS signals as described above.

Unless otherwise specified, one or more of the various embodiments described herein can be implemented as hardware, such as circuitry, firmware, or computer readable instructions that are stored on non-transitory computer readable storage medium. The computer readable instructions of the various embodiments described herein can be executed by a hardware processor, such as central processing unit, to cause the cellular device 100, 200 to implement the functionality of various embodiments. For example, according to one embodiment, the SUPL client 101 and the operations of the flowcharts 400-1100 depicted in FIGS. 4-11 are implemented with computer readable instructions that are stored on computer readable storage medium, which can be tangible or non-transitory or a combination thereof, and can be executed by a hardware processor 109 of a cellular device 100, 200, receiving component 1402, and cellular device 1410.

Figure 15A:
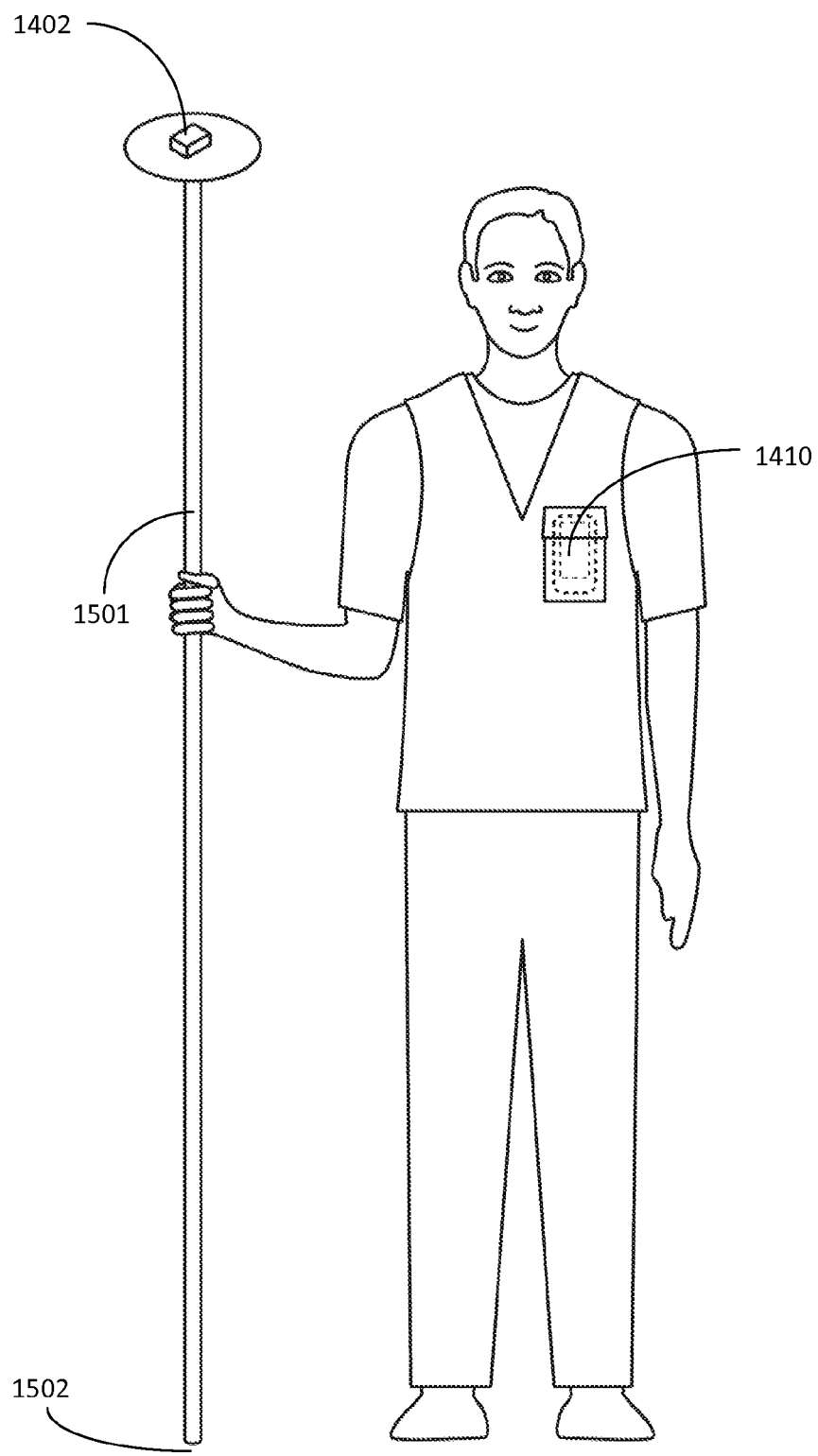
FIGS. 15A-15M example uses of a GNSS receiving component in accordance with various embodiments.

FIGS. 15A-15M show various uses of receiving component 1402 in accordance with various embodiments. In FIG. 15A, receiving component 1402 is disposed on top of a support pole 1501. Professional-grade complete GNSS receiver systems are also disposed on the top of such poles, and the assembly is referred to as a "rover" position determining system. Devices similar to support pole 1501 are commonly used in surveying as a sighting target for a transit in order to determine the position at which the point of the pole is located on the ground. These target poles may also be equipped with receiving component 1402. In accordance with various embodiments, support pole 1501 is outfitted with a receiving component 1402. As described above, receiving component 1402 is used to receive GNSS satellite signals and to output to cellular device data used by cellular device 1410 to determine the position of receiving component 1402. As shown in FIG. 15A, a user is carrying cellular device 1410 in a pocket and communicates with receiving component 1402 via a short-range wireless communication link such as Bluetooth. In accordance with various embodiments, receiving component 1402 can be removably coupled with support pole 1501. For example, receiving component 1402 can be coupled with support pole 1501 using mechanical fasteners, hook and loop (e.g., Velcro®), snapped into a receptacle/compartment of support pole 1501, etc. It is noted that other components can comprise support pole 1501 as well including, but not limited to, reflectors, prisms, data input components, display devices, solar panels, etc. In use, an operator would place tip 1502 of support pole 1501 at a location in order to determine the position of that location. Receiving component 1402 receives signals from orbiting GNSS satellites and outputs, via a short-range wireless link, pseudorange and carrier phase information based upon each of the GNSS satellite signals received. Cellular device 1410 uses the pseudorange and carrier phase information, as well as GNSS correction data received via, for example, a cellular telephone network (e.g., 222 of FIG. 2) to determine the position of circularly polarized GNSS antenna 1403 of receiving component 1402. It is noted that there will be a height difference between circularly polarized GNSS antenna 1403 and tip 1502. In accordance with various embodiments, this height difference can be accounted for automatically by operating system 160, location manager logic 161, or the like. In accordance with various embodiments, receiving component 1402 can be coupled with support pole 1501 for the purpose of surveying a location (e.g., in conjunction with cellular device 1410), detached, and used for another purpose as described in greater detail below.

Figure 15B:
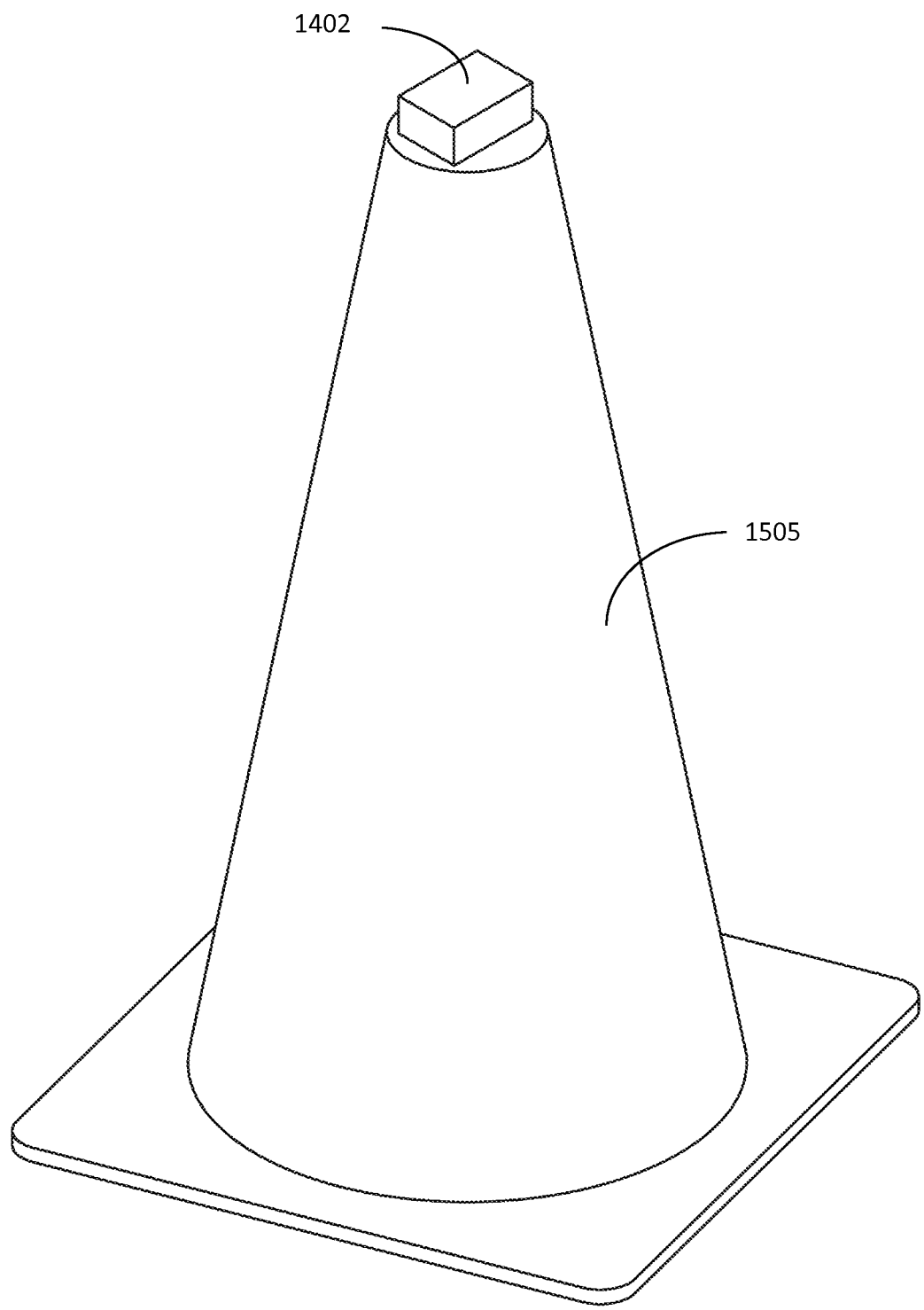

FIG. 15B shows a portable traffic management device (e.g., traffic cone 1505) having a receiving component 1402 disposed on top. In accordance with various embodiments, receiving component 1402 can be coupled with various devices as described above. In the embodiment of FIG. 15B receiving components 1402 can be coupled with respective traffic cones 1505 and placed at a location to make an ad-hoc barrier. For example, if a site has a location which may be considered off-limits to traffic due to safety or environmental concerns, traffic cones 1505 can be used to provide a visual delineation of that off-limits area. Additionally, because each traffic cone 1505 is coupled with a receiving component 1402, the position of each of those cones can be determined and reported to another entity such as a site management server, or geo-fencing server. For example, when each traffic cone 1505 is emplaced, it will communicate its pseudorange and carrier phase information wirelessly with cellular device 1410 of an operator (e.g., see FIG. 15A). In accordance with various embodiments, cellular device 1410 will record and store the location of each of traffic cones 1505 and/or automatically forward these locations to a central server. It is noted that other types of traffic barriers can be fitted with receiving component 1402 such as pre-cast concrete traffic barriers, A-frame traffic barriers, fences, barrels, gates, water/sand filled barriers, etc. However, these barriers can be quickly emplaced and their position determined and mapped without extra steps to determine their position. Also, because receiving component 1402 does not provide full position determining functionality, but rather exports pseudoranges, carrier phases, and other information to cellular device 1410 for processing, they are much less attractive to thieves who cannot use or sell receiving component 1402 as readily as a fully functioning GNSS receiver. In accordance with various embodiments, receiving component 1402 can be permanently coupled with traffic cone 1505, or attached in an ad-hoc manner when emplaced. It is noted that although not shown in FIG. 15B, traffic cone 1505 can comprise a solar panel to generate electricity and connector for providing electrical power from the solar panel to receiving component 1402.

Wearable GNSS Receiver Component and Cellular Device

Figure 15C:
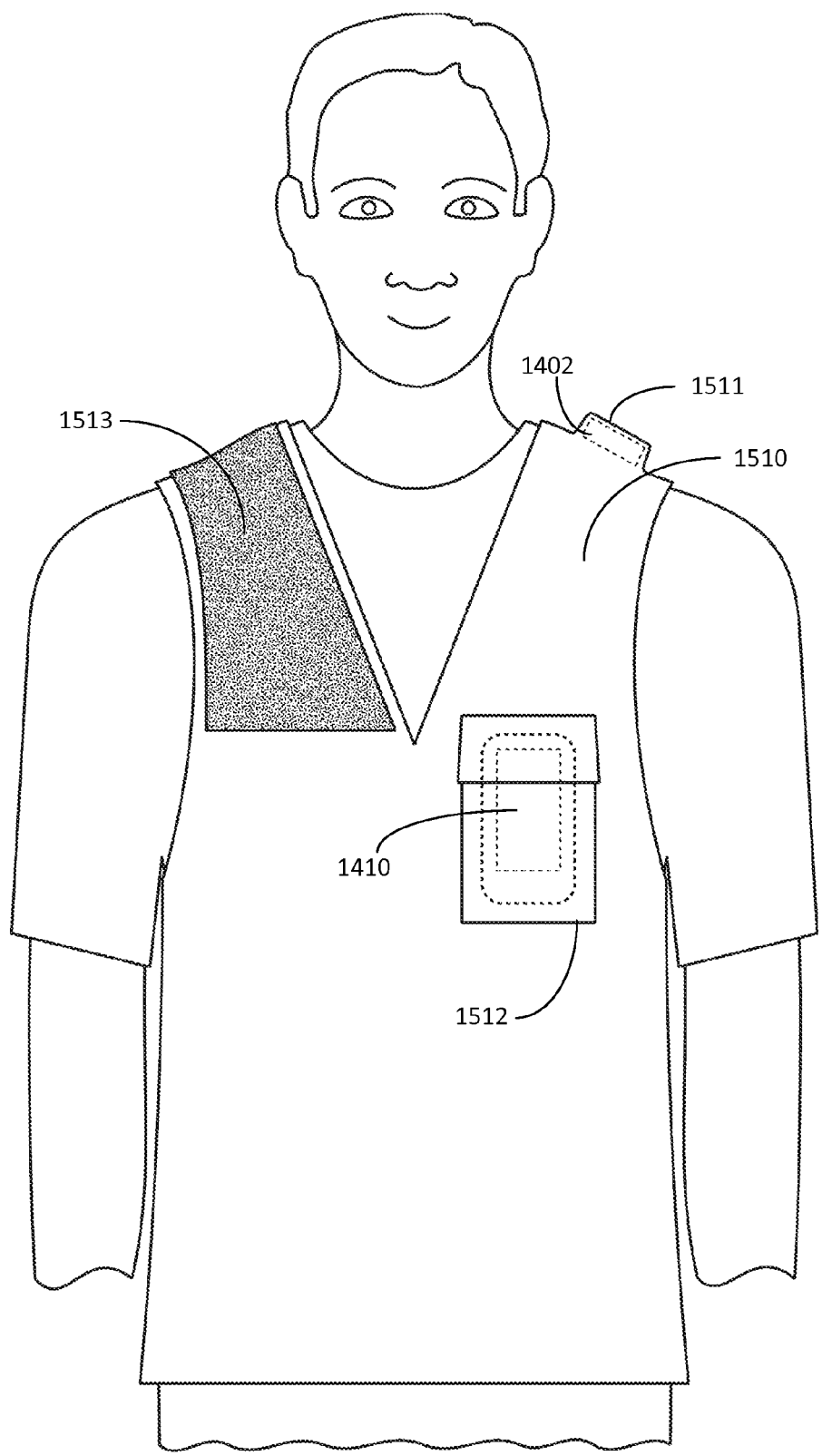

FIG. 15C shows a wearable article of clothing comprising GNSS positioning system 1400 in accordance with various embodiments. In FIG. 15C, this wearable GNSS system takes the form of vest 1510, which comprises a compartment or pocket 1511 on a shoulder (the left shoulder in this embodiment) which is configured to hold receiving component 1402. A second pocket 1512 of vest 1510 is configured to hold cellular device 1410. As shown in FIG. 15C, the disposition of receiving component 1402 places it in a better position for receiving GNSS satellite signals than cellular device 1410, either in pocket 1512 or when held in a user's hand. Furthermore, as described above, receiving component 1402 utilizes an antenna design which is optimized for GNSS satellite signal reception in comparison with the antenna designs typically found in cellular devices. As a result, a user wearing vest 1510 will realize greater precision in determining his position using GNSS positioning system 1400, particularly when carrier phase smoothing logic 152 is implemented in cellular device 1410. Also shown in FIG. 15C is a solar panel 1513 which generates electricity. Implementations of vest 1510 comprise solar panels 1513 at various locations to facilitate providing electrical power to receiving component 1402 via a power coupling (not shown) which plugs into power connection 1408. Typically, solar panels are known for being linear and rigid and therefore difficult to integrate into application where a curved and/or flexible surface is provided. However, there are thin solar cells which are flexible in at least one dimension which can be used in accordance with various embodiments. One example is a commercially available thin film of gallium arsenide manufactured by Alta Devices of Sunnyvale, Calif. In another embodiment, a process for embedding solar panels within infusion-molded composite parts can be used. In accordance with at least one embodiment, one or more rigid solar cells can be combined into a solar panel by, for example, attaching them to a substrate or gusset. The plurality of rigid solar cells can be attached so that they comprise a curved surface in various embodiments. This substrate or gusset can be attached to the wearable article of clothing by sewing it on, adhesive, mechanical fasteners, hook and loop (e.g., Velcro®), or the like. It is noted that additional solar panels can be integrated into vest 1510, and at other locations, but were omitted for the purpose of clarity. Furthermore, vest 1510 can include reflective panels and other safety features typically integrated into safety vest designs. It is noted that while the present description of vest 1510 is directed to safety vests worn by construction personnel, various embodiments can be implemented as military body armor, load bearing equipment, lifejackets, or regular articles of clothing such as hiking jackets, rain jackets, etc. Furthermore, while FIG. 15C shows a dedicated pocket 1511 configured for holding receiving component 1402, in another embodiment receiving component 1402 is simply worn on the outside of an article of clothing and attached using, for example, hook and loop (e.g., Velcro®) strips, pins, clips, etc. In one embodiment, pocket 1511 itself is detachable from vest 1510, or other articles of clothing and is attached as described above.

Helmet-Mounted GNSS Receiver Positioning System

Figure 15D:
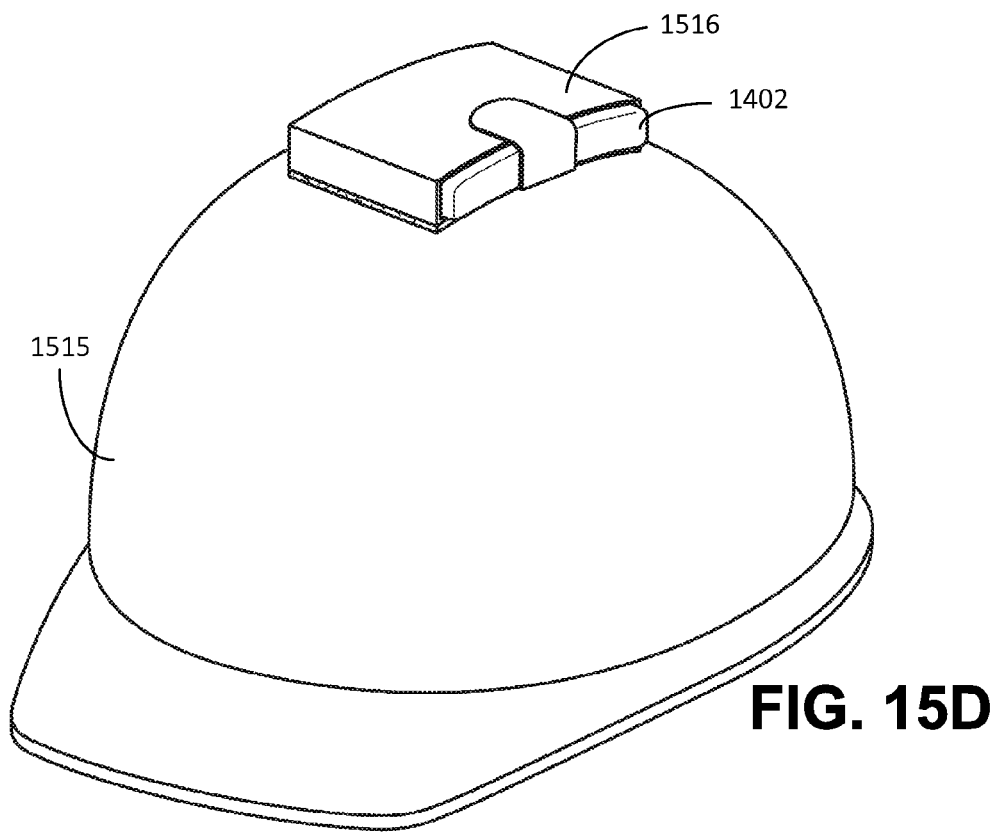
Figure 15E:
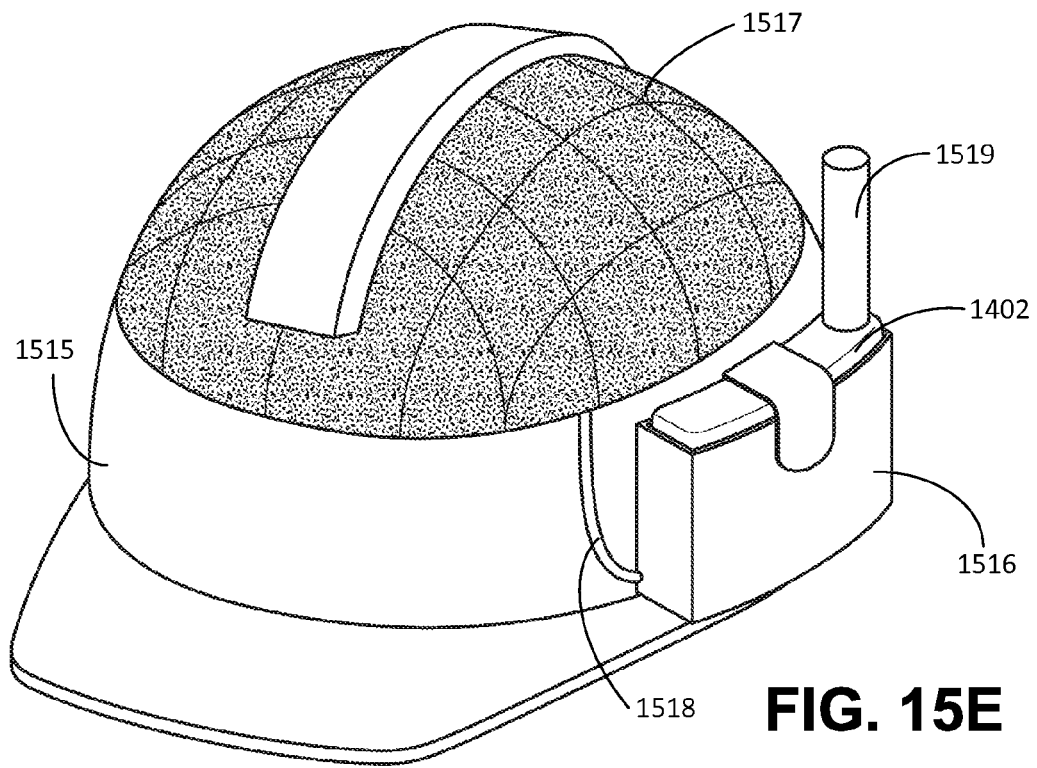

FIGS. 15D and 15E show a construction hard hat 1515 having a pocket 1516 which is configured for holding receiving component 1402. Hard hat 1515 is presented as one embodiment of a helmet (e.g., hardened safety headwear), others would include, without limitation, sports helmets (e.g., football helmets, bicycle helmets, equestrian helmets, motorcycle helmets and the like), military helmets, police helmets, firefighter's helmets, bump caps and the like. In FIGS. 15D and 15E, pocket 1516 is shown with a strap which prevents receiving component 1402 from falling out. It is recognized that other configurations for securing receiving component within pocket 1516 are envisioned in various embodiments. In one embodiment, pocket 1516 is a molded-in component of hard hat 1515. Alternatively, pocket 1516 can be attached directly to hard hat 1515 using, for example, hook and loop (e.g., Velcro®) strips, adhesives, mechanical fasteners, brackets, etc. In FIG. 15E, hard hat 1515 further comprises at least one solar panel 1517 for providing power to receiving component 1402 as described above via electrical connection 1518. As described above, the embodiments shown in FIGS. 15D and 15E position receiving component 1402 higher up and thus in a position for improved reception compared with handheld components, particularly cellular devices, which typically experience interference from the user's body and poor reception due to the GNSS antenna design typically used in cellular devices. Also, while shown disposed at the top of hard hat 1515, receiving component 1402 can be disposed at any location of hard hat 1515. Furthermore, while shown as a separate unit for clarity, the components of receiving component 1402 can be integrated into hard hat 1401 itself in one or more embodiments. As described above, in accordance with at least one embodiment, receiving component 1402 is configured to utilize a quadrifiler helix antenna 1519 as shown in FIG. 15E.

Figure 15F:
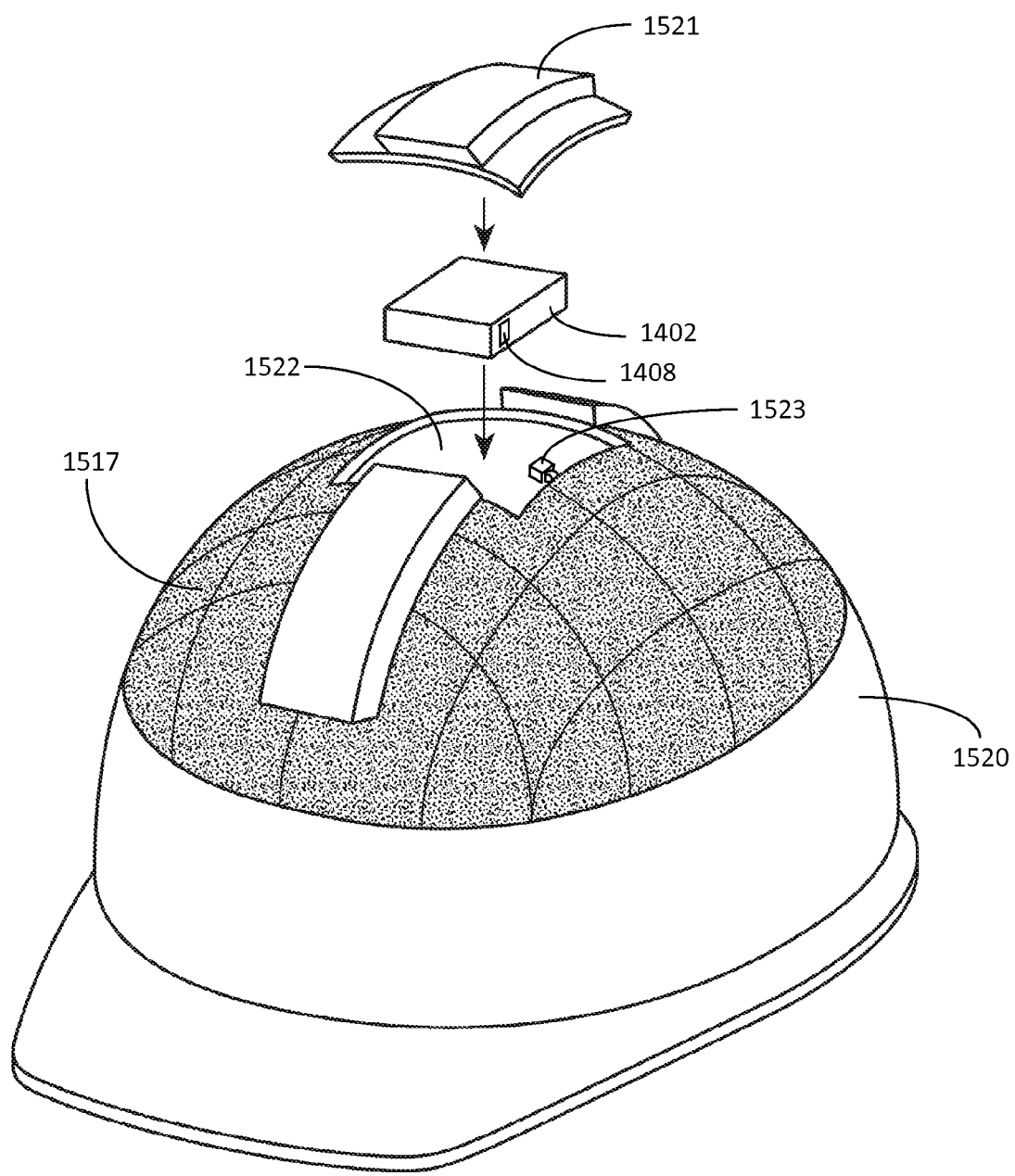

FIG. 15F shows another embodiment of a wearable article of clothing comprising GNSS positioning system 1400 in accordance with various embodiments. In FIG. 15F, the wearable article of clothing again comprises a construction hard hat 1520 comprising at least one solar panel 1517, as described above, to generate electricity. Additionally, hard hat 1520 comprises a removable cover 1521 to a compartment 1522 in the top of hard hat 1520 into which receiving component 1402 can be placed. In accordance with various embodiments, receiving component 1402 can be snapped into compartment 1522 and cover 1521 emplaced to present a less cluttered appearance. Additionally, cover 1521 is configured to protect receiving component from dust, moisture, and impact when it is in place over compartment 1522. In various embodiments, cover 1521 comprises a material which is transparent to GNSS satellite radio signals. In an embodiment, receiving component 1402 may comprise a self-contained power supply system consisting of a battery. In an embodiment, the battery may be rechargeable, and solar panel(s) 1517 on the hard hat may supply the electrical power via a connection from the solar panel(s) 1517 located on the outer surface of hard hat 1520. In at least one embodiment, when receiving component 1402 is placed into compartment 1522, power connection 1408 is engaged with corresponding power connections within compartment 1522 such that receiving component 1402 can receive electrical power from solar panel 1517. In accordance with various embodiments, cover 1521 can be snapped into place and/or utilize mechanical fasteners to secure it in place. It is noted that cover 1521 can be hinged such that it cannot be entirely detached from hard hat 1520 in at least one embodiment.

Figure 15G:
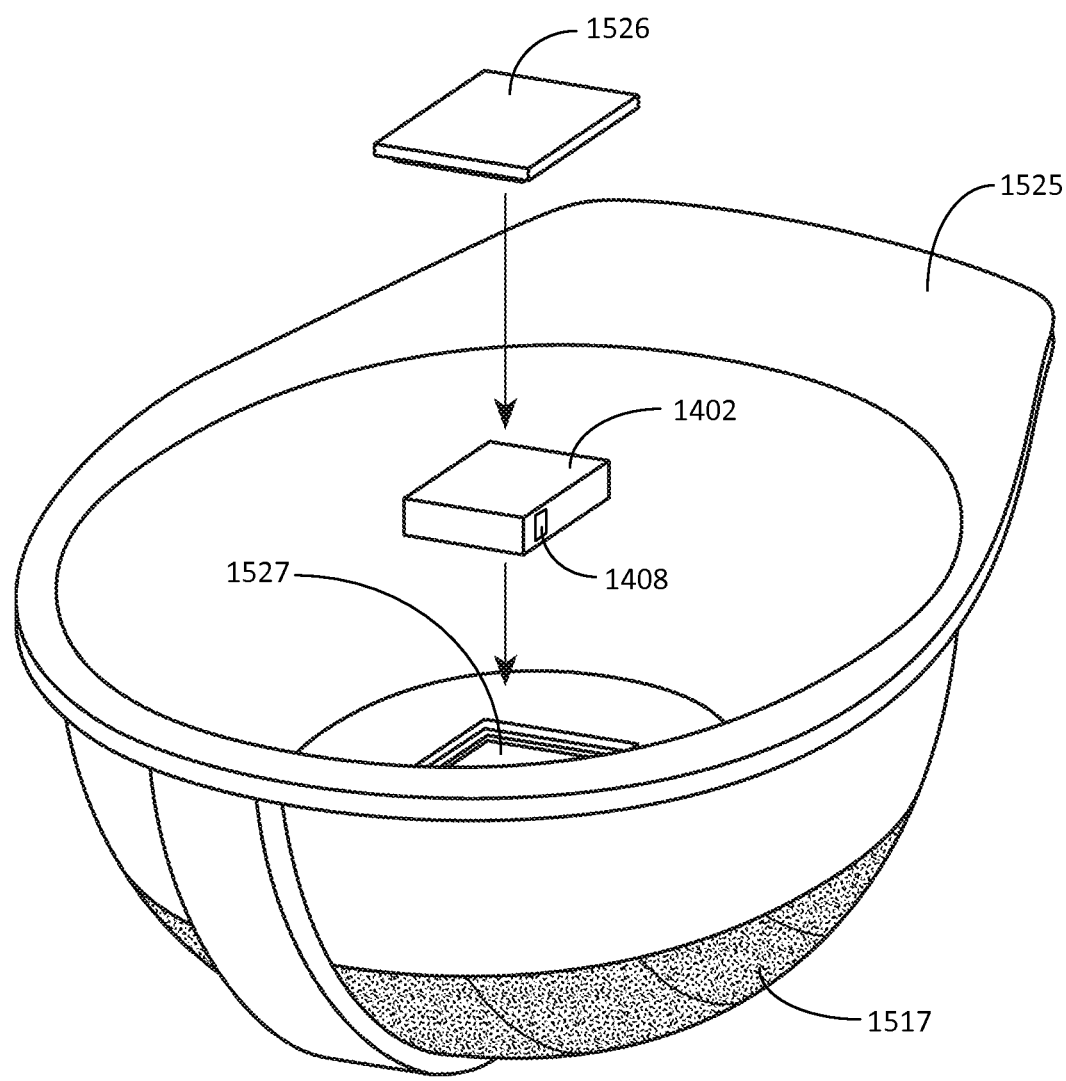

FIG. 15G shows another embodiment of a construction hard hat 1525 having a cover 1526 to a compartment 1527 into which receiving component 1402 can be placed. In the embodiment of FIG. 15G, compartment 1527 is disposed on the underside of hard hat 1525. This provides greater protection from moisture that the embodiment shown in FIG. 15F in which compartment 1522 is accessible from above. As with hard hat 1520 of FIG. 15F, in at least one embodiment, hard hat 1525 can be made of a material which is transparent to GNSS satellite radio signals. Additionally, compartment 1527 can be disposed such that when receiving component 1402 is placed within it, power connection 1408 is engaged with corresponding power connections of hard hat 1525 such that receiving component 1402 receives electrical power from solar panel 1517. In accordance with various embodiments, cover 1526 can be snapped into place and/or utilize mechanical fasteners to secure it in place. It is noted that cover 1526 can be hinged such that it cannot be entirely detached from hard hat 1525 in at least one embodiment. Additionally, cover 1526 is configured to protect receiving component 1402 from dust, moisture, and impact when it is in place beneath compartment 1527.

Figure 15H:
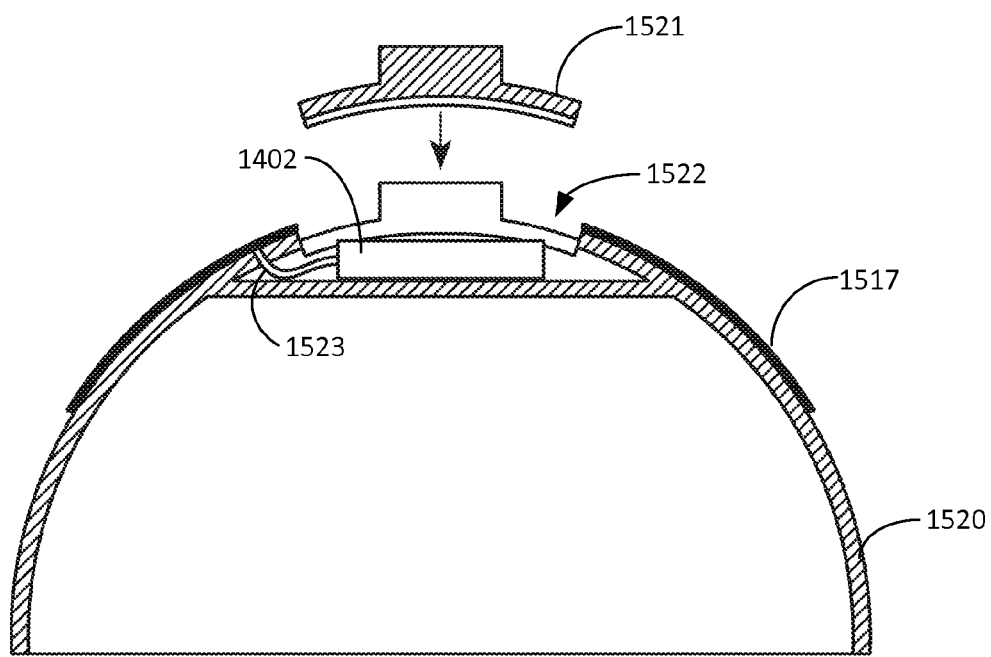
Figure 15I:
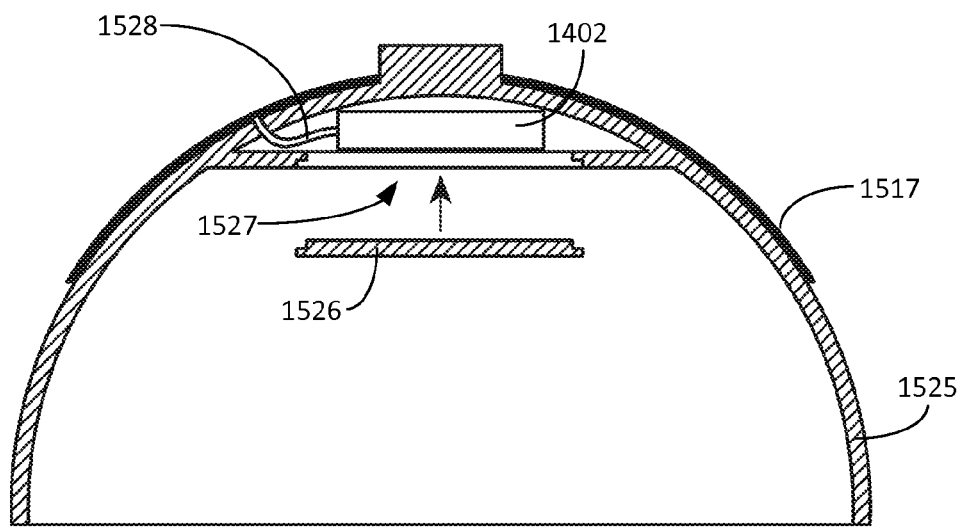

FIGS. 15H and 15I are cross section views of hard hats 1520 and 1525 respectively in accordance with various embodiments. In FIG. 15H, cover 1521 is shown removed from compartment 1522 with receiving component 1402 disposed therein. Also shown in FIG. 15H is solar panel 1517 to generate electricity. Solar panel 1517 is coupled with and provides electrical power to receiving component 1402 via electrical connection 1523. Similarly, FIG. 15I shows cover 1526 removed from compartment 1527 with receiving component 1402 disposed within. Again, receiving component 1402 is shown coupled with solar panel 1517 which provides electrical power to receiving component 1402 via electrical connection 1528.

Figure 15J:
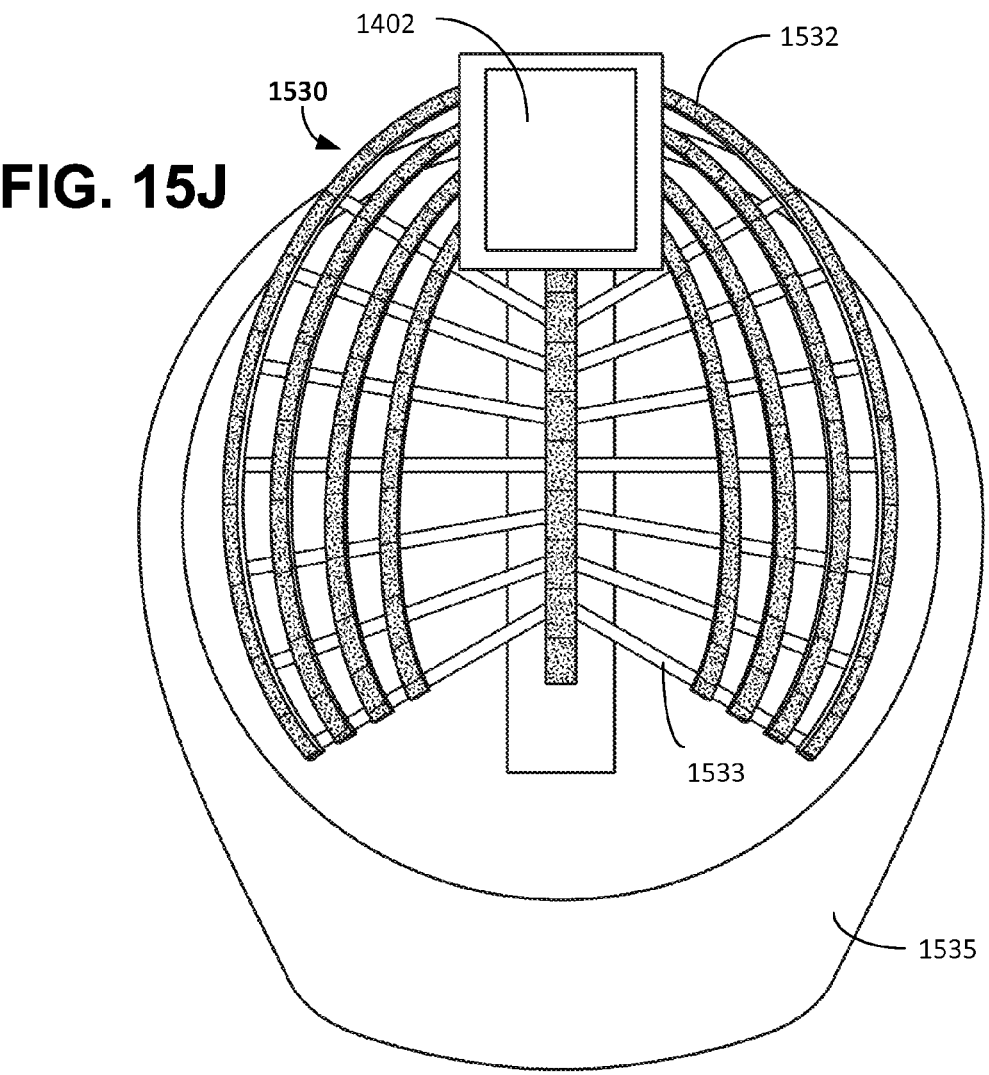
Figure 15K:
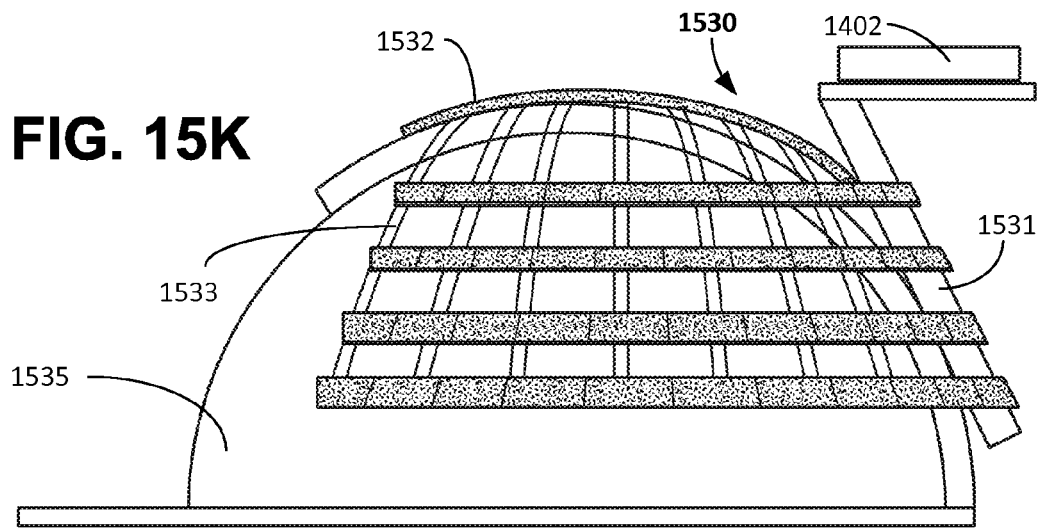

FIGS. 15J and 15K are top and side views respectively of a removable assembly 1530 in accordance with various embodiments. In FIGS. 15J and 15K, removable assembly 1530 comprises a base 1531 onto which receiving component 1402 is coupled. It is noted that in accordance with at least one embodiment, receiving component 1402 is removably coupled with base 1531 and can be removed and used in other configuration such as shown in FIGS. 15A-15J. In FIGS. 15J and 15K, removable assembly 1530 further comprises metallic fingers 1532 which couple base 1531 with hard hat 1535. In accordance with various embodiments, metallic or plastic fingers 1532 comprise a flexible material designed to conform to the shape of hard hat 1535. In accordance with various embodiments, removable assembly 1530 is designed to snap in place around hard hat 1535. In an embodiment, the metallic or plastic fingers 1532 are covered with solar cells (not shown), to provide power for receiving component 1402. In an embodiment, an adhesive may be applied to base 1531 to keep removable assembly 1530 in place. In various embodiments, removable assembly 1530 can be snapped into position by applying or pushing it down over the top of hard hat 1535. In various embodiments, metallic or plastic fingers 1532 are coupled with a substrate 1533 such as a webbing which is shown in FIGS. 15J and 15K. It is noted that various configurations of a substrate 1533 can be implemented in accordance with various embodiments. For example, substrate 1533 may comprise an elastic material which pulls metallic or plastic fingers 1532 into closer contact with hard hat 1535 when removable assembly 1530 is in place. Furthermore, the points at which substrate 1533 come into contact with hard hat 1535 may provide additional friction to keep removable assembly 1530 from sliding around on top of hard hat 1535. It is noted that the orientation of receiving component 1402 shown in FIGS. 15J-15M is well suited for the utilization of a GNSS patch antenna (e.g., 1403) as described above.

Figure 15L:
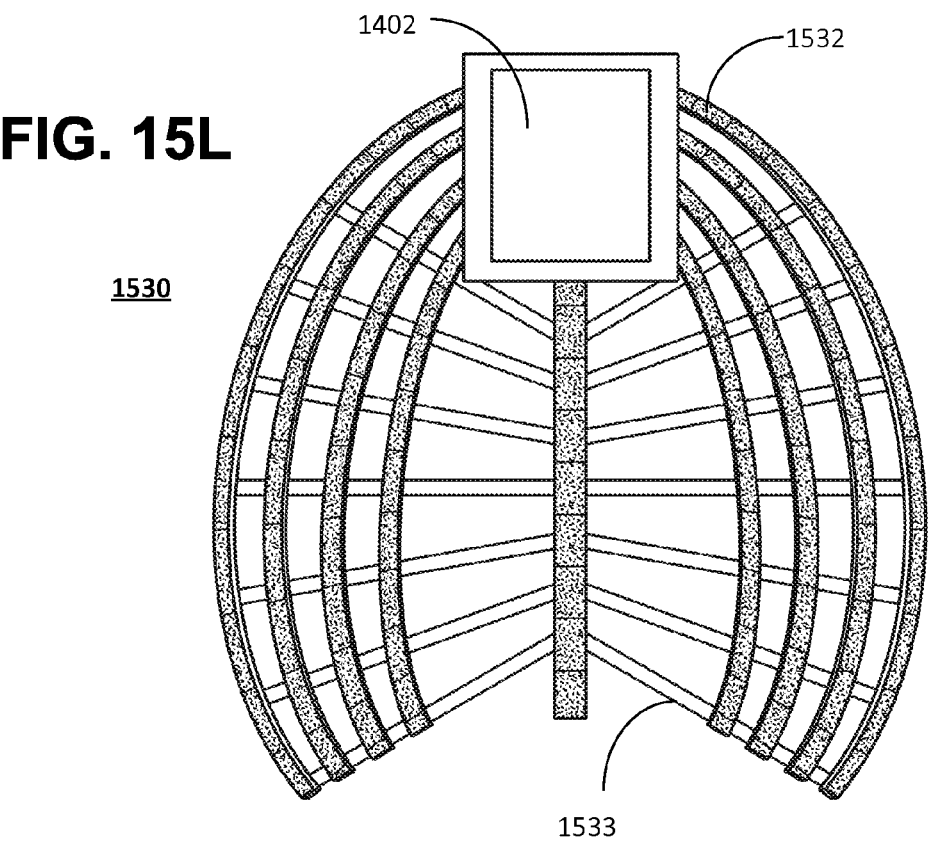
Figure 15M:
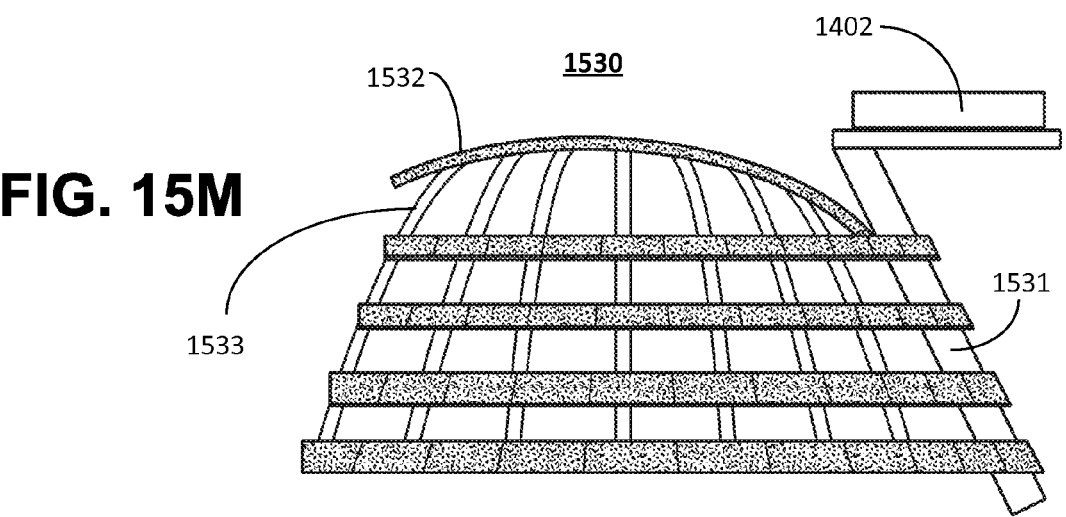

FIGS. 15L and 15M are top and side views respectively of removable assembly 1530 in accordance with various embodiments. It is noted that the configuration of removable assembly 1530 shown in FIGS. 15J-15M is for the purpose of illustration and that other configurations can be implemented in accordance with various embodiments.

In accordance with various embodiments, the receiving component 1402 shown in FIGS. 15D-15M receives GNSS satellite radio signals and derives respective carrier phase and pseudorange information derived from each GNSS satellite radio signal it receives. It is noted that additional GNSS information such as Doppler shift information can also be derived by receiving component 1402. Receiving component 1402 then wirelessly transmits the carrier phase and pseudorange information to a cellular device 1410. Typically, the cellular device 1410 is carried by the user wearing hard hat 1515, 1520, 1525, and/or 1535. Then, the primary processor (e.g., processor 1412 of FIG. 14) derives the position of receiving component 1402 using the respective pseudorange and carrier phase information, as well as any GNSS corrections received from a corrections source. Typically, the GNSS corrections received by cellular device 1410 are received via a cellular network 222 and/or local Wi-Fi 224. It is noted that processor 1412 comprises the primary processor of cellular device 1410 rather than a dedicated GNSS processor. Thus, various embodiments are able to leverage the greater processing power that is being integrated into cellular devices to improve the performance in determining the position of receiving component 1420, or more specifically, circularly polarized GNSS antenna 1403.

Figure 16A:
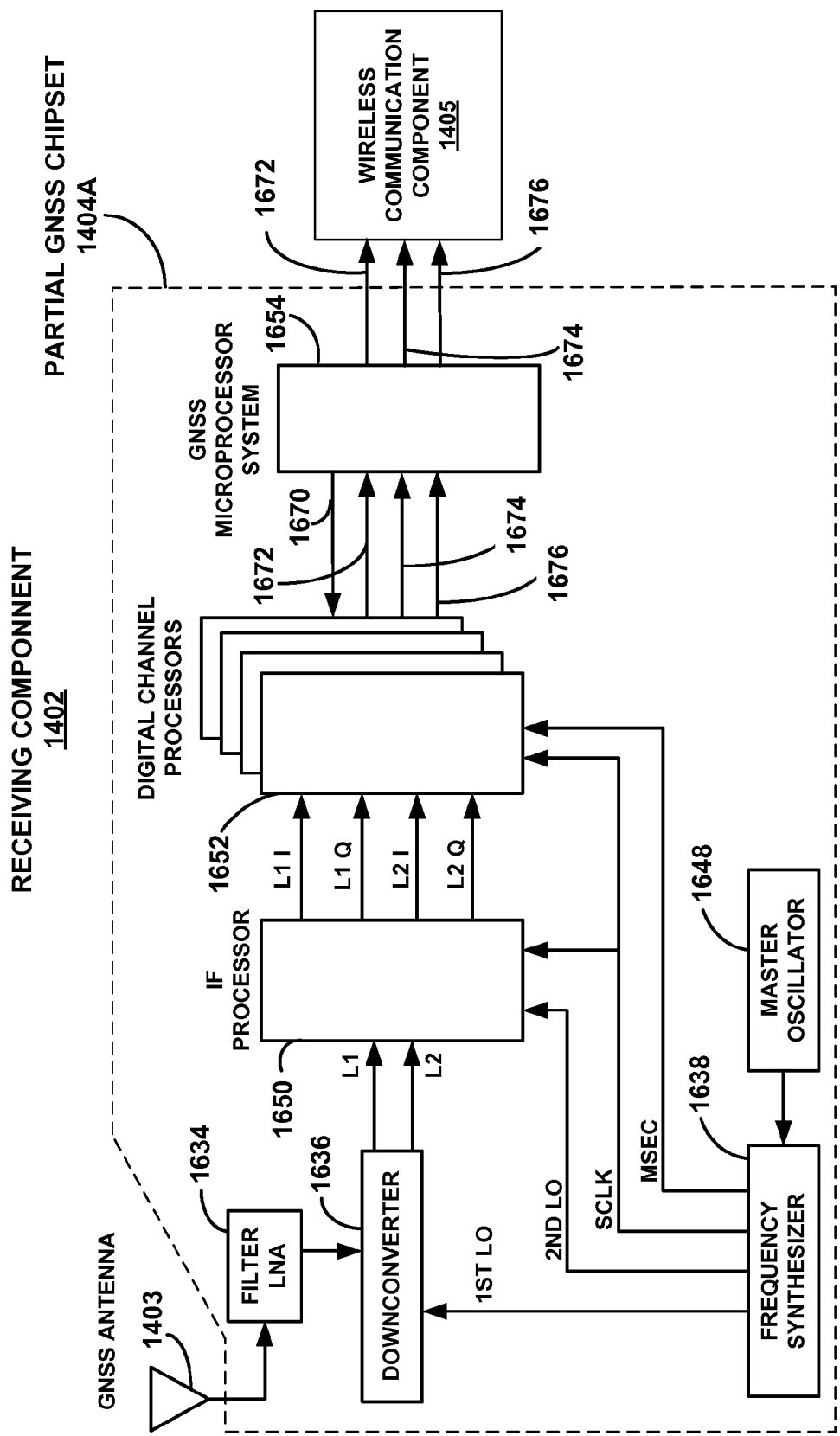
FIGS. 16A-16E are block diagrams of components of a GNSS receiving component in accordance with at least one embodiment.
Figure 16B:
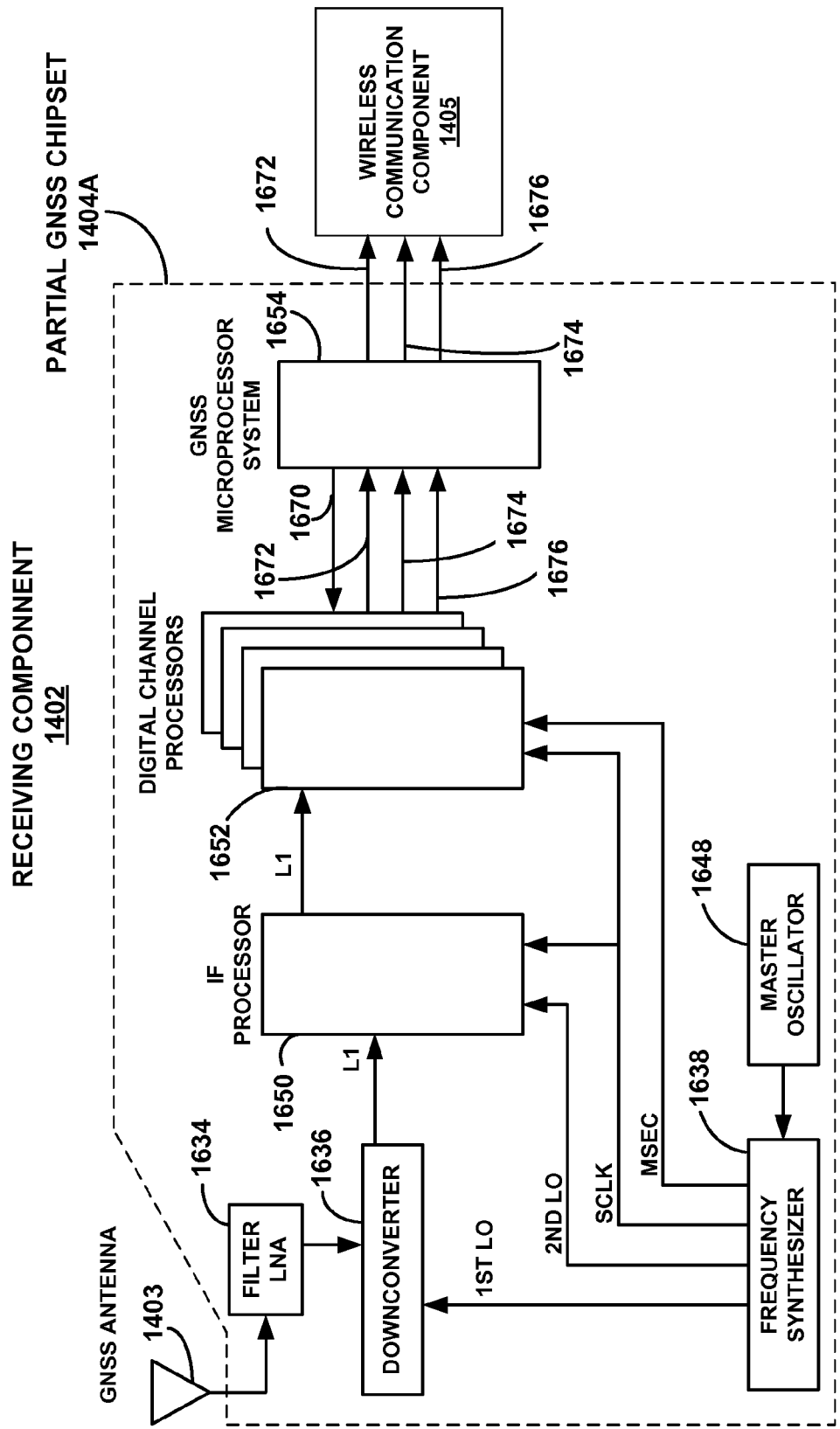
Figure 16C:
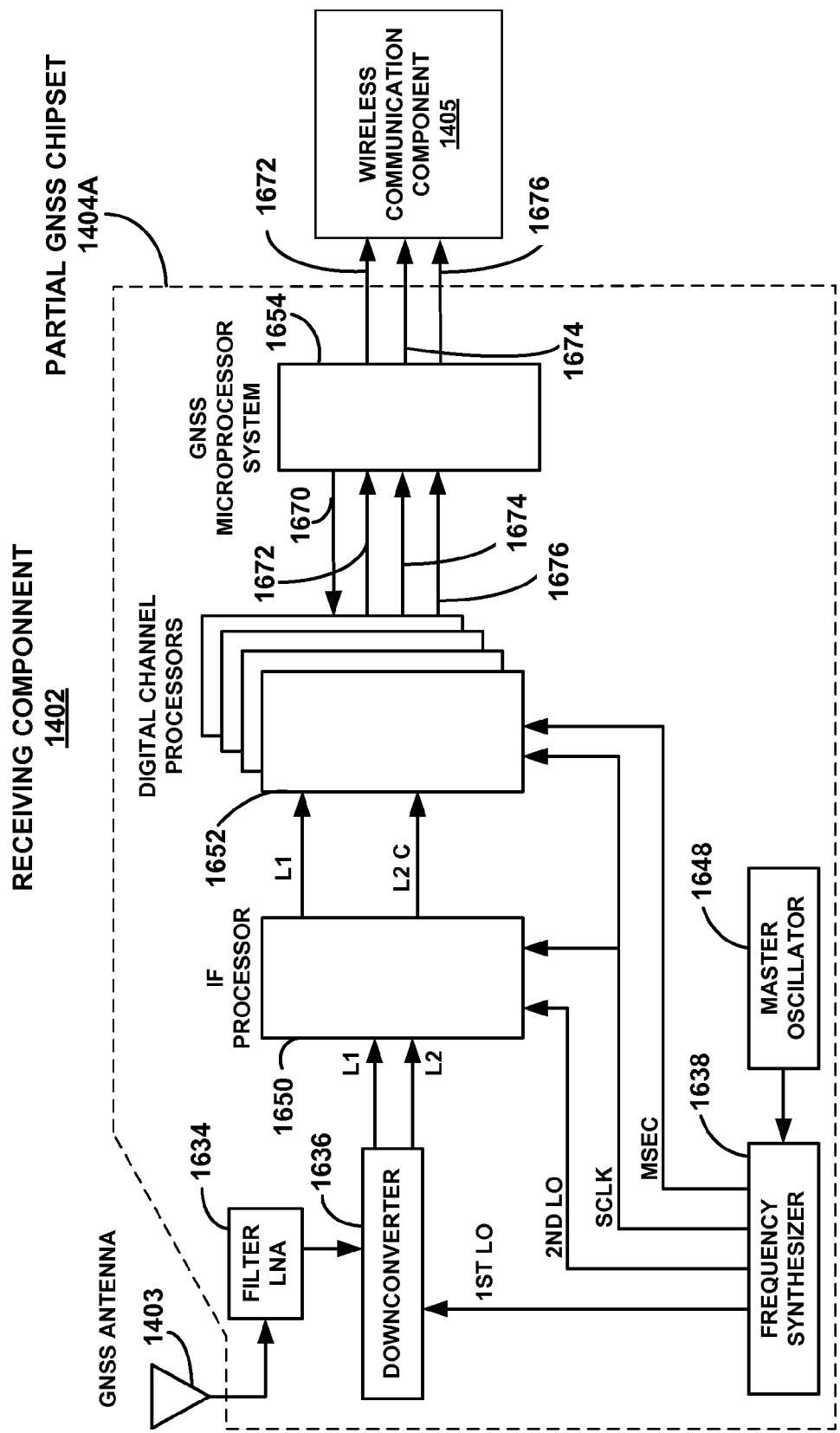
Figure 16D:
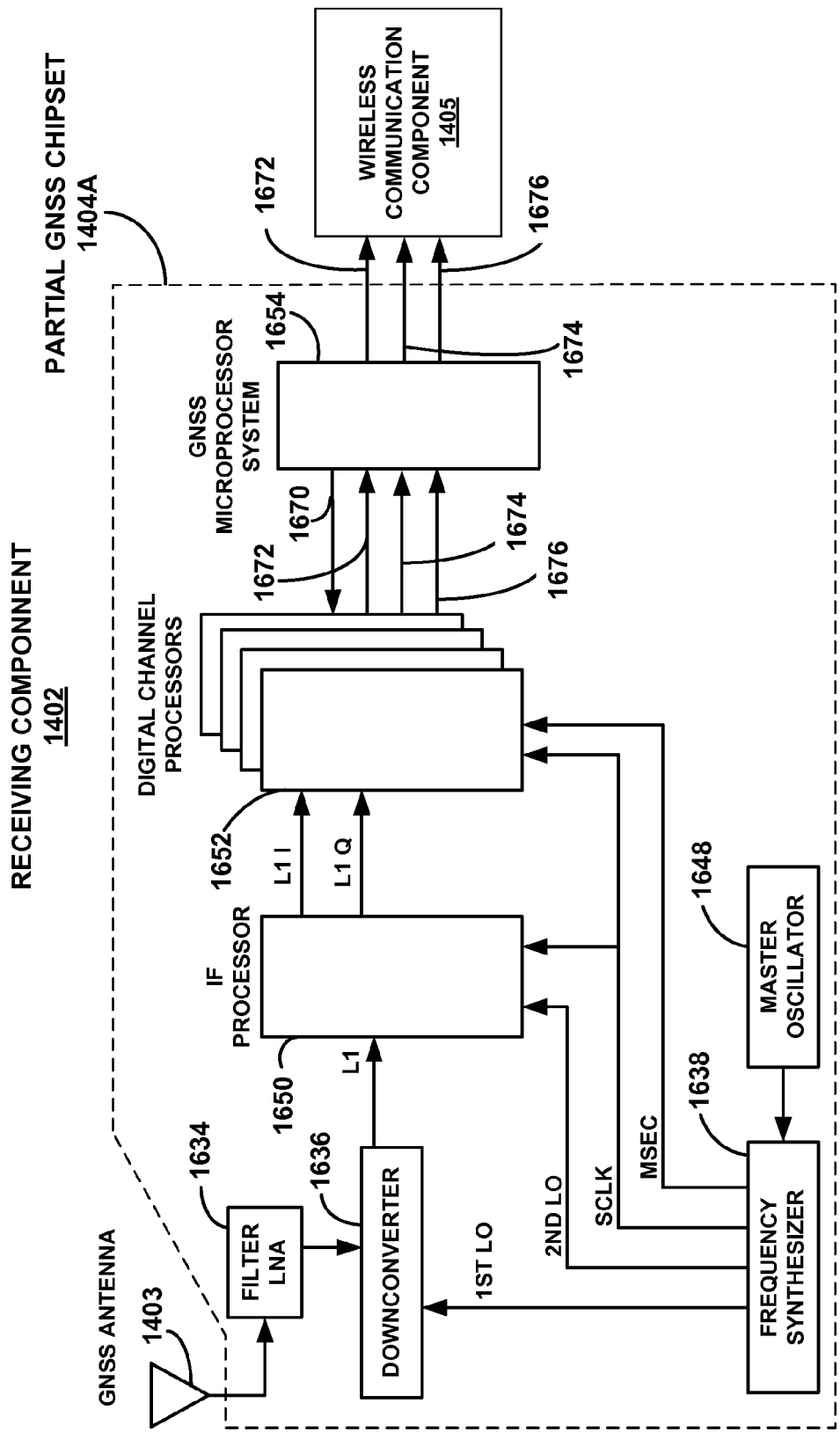
Figure 16E:
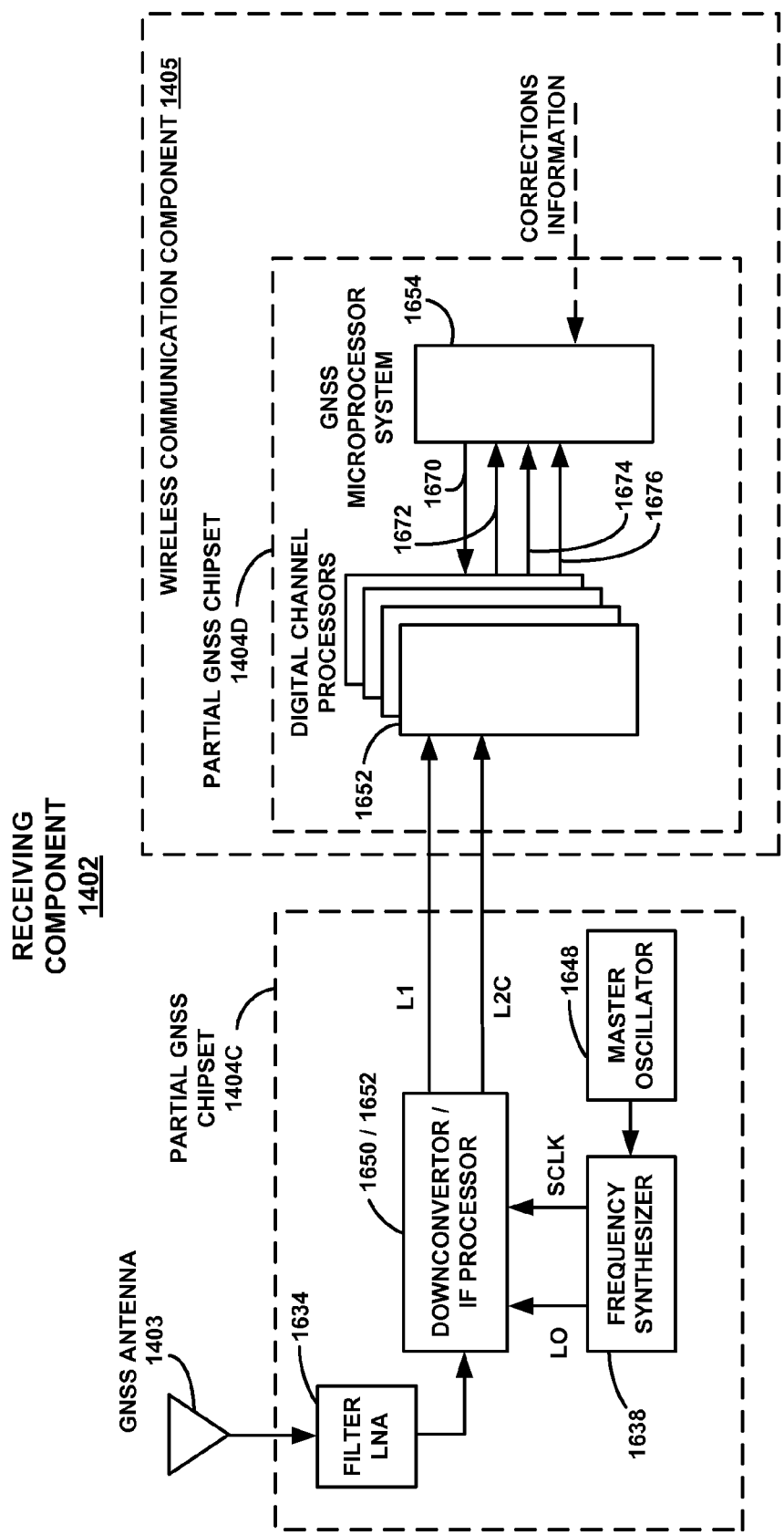
Figure 17:
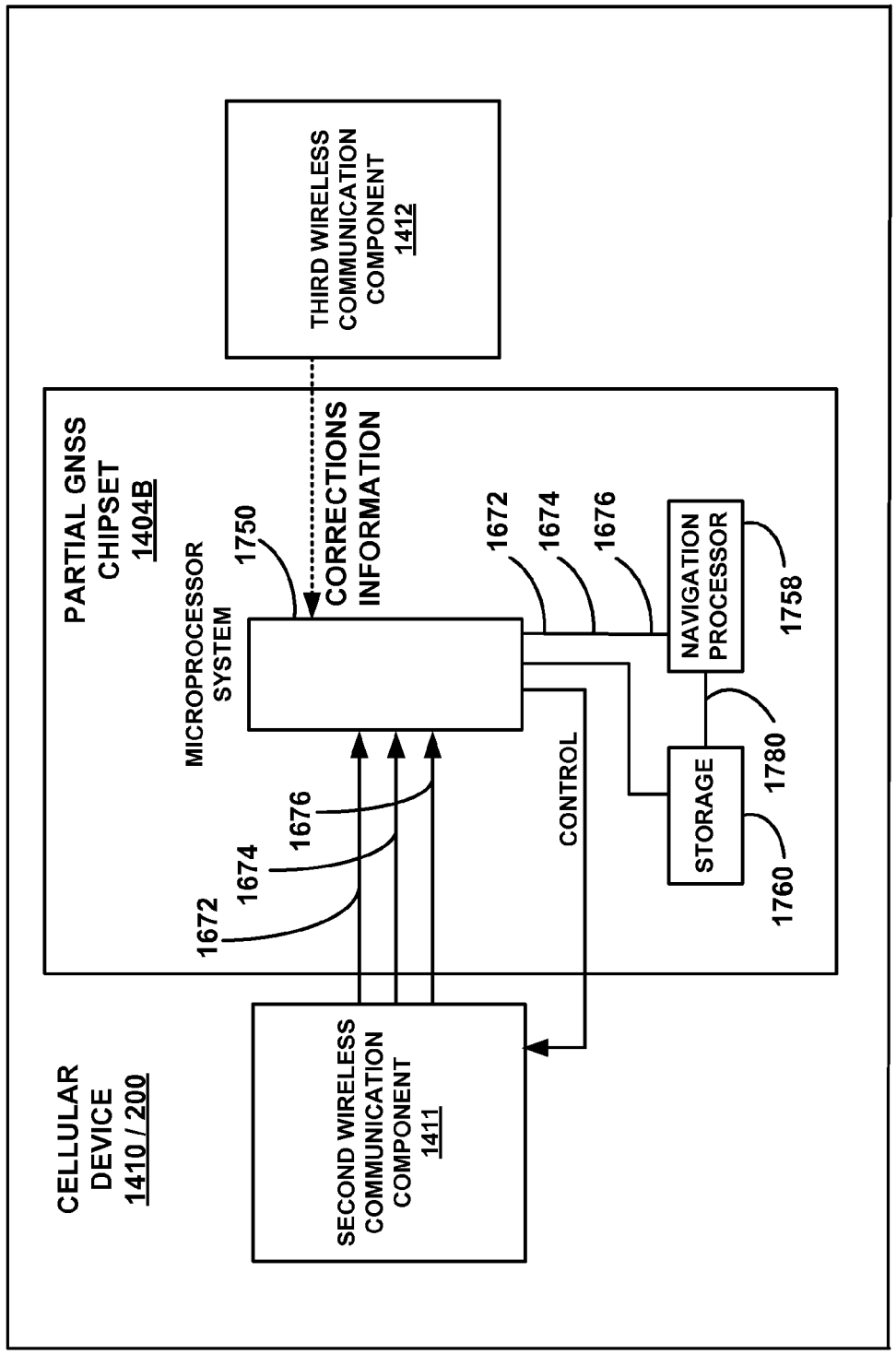
FIG. 17 is a block diagram of components of a GNSS receiving component in accordance with one embodiment.

FIGS. 16A-16E are a block diagrams of components of receiving components 1402 in accordance with various embodiments. In the embodiment of FIG. 16A, rather than implementing an entire GNSS chipset 1404 (e.g., a cellular telephone GNSS chipset, or a dedicated GNSS data collector chipset), receiving component 1402 comprises a partial GNSS chipset 1404A with the other components of a partial GNSS chipset 1404B resident upon cellular device 200 which is shown in FIG. 17. It should be noted that in FIG. 17, cellular device 1410 is an embodiment of cellular device 200 (e.g., cellular device 200 of FIG. 2) comprising the components shown in FIG. 2 with the addition of the partial GNSS chipset 1404B. The following discussion will refer to both FIGS. 16A-D and 17 to more clearly explain the operation of this embodiment; FIG. 16E will be described separately. In FIG. 16A, received L1 and L2 signals are generated by at least one GPS satellite. Each GPS satellite generates different signal L1 and L2 signals and they are processed by different digital channel processors 1652 which operate in the same way as one another. In accordance with various embodiments, circularly polarized GNSS antenna 1403 receives respective signals from a plurality of GNSS satellites.

If both L1 and L2 signals are to be processed, the antenna must be capable of receiving both frequencies. This has been found to be extremely difficult if not impossible, because of the separation frequency between L1 and L2 and the narrow bandwidths of patch antennas. Therefore, most dual frequency systems employ two patch antennas, one mounted atop the other, as is found in the professional grade GNSS positioning systems. Other physical configurations are possible, such as mounting the two patch antennas side by side. A new L2 frequency will become available in the future, known as L2C GNSS signal and which can be used in accordance with various embodiments. It will enable direct reception via the same kind of code acquisition and processing as is now used on L1. For many applications, a single frequency L1 receiver provides adequate position fix accuracy, especially when the various corrections systems recited in previous portions of this application are utilized.

FIG. 16A shows GPS signals (L1=1575.42 MHz, L2/L2C=1227.60 MHz) entering receiving component 1402 through a dual frequency antenna 1403. Master oscillator 1648 provides the reference oscillator which drives all other clocks in the system. Frequency synthesizer 1638 takes the output of master oscillator 1648 and generates important clock and local oscillator frequencies used throughout the system. For example, in one embodiment frequency synthesizer 1638 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1634 performs filtering and low noise amplification of both L1 and L2 signals. In some embodiments, the downconvertor 1636 mixes both L1 and L2 signals in frequency down to approximately 175 MHz and outputs the analog L1 and L2 signals into an IF (intermediate frequency) processor 1650. In other embodiments, such as those shown in FIG. 16B and FIG. 16D where no L2 component is utilized by the partial GNSS receiver, downconvertor 1636 may only mix and output the analog L1 signal to the IF processor 1650. IF processor 1650 takes the analog L1 and/or L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1652 inputs the digitally sampled L1 and L2 inphase and quadrature signals. All digital channel processors 1652 are typically are identical by design and typically operate on identical input samples. Each digital channel processor 1652 is designed to digitally track the L1 and L2 signals produced by one satellite by tracking code and carrier signals from code and carrier phase measurements in conjunction with the GNSS microprocessor system 1654. One digital channel processor 1652 is capable of tracking one satellite in both L1 and L2 channels. GNSS microprocessor system 1654 facilitates tracking and measurements processes, providing pseudorange and carrier phase measurements for a determining position fix logic (e.g., navigation processor 1758). In one embodiment, microprocessor system 1654 provides signals (e.g., 1670) to control the operation of one or more digital channel processors 1652.

In the embodiment shown in FIG. 16B, the components of partial GNSS chipset 1404A discussed above are the same with the exception that IF processor 1650 outputs an L1 signal only. In another embodiment, shown in FIG. 16C, IF processor 1650 outputs an L1 signal and an L2C signal only. The L2C GNSS signal is a new GNSS signal being phased in which permits ionospheric correction, faster signal acquisition, and enhanced reliability. Alternatively, as shown in FIG. 16D, in one embodiment, IF processor 1650 outputs and L1I and L1Q signal only. Many receivers do not provide L1Q, as L1I may be adequate for most applications that do not require professional grade high precision.

According to one embodiment, the microprocessor system 1750 receives the pseudorange information 1672, Doppler Shift information 1674, and real Carrier Phase Information 1676 from second wireless communication component 1411 and provides them to the determining position fix logic (e.g., navigation processor 1758 and/or processes running thereon). Determining position fix logic performs the higher level function of combining measurements in such a way as to produce position, velocity and time information for the differential and surveying functions, for example, in the form of a position fix 1780. Storage 1760 is coupled with determining position fix logic and microprocessor system 1750. It is appreciated that storage 1760 may comprise a volatile or non-volatile storage such as a RAM or ROM, or some other computer readable memory device or media. In some embodiments, determining position fix logic performs one or more of the methods of position correction described herein.

In some embodiments, microprocessor system 1750 and/or determining position fix logic receive additional inputs for use in receiving corrections information via cellular communication component 1413. According to one embodiment, an example of the corrections information is WAAS corrections. According to one embodiment, examples of corrections information are differential GPS corrections, RTK corrections, signals used by the previously referenced Enge-Talbot method, wide area augmentation system (WAAS) corrections, and PPP corrections among others FIG. 16E is a block diagram of components of receiving component 1402, in accordance with various embodiments. FIG. 16E differs from FIGS. 16A-16D in that the split of functions is different between partial GNSS chipsets 1404C and 1404D is different than the split illustrated in FIGS. 16A-16D and 17 which illustrate embodiments of partial GNSS chipsets 1404A and 1404B. Partial GNSS chipset 1404C includes portions that are needed to receive GNSS signals over the air and from the received signals generate downconverted L1 and/or L2 signals that are then transmitted wirelessly or via wireline to partial GNSS chipset 1404D. The wireline or wireless transmission may be of analog or digitized versions of the L1 and/or L2 signals, and is over a short distance such as between a few millimeters to no more than several meters. Partial GNSS chipset 1404D operates to determine a position from the L1 and/or L2 signals that are received from partial GNSS receiver 1404C. In some embodiments, partial GNSS receiver 1404D utilizes one or more items of corrections information (previously described) that are received by wireless receiving component 1405, in order to further refine a position determination. In some embodiments, hardware components illustrated in partial GNSS chipset 1404D may be implemented in software on a processor of wireless communication component 1405. This is called a software defined GNSS receiver and may be referred to as a Soft GNSS receiver. Such a software defined GNSS receiver (e.g., software defined GNSS receiver 1933) is further described in conjunction with the embodiments depicted in at least FIGS. 19A-19D and 22.

FIG. 18 is a flowchart of a method 1800 of extracting pseudorange information using a cellular device in accordance with various embodiments. In operation 1810, a Global Navigation Satellite System (GNSS) chipset is accessed which is physically remote from a cellular device, wherein the GNSS chipset provides raw GNSS observables information based upon signals received from a circularly polarized GNSS antenna. As described above, in various embodiments receiving component 1402 of FIG. 14 comprises a circularly polarized GNSS antenna (e.g., patch antenna 1403 of FIG. 14, or quadrifiler helix antenna 1519 of FIG. 15E), a GNSS chipset 1404 and a wireless communication component 1405 disposed within a housing 1409. As described above, in various embodiments, the GNSS chipset (e.g., GNSS chipset 1404 of FIG. 14) comprises an abbreviated feature set GNSS chipset. In accordance with various embodiments, the GNSS chipset (e.g., GNSS chipset 1404 of FIG. 14) is configured to process at least one of an L1C GNSS signal and an L2C GNSS signal. In accordance with various embodiments, the GNSS raw observables information comprises at least one of pseudorange information, carrier phase information, and/or Doppler shift information.

In operation 1820, the raw GNSS observables information is wirelessly transmitted from the GNSS chipset to the cellular device. As described above, in various embodiments wireless communication component 1405 is used to wirelessly transmit respective pseudorange information respective carrier phase information derived from each of the GNSS satellite radio signals received via circularly polarized GNSS antenna 1403 to a cellular device (e.g., 1410 of FIG. 14) which is separate from receiving component 1402. As described above, receiving component 1402 can be coupled with various articles of clothing, helmets, support poles for surveying operations, moveable traffic management devices and barriers, etc.

In operation 1830, the raw GNSS observables information is extracted by a processor of the cellular device. As described above, processor 1412 is utilized as the primary processor of cellular device 1410.

In operation 1840, the raw GNSS observables information is used by the processor, in addition to GNSS corrections from at least one correction source, to determine a position of the circularly polarized GNSS antenna. As described above, in accordance with various embodiments a determination is made whether to apply any improvements, including improvements to the pseudorange information, using position accuracy improvement determination logic (e.g., 180B of FIG. 1B) resident upon cellular device 1410. If it is determined that improvements are to be applied by position accuracy improvement determination logic 180B, can determine one or more improvements from a variety of GNSS corrections sources including real carrier phase information, reconstructed carrier phase information, WAAS, DGPS, PPP, RTX, RTK and VRS corrections. In accordance with various embodiments, the pseudorange information received by cellular device 1410 is smoothed to create smoothed pseudorange information using smoothing logic (e.g., 152 of FIG. 1B) resident upon cellular device 1410. In accordance with various embodiments, this smoothing can be based upon real carrier phase information that is derived based on the carrier phase information received from receiving component 1402 using real carrier phase logic (e.g., 152A of FIG. 1B) resident upon cellular device 1410. In accordance with various embodiments the smoothed pseudorange information is corrected using correcting logic (e.g., 151 of FIG. 1B) resident upon cellular device 1410 to create corrected pseudoranges. In accordance with various embodiments, the GNSS corrections are not contained in a GNSS signal, but are received via, for example, cellular network 222 and/or local Wi-Fi 224 of FIG. 2. In accordance with various embodiments, accessing logic of cellular device 1410 (e.g., 110B of FIG. 1B) is used to access Wide Area Augmentation System (WAAS) pseudorange corrections. The WAAS pseudorange corrections are stored in a memory device (e.g., 210 of FIG. 2). The smoothed pseudorange information described above is accessed as well as the WAAS pseudorange corrections using pseudorange information processing logic (e.g., 150 of FIG. 1A) of cellular device 1410. Cellular device 1410 then determines a position fix of circularly polarized GNSS antenna 1403 using pseudorange information processing logic 150 based on the smoothed pseudorange information and the WAAS pseudorange corrections using processor 1412 of cellular device 1410. In accordance with various embodiments, corrected pseudoranges can be created based on one or more types of pseudorange corrections received by cellular device 1410, selected from a group consisting of Differential Global Positioning System (DGPS), Precise Point Positioning (PPP), Real Time Kinematic (RTK), and RTX corrections.

GNSS Receiver System with Radio Frequency (RF) Hardware Component

Figure 19A:
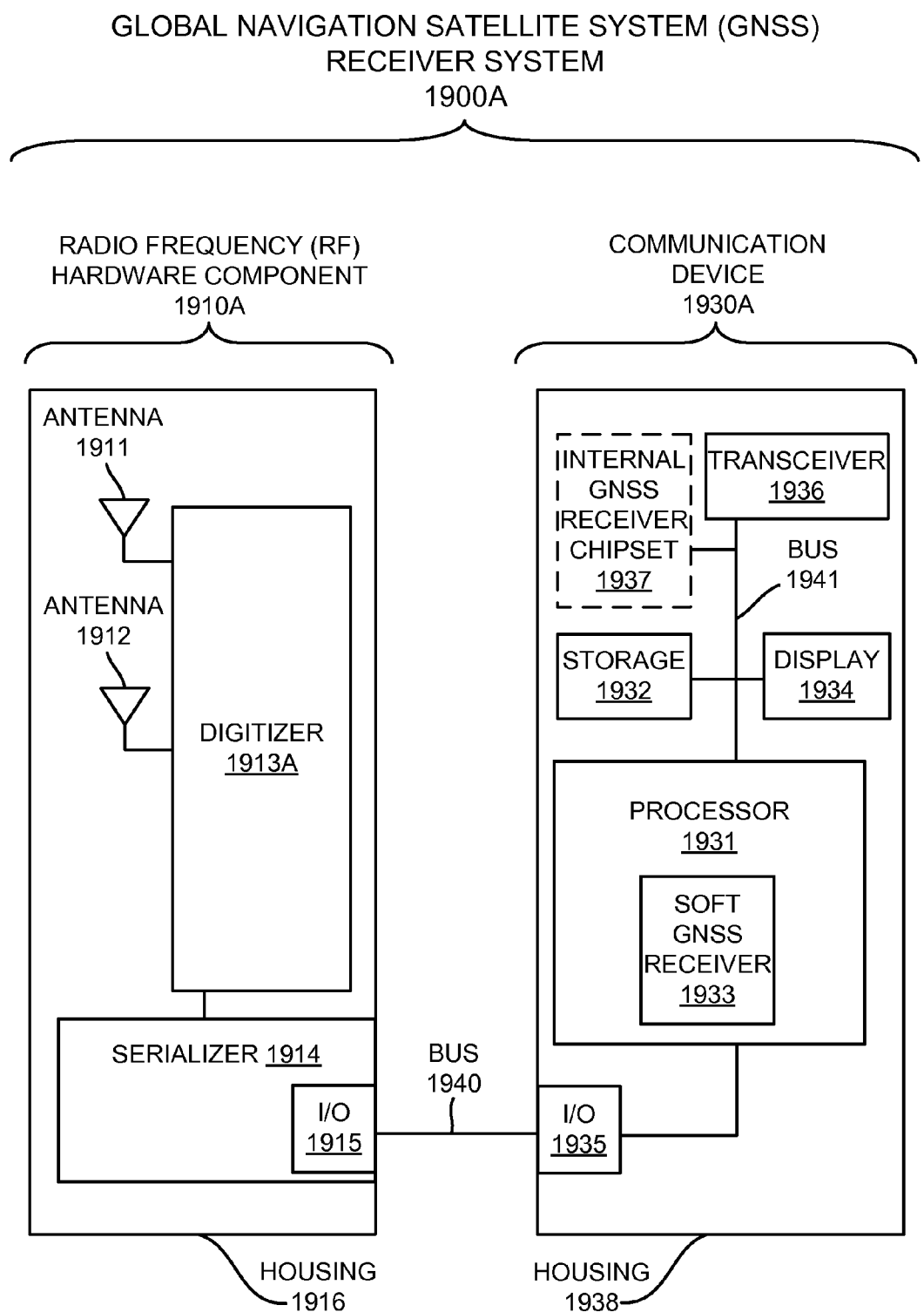
FIG. 19A is a block diagram of a GNSS receiver system, according to various embodiments.

FIG. 19A is a block diagram of a GNSS receiver system 1900A, according to various embodiments. GNSS receiver system 1900A comprises an RF hardware component 1910A and a communication device 1930A, which are communicatively coupled to one another. Bus 1940 is illustrated as the communicative coupling between RF hardware component 1910A and a communication device 1930A; however, other wireline and short-range wireless communicative couplings may be utilized.

In some stand-alone embodiments, a stand-alone radio frequency hardware component 1910A is disposed inside of a housing 1916, as depicted. In some embodiments, RF hardware component 1910A includes: a first antenna 1911, a second antenna 1912, a digitizer 1913, a serializer 1914, and an input/output (I/O) 1915. In some embodiments, where RF hardware component 1910A and communication device 1930A are more highly integrated allowing serializer 1914, I/O 1915, bus 1940, and I/O 1935 to be omitted from the communication path between RF hardware component 1910A and communication device 1930A. Thus, in various embodiments RF hardware component 1910A and communication device 1930A may be stand-alone physical entities that are removably communicatively coupled by wireline or else wirelessly communicatively coupled, one or both may not have a housing, or may they may be integrated with one another.

Housing 1916 may take any form, but in some embodiments is designed to act as a sleeve which includes a receiving cavity into which a portion of particular communication device 1930A snugly fits. In this manner, housing 1916 is paired in a convenient form factor with a communication device 1930A to which it provides GNSS signals, and also serves a dual-purpose of providing an external protective covering for some portions of the communication device 1930A. In other embodiments, housing 1916 may take on the form factor of headwear (e.g., disposed in or as part of a helmet, cap, hardhat, or other head wear in the manner previously depicted herein). In yet other embodiments, housing 1916 may take on other form factors.

First antenna 1911 is a narrow band antenna, and may take any suitable form such including that of a patch antenna or a helical antenna. First antenna 1911 is configured, in one embodiment, for receiving, over-the-air, analog L2C Global Positioning System (GPS) signals in the 1217-1237 MHz frequency range. Second antenna 1912 is a narrow band antenna, and may take any suitable form including that of a patch antenna or a helical antenna. Second antenna 1912 is configured for receiving, over-the-air, analog L1 GNSS signals in the 1525-1614 MHz frequency range. In various embodiments, the L1 signals may be analog L1 GPS signals, or analog L1 GPS signals and one or more of analog L1 Galileo signals and analog pseudolite transmitted GNSS signals in the L1 band. Any received pseudolite signals will be in code division multiple access (CDMA) format like the GPS and Galileo L1 signals (and like the modernized BeiDou and Glonass L1 signals which will be centered 1575.42 MHz). In some embodiments, the first antenna is configured to be able to receive either or both of these modernized BeiDou and Glonass signals when they are available. In some embodiments, first antenna 1911 and second antenna 1912 may share a common phase center with one another. In other embodiments, first antenna 1911 and second antenna 1912 may be separated by a known distance between their respective phase centers which is compensated for during position determination.

Digitizer 1913A operates to amplify and down-convert the L2C and L1 signals received respectively from antennas 1911 and 1912, and then perform an analog to digital conversion by digitally sampling the down-converted L1 and L2C signals. The outputs of digitizer 1913A are a digitized version of the down-converted L1 signals and a digitized version of the down-converted L2C signals that have been received.

Serializer 1914 operates to form the digitized L1 signals and the digitized L2C signals into a serialized output signal which is then output from a stand-alone embodiment of RF hardware component 1910A. For example, as illustrated, the serialized output signal can be output via input/output 1915 which may be a USB port or some other type of port.

Bus 1940 (e.g., a USB cable) coupled to I/O 1915 communicatively couples the serialized output signal to an I/O 1935 of communication device 1930A. Bus 1940 illustrates a serial bus, which may comply with a Universal Serial Bus (e.g., USB 2.0 standard) or other communication protocol. In some embodiments, bus 1940 is a separate component that is not a part of either RF hardware component 1910A or communication device 1930A. It is appreciated that other wireline or wireless means for exchanging data over a short distance (less that approximately 7 meters), besides bus 1940, may be employed in various embodiments. In some embodiments, bus 1940 provides power from communication device 1930A to components of an RF hardware component 1910; while in other embodiments the RF hardware component 1910 uses other internal or external sources of power.

Communication device 1930A is disposed inside a housing 1938 and, in some embodiments, includes: one or more processors 1931, a software defined GNSS ("soft GNSS") receiver 1933 as an application running on at least one processor 1931, storage 1932 (e.g., one or more of random access memory, read only memory, optical storage, and magnetic storage), a display 1934, an I/O 1935, and a transceiver 1936 (e.g., a cellular transceiver, Wi-Fi transceiver, digital two-way radio transceiver, an L-band satellite receiver, or other RF transceiver). In some embodiments communication device 1930A further includes an internal GNSS receiver chipset 1937. Storage 1932 may hold computer-executable instructions that can be executed by processor 1931 to implement the soft GNSS receiver application. In some embodiment where RF hardware component 1910A and communication device 1930A are integrated they may share a single housing and input/output 1915 may be omitted from the communications path between RF hardware component 1910A and communication device 1930A (and may also be omitted from communication device 1930A in some embodiments). In some embodiments, one or more of storage 1932, display 1934, transceiver 1936, and internal GNSS receiver chipset 1937 (when included) are communicatively coupled with processor(s) 1931, such as via bus 1941.

Processor 1931 is external to any GNSS chipset of communication device 1930A. In some embodiments, processor 1931 is a central or host processor of communication device 1930A. In other embodiments, processor 1931 is a graphics processing unit (GPU), a digital signal processor, or other microprocessor of a communications device 1930A.

Communication device 1930A is a device that is capable of two-way RF communication and may be a device such as, but not limited to, a cellular telephone, a tablet computer, a two-way non-cellular radio, a dedicated short range communication (DSRC) radio, or a software defined radio. In one embodiment, the DSRC radio complies with Institute of Electrical and Electronics Engineers (IEEE) 802.11p standards. In one embodiment, the DSRC radio may be implemented as a software defined radio compliant with IEEE 802.11p standard and running on one or more processors.

Housing 1938 may take many sizes shapes and forms, many of which are hand-holdable by a human or wearable by a human. Some forms include the form factor of a cellular telephone, the form factor of a tablet computer, the form factor of a phablet computer (an in-between size between that of a smart phone and a tablet computer), the form factor of headwear (e.g., disposed in or as part of a helmet, cap, hardhat, or other head wear), and the form of eyewear (e.g., Google Glass or similar head-up eyewear communication devices).

Software defined GNSS receiver 1933 utilizes L1 and L2C signals received via I/O 1935 to perform position determination. For example, software defined GNSS receiver 1933 decodes first information (e.g., L2C signals) from the first digitized GNSS signal that is included in the serialized output signal from RF hardware component

1910A. Software defined GNSS receiver 1933 also decodes second information (e.g., L1 I and L1 Q signals) from the second digitized GNSS signal that has been serialized into the serialized output signal from RF hardware component 1910A. A combination of the first information and the second information (e.g., L2C GPS signals and L1 GPS signals) is used to perform carrier phase interferometry to correct the carrier phase of the L1 signals for perturbations caused by ionospheric interference. The corrected L1 GPS signals are then used by software defined GNSS receiver 1933 to perform position determination. They can be used alone or in combination with other L1 signals that have been decoded from the second digitalized GNSS signal that has been serialized into the serialized output signal from RF hardware component 1910A. These other L1 signals include one or more of L1 Galileo signals, L1 BeiDou signals, L1 Glonass signals, and L1 pseudolite signals. In some embodiments, the software defined GNSS receiver 1933 also receives over its own communication means (e.g., transceiver 1936) one or more of WAAS, DGPS, PPP, RTX, RTK, SBAS, and VRS corrections that can be applied while performing the position determination.

Figure 19B:
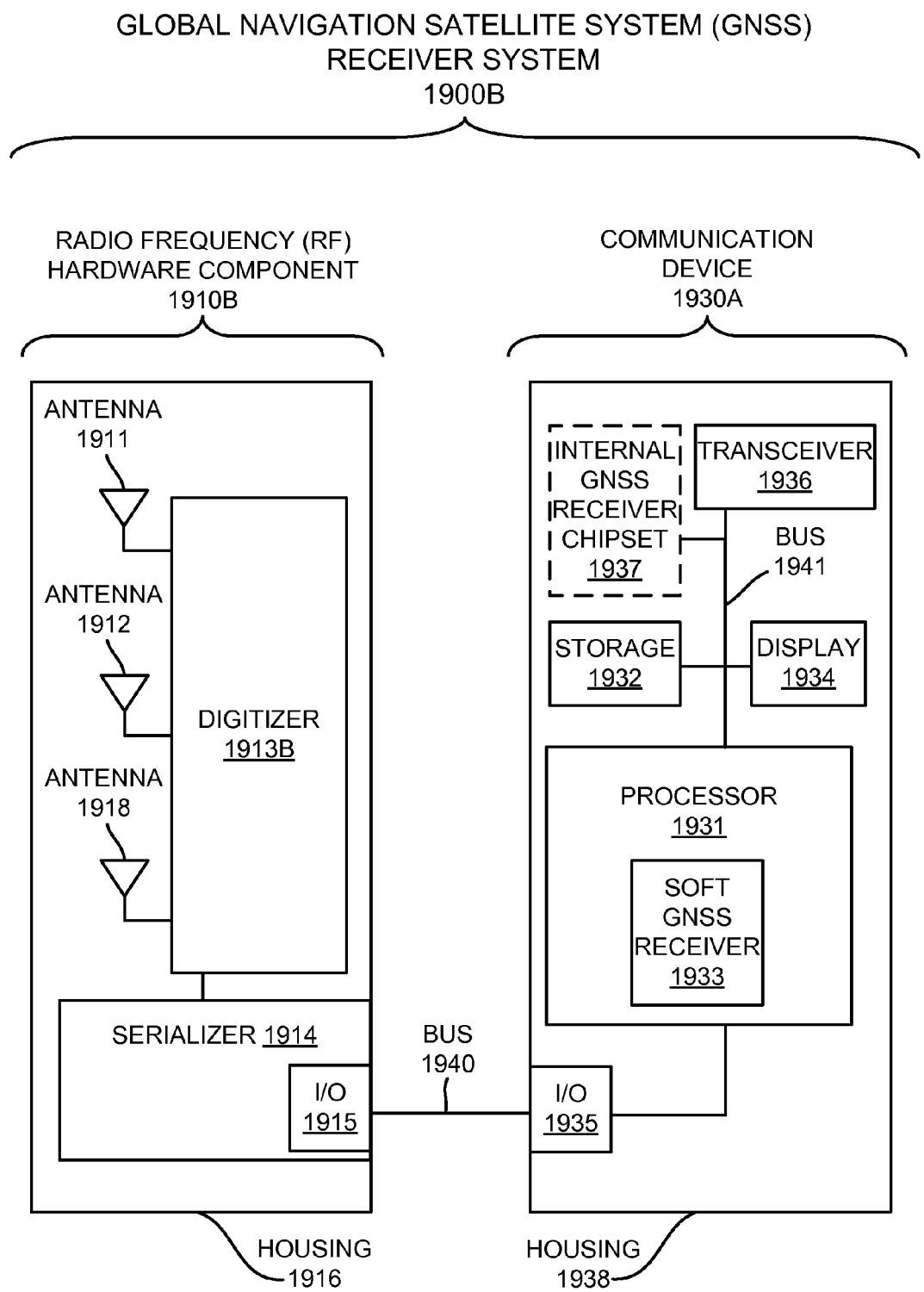
FIG. 19B is a block diagram of a GNSS receiver system, according to various embodiments.

FIG. 19B is a block diagram of a GNSS receiver system 1900B, according to various embodiments. GNSS receiver system 1900B operates in the same fashion as GNSS receiver system 1900A, except for the inclusion of a third antenna, antenna 1918, as a portion of RF hardware component 1910B (as compared to RF hardware component 1910A which includes only two antennas). Third antenna 1918 is a narrow band antenna, and may be implemented in any suitable form including as a patch antenna or as a helical antenna. In one embodiment, third antenna 1918 is configured for receiving, over-the-air, L1 GNSS signals which are centered in the 1217-1237 MHz frequency range. In various embodiments, third antenna 1918 receives BeiDou L1 signals that are centered at 1561.098 MHz, Glonass L1 signals that are in Frequency Division Multiple Access (FDMA) format and centered at 1602 MHz, and/or L1 signals transmitted by terrestrial pseudolite(s) in the FDMA format. In one embodiment, third antenna 1918 is configured for receiving, over-the-air, L5 GNSS signals which are centered in the 1164-1189 MHz frequency range. In various embodiments, the L5 signals may be GPS L5 signals, Galileo L5 signals, BeiDou L5 signals, Glonass L5 signals, or L5 signals transmitted by terrestrial pseudolite(s) in the Frequency Division Multiple Access format. It is appreciated that, in some embodiments, third antenna 1918 may be configured to receive, over-the-air, satellite based augmentation system (SBAS) signals that are transmitted from satellites on one or more bands. In one embodiment, third antenna 1918 is configured for receiving, over-the-air, Mobile Satellite Services band signals (e.g., from OmniSTAR satellites), which are centered in the 1525-1559 MHz range and provide GNSS corrections. In one embodiment, third antenna 1918 is configured for receiving, over-the-air, S-band signals (e.g., IRNSS (Indian Regional Navigation Satellite System) signals or other satellite system signals), which are centered in the 2000-4000 MHz range and provide GNSS corrections. In one embodiment, third antenna 1918 shares a common phase center with both of antennas 1911 and 1912. In one embodiment, one or more of antennas 1911, 1912, and 1918 has a distinct phase center that is not co-located with the phase center of either of the other two antennas. In GNSS receiver system 1900B, as with GNSS receiver system 1900A, RF hardware component 1910B and communication device 1930A may be stand-alone physical entities that are removably communicatively coupled by wireline or else wirelessly communicatively coupled, or may they may be integrated with one another. In an integrated embodiment, serializer 1914, I/O 1915, bus 1940, and I/O 1935 may be omitted from the communication path between RF hardware component 1910B and communication device 1930A (and may be omitted entirely in some embodiments).

Digitizer 1913B operates similarly to digitizer 1913A to amplify and down-convert the L2C and L1 signals received respectively from antennas 1911 and 1912, and then perform an analog to digital conversion by digitally sampling the down-converted L1 and L2C signals. Digitizer 1913B additionally operates to amplify and down-convert the GNSS signals received from antenna 1918, and then perform an analog to digital conversion by digitally sampling the down-converted GNSS signals. The outputs of digitizer 1913B are digitized versions of the down-converted L1 signals, a digitized version of the down-converted L2C signals, and a digitized version of the down-converted signals from antenna 1918.

Serializer 1914, when included, operates to form the digitized versions of the signals received via antennas 1911, 1912, and 1918 into a serialized output signal which is then output from RF hardware component 1910B. For example, as illustrated, the serialized output signal can be output via input/output 1915 which may be a USB port or some other type of port. A bus 1940 (e.g., a USB cable) coupled to I/O 1915 communicatively couples the serialized output signal to an I/O 1935 of communication device 1930A.

Software defined GNSS receiver 1933 utilizes L1 and L2C signals received via I/O 1935 to perform position determination in the manner previously described above except that software defined GNSS receiver 1933 may additionally utilize L1 or L5 signals received via antenna 1918 to assist in performing position determination. As previously described, in some embodiments, the software defined GNSS receiver 1933 also receives, over its own communication means, (e.g., transceiver 1936) one or more of WAAS, DGPS, PPP, RTX, RTK, SBAS, and VRS corrections that can be applied while performing the position determination.

Figure 19C:
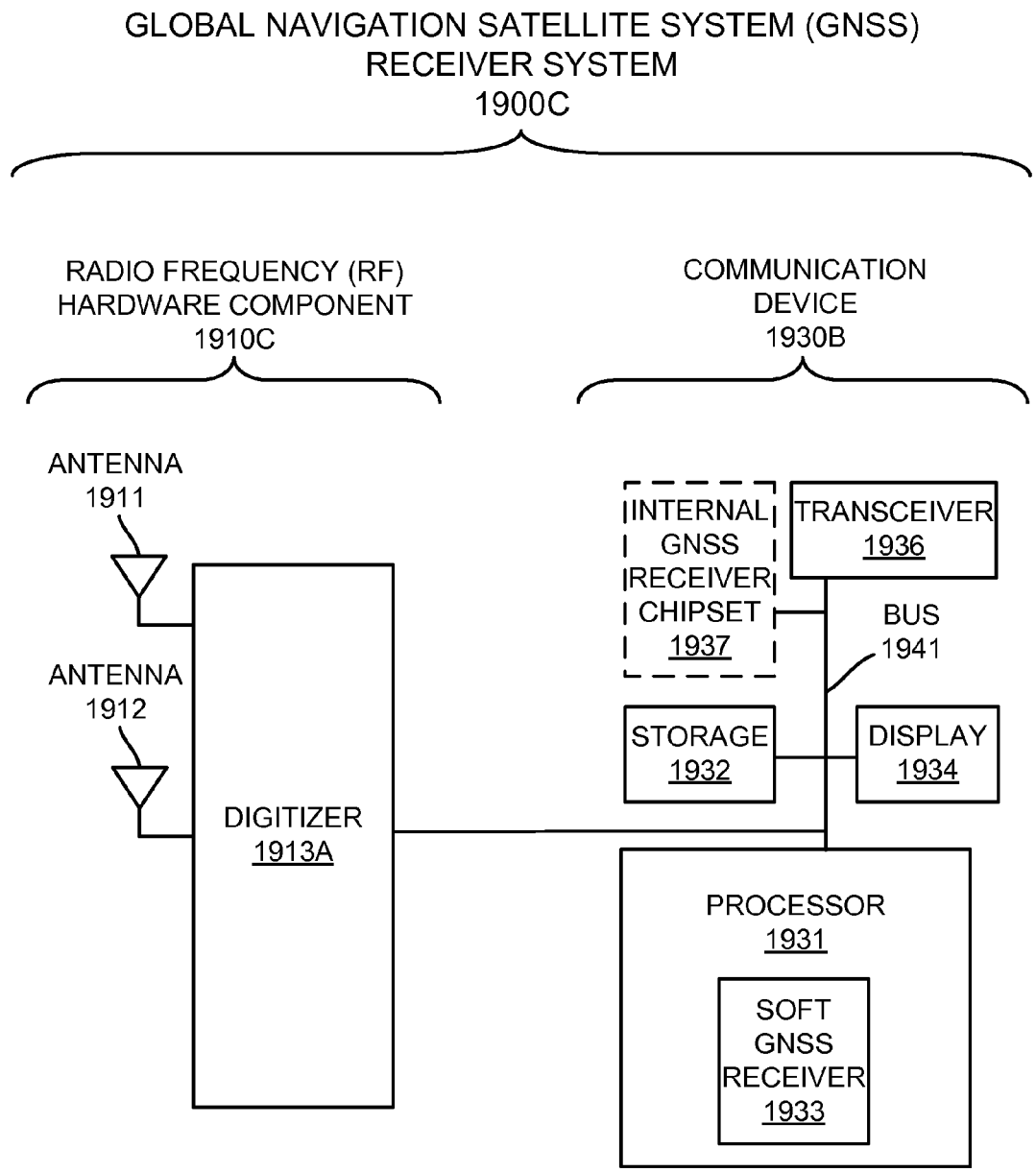
FIG. 19C is a block diagram of a GNSS receiver system, according to various embodiments.

FIG. 19C is a block diagram of a GNSS receiver system 1900C, according to various embodiments. GNSS receiver system 1900C is similar to GNSS receiver system 1900A except that through a higher level of integration, digitized GNSS signals from antennas 1911 and 1912 are provided via bus 1941 to processor 1931 and soft GNSS receiver 1933. RF hardware component 1910C is similar to RF hardware component 1910A, except that serializer 1914, I/O 1915, and housing 1916 are omitted. Communication device 1930B is similar to communication device 1930A except that I/O 1935 and housing 1938 have been omitted. In some embodiments communication device 1930 may be a vehicle subsystem such as a navigation subsystem, a safety subsystem, an infotainment subsystem or the like. In some embodiments, the communication device 1920 includes a processor 1931 which is operating a software defined DSRC radio (in compliance with IEEE 802.11p standards) and the same processor is also used to implement software defined GNSS receiver 1933. Processor 1931 is external to any GNSS chipset of communication device 1930B. In some embodiments, processor 1931 is a central or host processor of communication device 1930B. In other embodiments, processor 1931 is a graphics processing unit (GPU), a digital signal processor, or other microprocessor of a communications device 1930B. In some embodiments, bus 1941 provides power from communication device 1930 to components of an RF hardware component 1910; while in other embodiments the RF hardware component 1910 uses other internal or external sources of power.

Figure 19D:
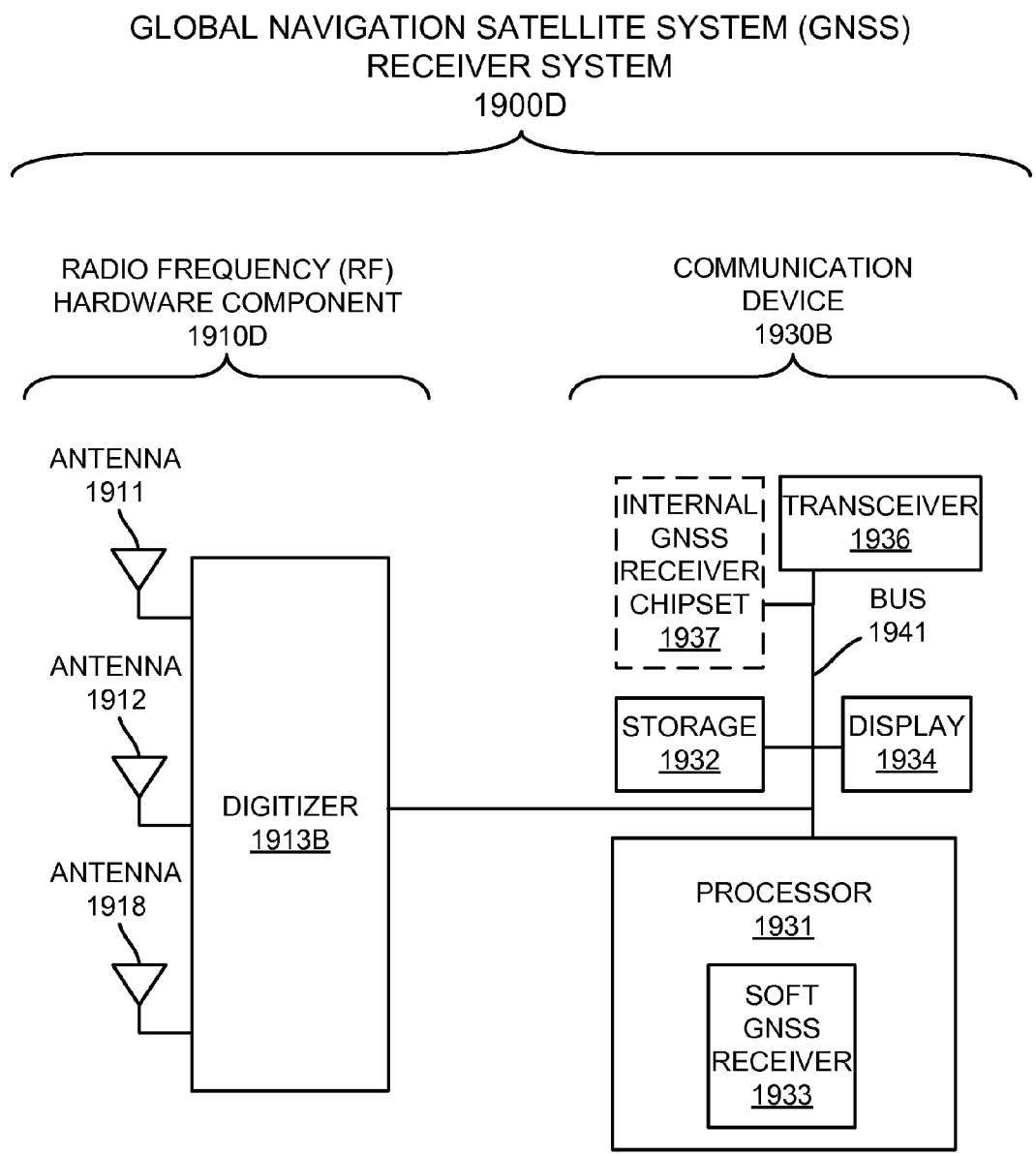
FIG. 19D is a block diagram of a GNSS receiver system, according to various embodiments.

FIG. 19D is a block diagram of a GNSS receiver system 1900D, according to various embodiments. GNSS receiver system 1900D is similar to GNSS receiver system 1900B except that through a higher level of integration, digitized GNSS signals from antennas 1911 and 1912 are provided via bus 1941 to processor 1931 and soft GNSS receiver 1933. RF hardware component 1910D is similar to RF hardware component 1910B, except that serializer 1914, I/O 1915, and housing 1916 are omitted. Communication device 1930B is similar to communication device 1930A except that I/O 1935 and housing 1938 have been omitted. In some embodiments communication device 1930 may be a vehicle subsystem such as a navigation subsystem, a safety subsystem, an infotainment subsystem or the like. In some embodiments, the communication device 1920 includes a processor 1931 which is operating a software defined DSRC radio (in compliance with IEEE 802.11p standards) and the same processor is also used to implement software defined GNSS receiver 1933. Processor 1931 is external to any GNSS chipset of communication device 1930B. In some embodiments, processor 1931 is a central or host processor of communication device 1930B. In other embodiments, processor 1931 is a graphics processing unit (GPU), a digital signal processor, or other microprocessor of a communications device 1930B.

Figure 20A:
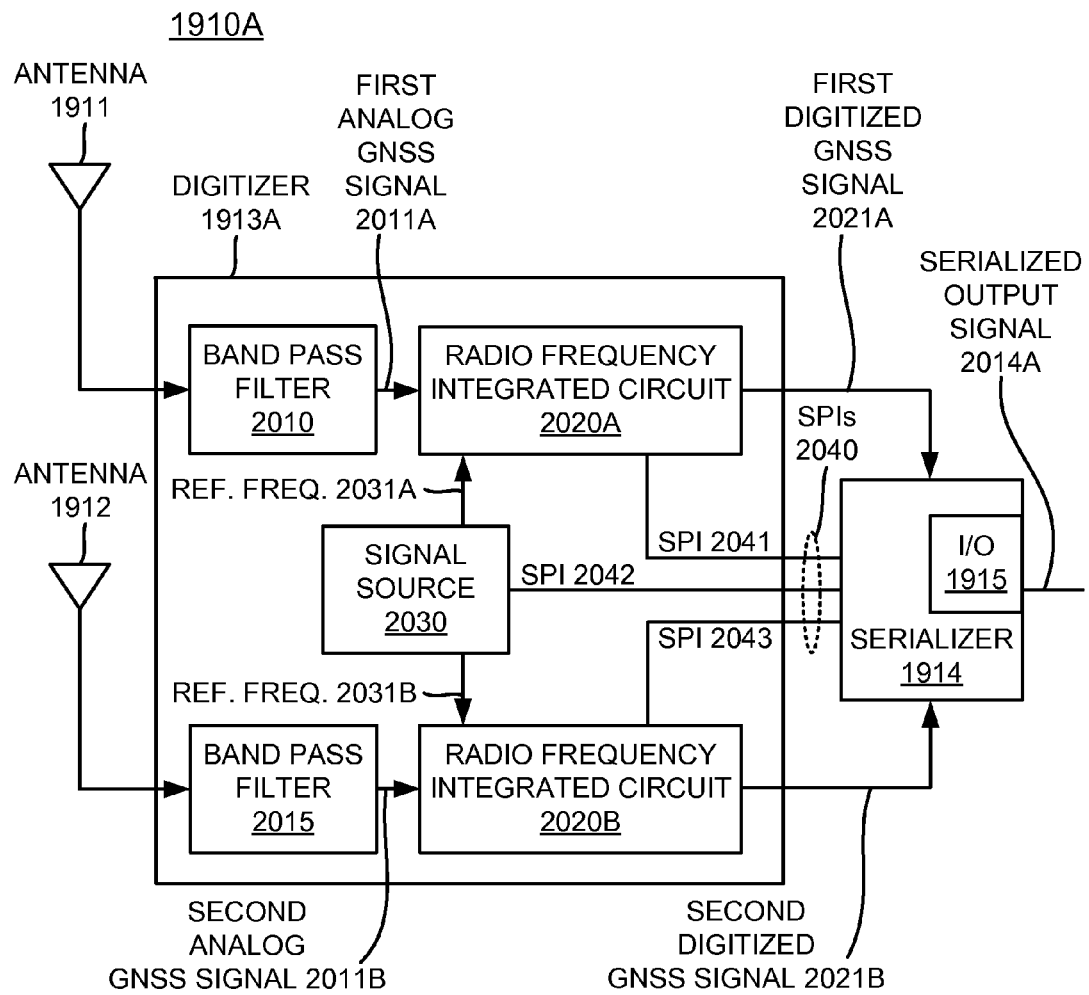
FIG. 20A is a block diagram of a radio frequency hardware component, according to various embodiments.

FIG. 20A is a block diagram of a radio frequency hardware component 1910A, according to various embodiments. RF hardware component 1910A is shown here with greater detail of digitizer 1913A to illustrate signal flow through digitizer 1913A according to one embodiment. In one embodiment, digitizer 1913 A includes a first band pass filter 2010, a second band pass filter 2015, a first radio frequency integrated circuit (RFIC) 2020A, a second RFIC 2020B, and an internal signal source 2030.

In operation, in one embodiment, antenna 1911 receives L2C GNSS signals over-the-air.Band pass filter 2010 operates to pass the band of the L2C signals. In some embodiments, band pass filter 2010 is configurable to a particular frequency band and width of frequency passed. In many embodiments, band pass filter 2010 is configured to have a frequency width that is similar to or the same as the same sampling rate used for analog-to-digital conversion by RFIC 2020A. For example, since the chipping rate of an L2C signal is 1.023 MHz, it may be sampled for analog-to-digital conversion at approximately 2 MHz or twice the chipping rate. In one embodiment, band pass filter 2010 may thus be configured to pass a 2 MHz band, with 1 MHz being on each side of the L2C center frequency of 1,227.60 MHz. Band pass filter 2010 outputs a first analog GNSS signal 2011A (e.g., a filtered L2C signal that has been received over-the-air) to RFIC 2020A. RFIC 2020A utilizes a reference frequency 2031A supplied by signal source 2030 (e.g., a fixed frequency or configurable temperature controlled crystal oscillator) to down-convert first analog GNSS signal 2011A. The down-converted version of first analog GNSS signal 2011A is then sampled, digitized, and output to serializer 1914 as a first digitized GNSS signal 2021A.

In operation, in one embodiment, antenna 1912 receives L1 GNSS signals over-the-air. Band pass filter 2015 operates to pass the band of the L1 signals. In some embodiments, band pass filter 2015 is configurable to a particular frequency band and width of frequency passed. In many embodiments, band pass filter 2015 is configured to have a frequency width that is similar to or the same as the same sampling rate used for analog-to-digital conversion by RFIC 2020B. For example, since the chipping rate of an L1 GPS signal is 1.023 MHz, it may be sampled for analog-to-digital conversion at approximately 2 MHz or twice the chipping rate. In one embodiment, band pass filter 2015 may thus be configured to pass a 2 MHz band, with 1 MHz being on each side of the L1 GPS center frequency of 1,575.42 MHz. Band pass filter 2015 outputs a second analog GNSS signal 2011B (e.g., a filtered L1 GPS signal that has been received over-the-air) to RFIC 2020B. RFIC 2020B utilizes a reference frequency 2031B supplied by signal source 2030 to down-convert second analog GNSS signal 2011B. The down-converted version of second analog GNSS signal 2011B is then sampled, digitized, and output to serializer 1914 as a second digitized GNSS signal 2021B.

Serializer 1914 operates to serialize the second digitized GNSS signal 2021B (i.e., digitized L1 GPS signals) and the first digitized GNSS signal 2021A (i.e., digitized L2C signals) into a serialized output signal 2014 which is then output from RF hardware component 1910A.

I/O 1915 and serializer 1914 also operate as a serial periphery interface (SPI), in some embodiments, to receive configuration commands from processor 1931 of communication device 1930A. SPIs 2040 includes SPI 2041 which provides configuration to RFIC 2020A, SPI 2042 which provides configuration instruction to signal source 2030, and SPI 2043 which provides configuration to RFIC 2020B. In integrated embodiments where I/O 1915 and serializer 1914 are not utilized SPIs 2040 may be replaced by other communication paths with processor 1931.

Figure 20B:
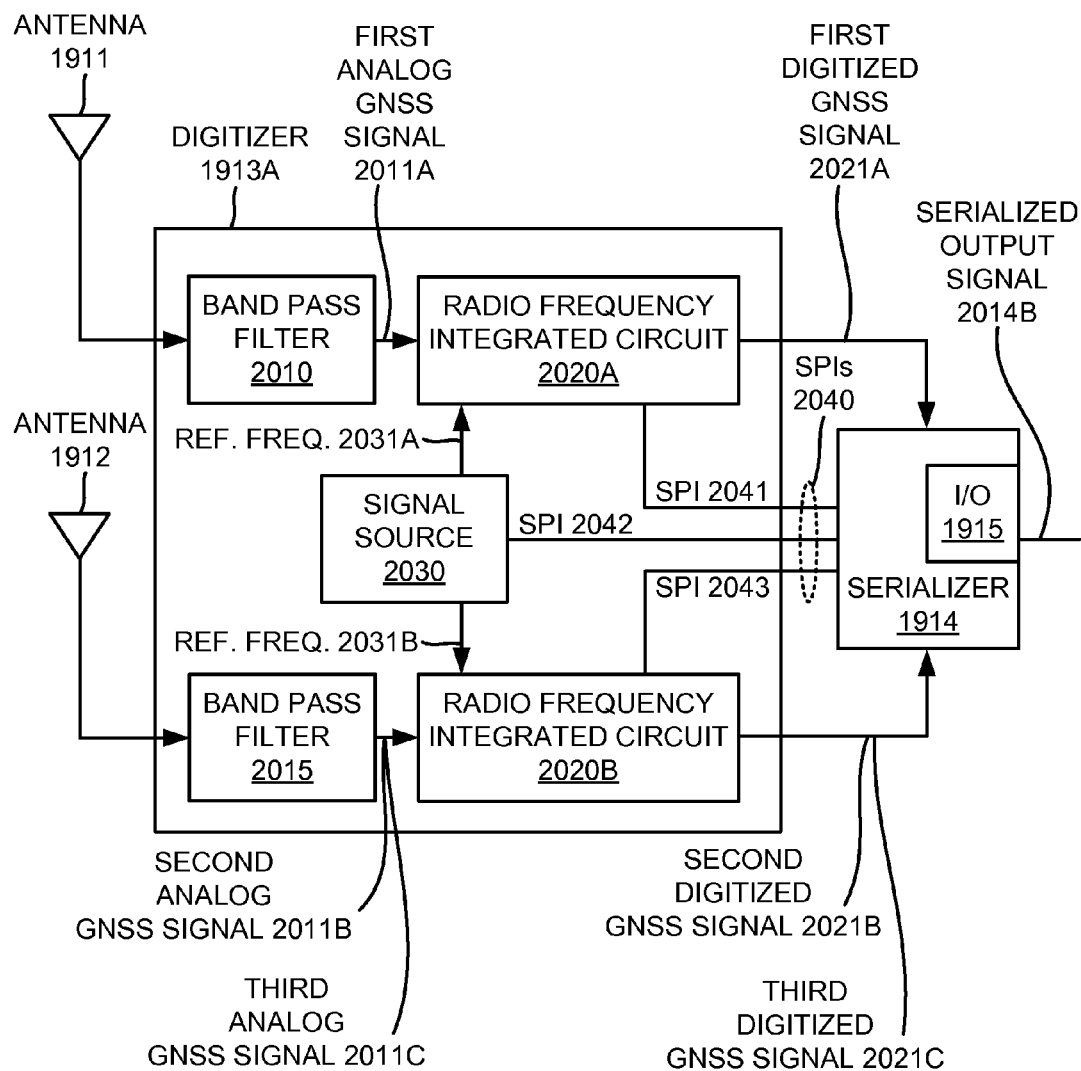
FIG. 20B is a block diagram of a radio frequency hardware component, according to various embodiments.

FIG. 20B is a block diagram of a radio frequency hardware component 1910A, according to various embodiments. In operation, RF hardware component 1910A of FIGS. 20A and 20B are identical similar except that antenna 1912 receives additional L1 GNSS signals over-the-air, which are then filtered, digitized, and serialized. For example, band pass filter 2015 operates to pass the band of the L1 signals. In some embodiments, band pass filter 2015 is configurable to a particular frequency band and width of frequency passed. In many embodiments, band pass filter 2015 is configured to have a frequency width that is similar to or the same as the same sampling rate used for analog-to-digital conversion by RFIC 2020B. In radio frequency hardware component 1910A, L1 GPS signals are sampled along with a second L1 GNSS signal (e.g., at least one of a Galileo L1 signal, a BeiDou L1 signal, a Glonass L1 signal, or a pseudolite L1 signal). As the chipping rate for the second GNSS signal is also 1.023 MHz, the sampling rate can be doubled to approximately 4 MHz when L1 signals from two disparate GNSS systems are sampled. In one embodiment, band pass filter 2015 may thus be configured to pass a 4 MHz band (which may be adjusted upward to include Glonass signals in some embodiments). Band pass filter 2015 outputs a second analog GNSS signal 2011B (e.g., a filtered GPS L1 signal that has been received over-the-air) and a third analog GNSS signal2011C (e.g., a filtered Galileo L1 signal, and both are provided to RFIC 2020B. RFIC 2020B utilizes a reference frequency 2031B supplied by signal source 2030 to down-convert second analog GNSS signal 2011B and third analog GNSS signal 2011C. The down-converted versions of second analog GNSS signal 2011B and third analog GNSS signal 2011C are then sampled, digitized, and output as a second digitized GNSS signal 2021B and third digitized GNSS signal 2021C, respectively, to serializer 1914.

Figure 20C:
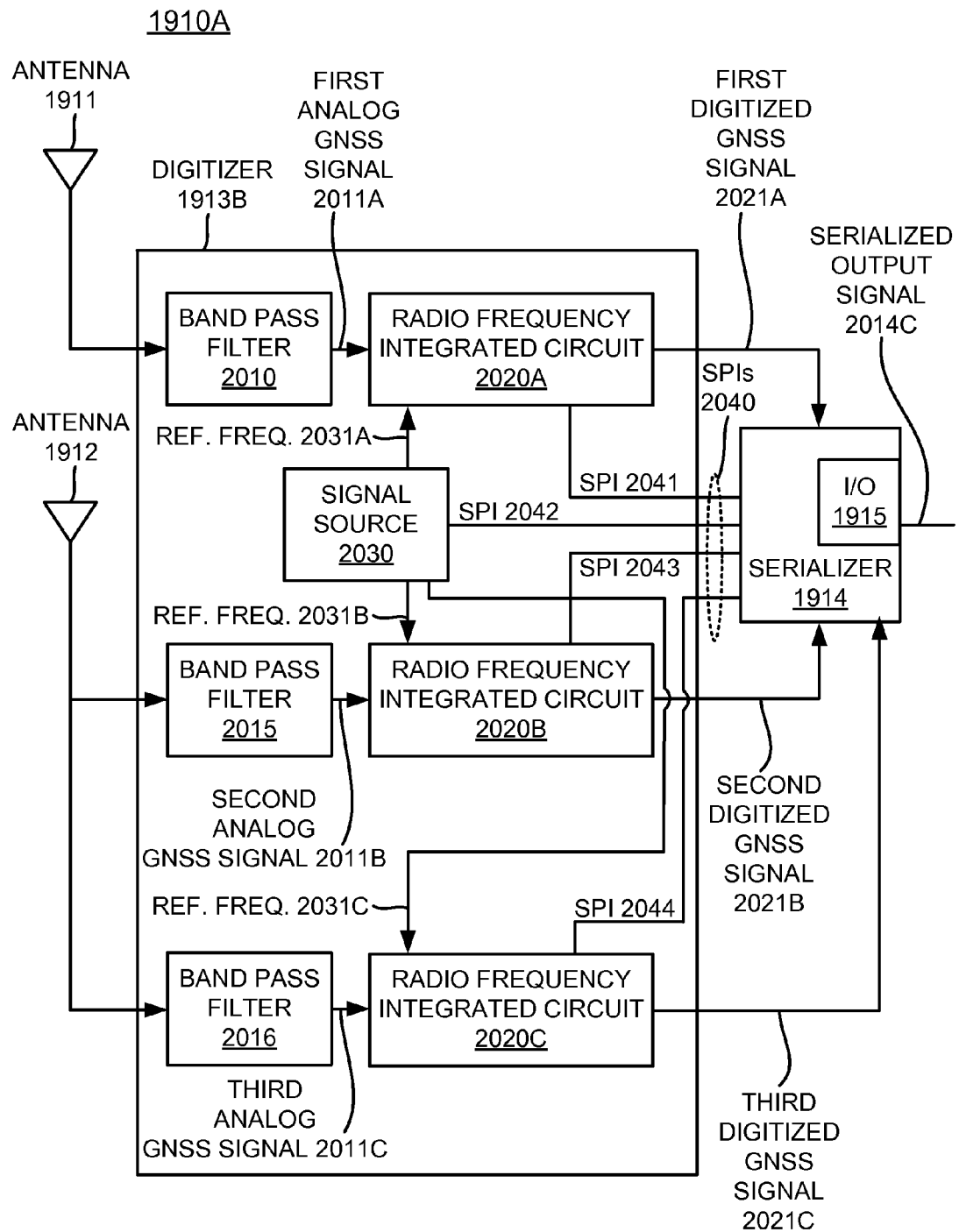
FIG. 20C is a block diagram of a radio frequency hardware component, according to various embodiments.

FIG. 20C is a block diagram of a radio frequency hardware component 1910A, according to various embodiments.

In operation, RF hardware component 1910A of FIGS. 20A and 20C are identical similar except that antenna 1912 receives additional L1 GNSS signals over-the-air, which are then filtered, digitized along a separate path. For example, band pass filter 2016 operates to pass the band of the L1 signals similar to band pass filter 2015 (and may be omitted in some embodiments. In some embodiments, band pass filter 2016 is configurable to a particular frequency band and width of frequency passed. In many embodiments, band pass filter 2016 is configured to have a frequency width that is similar to or the same as the same sampling rate used for analog-to-digital conversion by RFIC 2020C. In radio frequency hardware component 1910A of FIG. 20C, L1 GPS signals are sampled in RFIC 2020B along with additional L1 GNSS signals being sampled by RFIC 2020C (e.g., at least one of a conventional BeiDou L1 signal, a conventional Glonass L1 signal, or a pseudolite FDMA L1 signal). Band pass filter 2016 outputs a third analog GNSS signal 2011C (e.g., a filtered conventional Glonass L1 signal) which is then provided to RFIC 2020C. RFIC 2020C utilizes a reference frequency 2031C supplied by signal source 2030 to down-convert third analog GNSS signal 2011C. The down-converted version third analog GNSS signal 2011C is then sampled, digitized, and output as third digitized GNSS signal 2021C to serializer 1914.

Figure 20D:
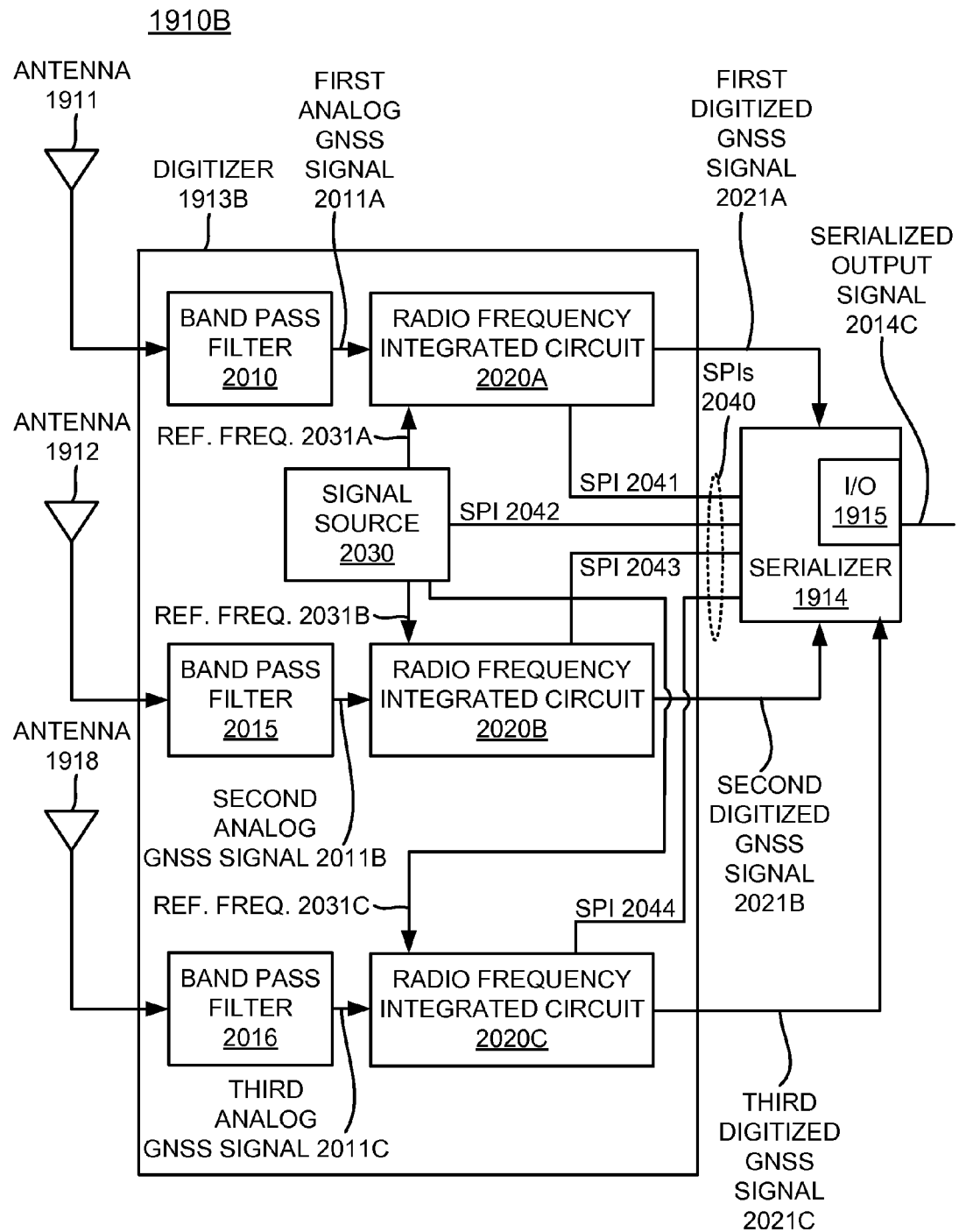
FIG. 20D is a block diagram of a radio frequency hardware component, according to various embodiments.

FIG. 20D is a block diagram of a radio frequency hardware component, according to various embodiments. In operation, RF hardware component 1910A and 1910B are similar except that additional components antenna 1918, band pass filter 2016, and RFIC 2020C are included. In one embodiment, antenna 1918 receives an L5 GNSS signal over-the-air, which is then filtered, digitized, and serialized. For example, band pass filter 2016 operates to pass the band of the L5 signal. In some embodiments, band pass filter 2016 is configurable to a particular frequency band and width of frequency passed. In many embodiments, band pass filter 2016 is configured to have a frequency width that is similar to or the same as the same sampling rate used for analog-to-digital conversion by RFIC 2020C. As the chipping rate for an L5 GNSS signal is 10.23 MHz, the sampling rate can be approximately 10 MHz In one embodiment, band pass filter 2015 may thus be configured to pass a 10 MHz band centered on the L≡GNSS frequency of 1,176.45 MHz Band pass filter 2015 outputs a third analog GNSS signal 2011C (e.g., a filtered GPS L5 signal that has been received over-the-air). RFIC 2020C, may be configured utilizing SPI 2044, and utilizes a reference frequency 2031C supplied by signal source 2030 to down convert third analog GNSS signal 2011C. The down-converted version of third analog GNSS signal 2011C is then sampled, digitized, and output as a third digitized GNSS signal 2021C to serializer 1914. In one embodiment, antenna 1918 receives an analog Satellite Based Augmentation System (SBAS) signal (e.g., from an OmniSTAR satellite, or other satellite that provides GNSS corrections) over-the-air, which is then filtered, digitized, and serialized in a similar manner as described above with respect to the L5 signal. The digitized SBS signal is then provided to processor 1931.

Figure 20E:
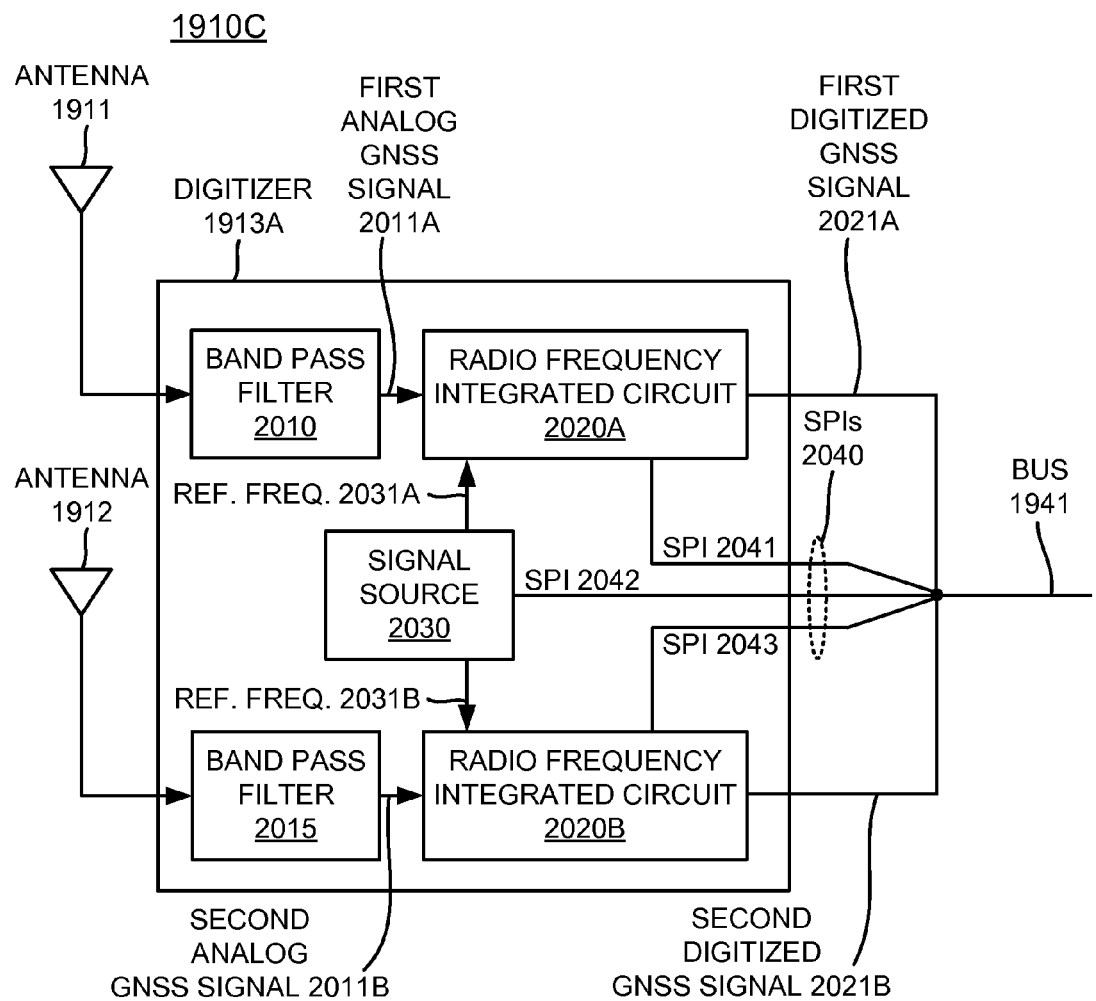
FIG. 20E is a block diagram of a radio frequency hardware component, according to various embodiments.

FIG. 20E is a block diagram of a radio frequency hardware component 1910C, according to various embodiments. RF hardware component 1910C is similar in operation to RF hardware component 1910A of FIG. 20A except that the first digitized GNSS signal 2021A and second digitized GNSS signal 2021B are coupled over bus 1941 or other similar line(s) that couple directly with processor 1931 (as illustrated in FIG. 19C) while omitting serializer 1914 from the communications path. Similarly, in some embodiments control signals such as SPIs 2040 may be coupled received via bus 1941 or other communicative coupling with processor 1931 that omits serializer 1914 from the communications path.

Figure 20F:
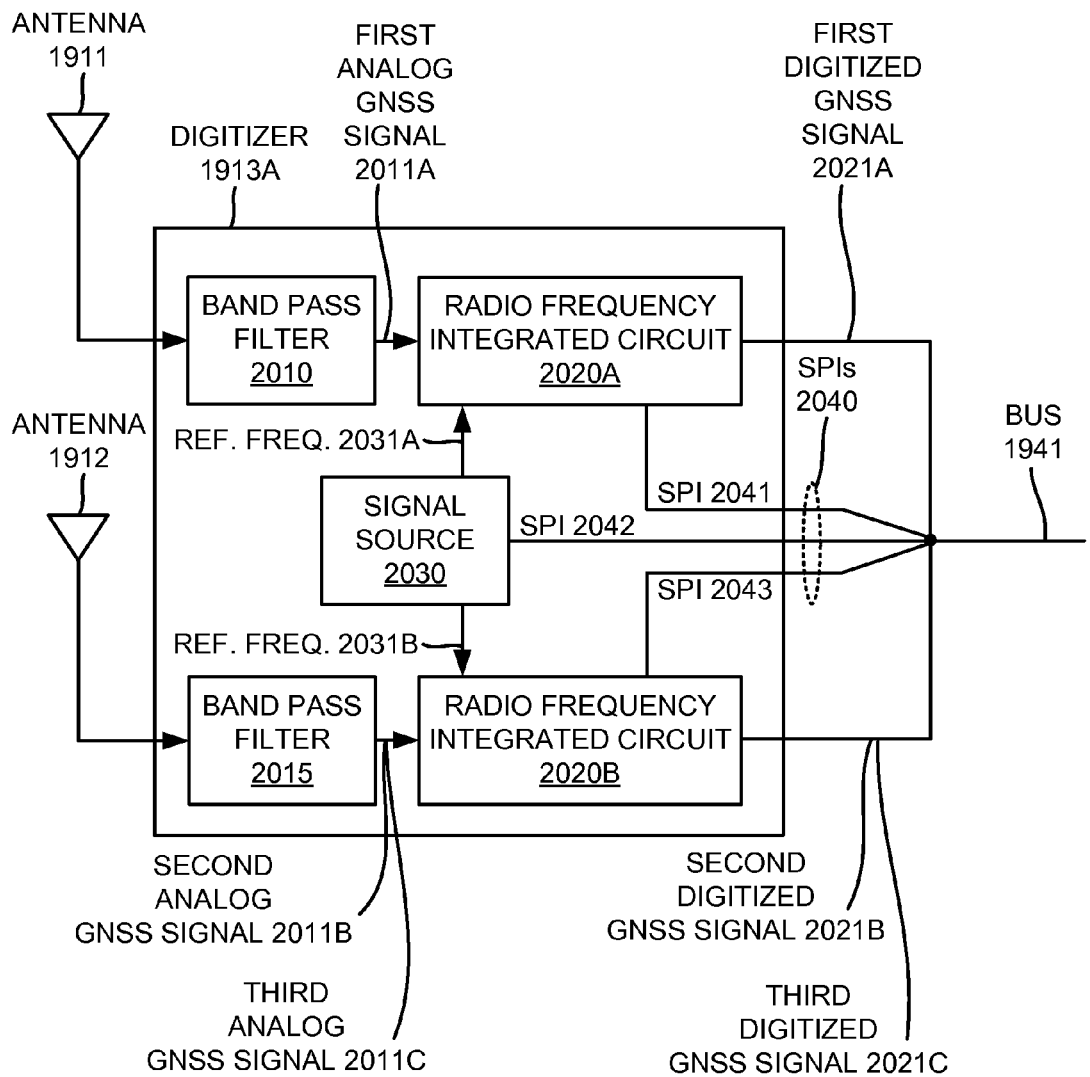
FIG. 20F is a block diagram of a radio frequency hardware component, according to various embodiments.

FIG. 20F is a block diagram of a radio frequency hardware component 1910C, according to various embodiments. RF hardware component 1910C is similar in operation to RF hardware component 1910A of FIG. 20B except that the first digitized GNSS signal 2021A, second digitized GNSS signal 2021B, and third digitized GNSS signal 2021C are coupled over bus 1941 or other similar line(s) that couple directly with processor 1931 (as illustrated in FIG. 19C) while omitting serializer 1914 from the communications path. Similarly, in some embodiments control signals such as SPIs 2040 may be coupled received via bus 1941 or other communicative coupling with processor 1931 that omits serializer 1914 from the communications path.

Figure 20G:
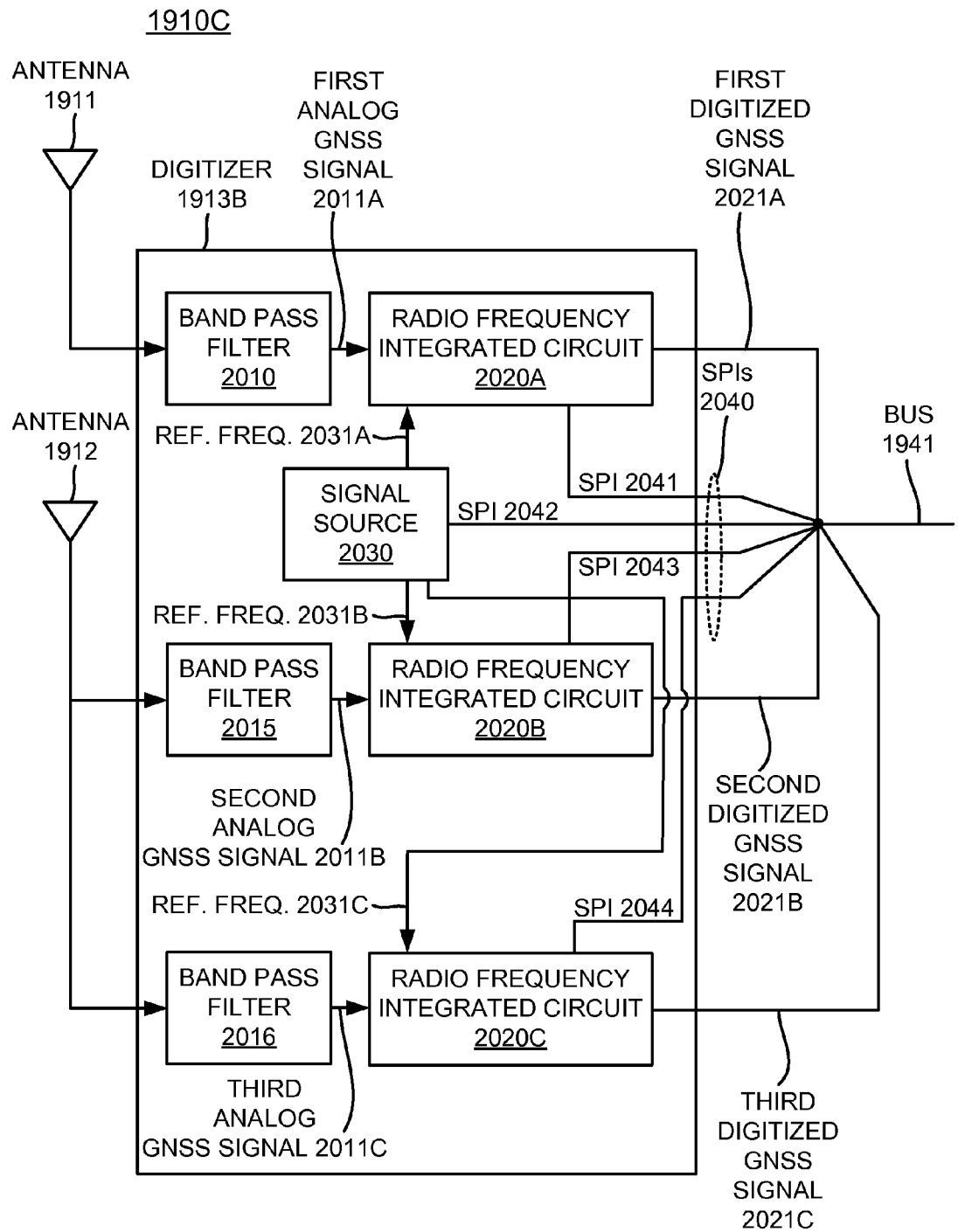
FIG. 20G is a block diagram of a radio frequency hardware component, according to various embodiments.

FIG. 20G is a block diagram of a radio frequency hardware component 1910D, according to various embodiments. RF hardware component 1910C is similar in operation to RF hardware component 1910B of FIG. 20C except that the first digitized GNSS signal 2021A, second digitized GNSS signal 2021B, and third digitized GNSS signal 2021C are coupled over bus 1941 or other similar line(s) that couple directly with processor 1931 (as illustrated in FIG. 19C) while omitting serializer 1914 from the communications path. Similarly, in some embodiments control signals such as SPIs 2040 or their equivalents may be coupled via bus 1941 or other communicative coupling with processor 1931 that omits serializer 1914 from the communications path.

Figure 20H:
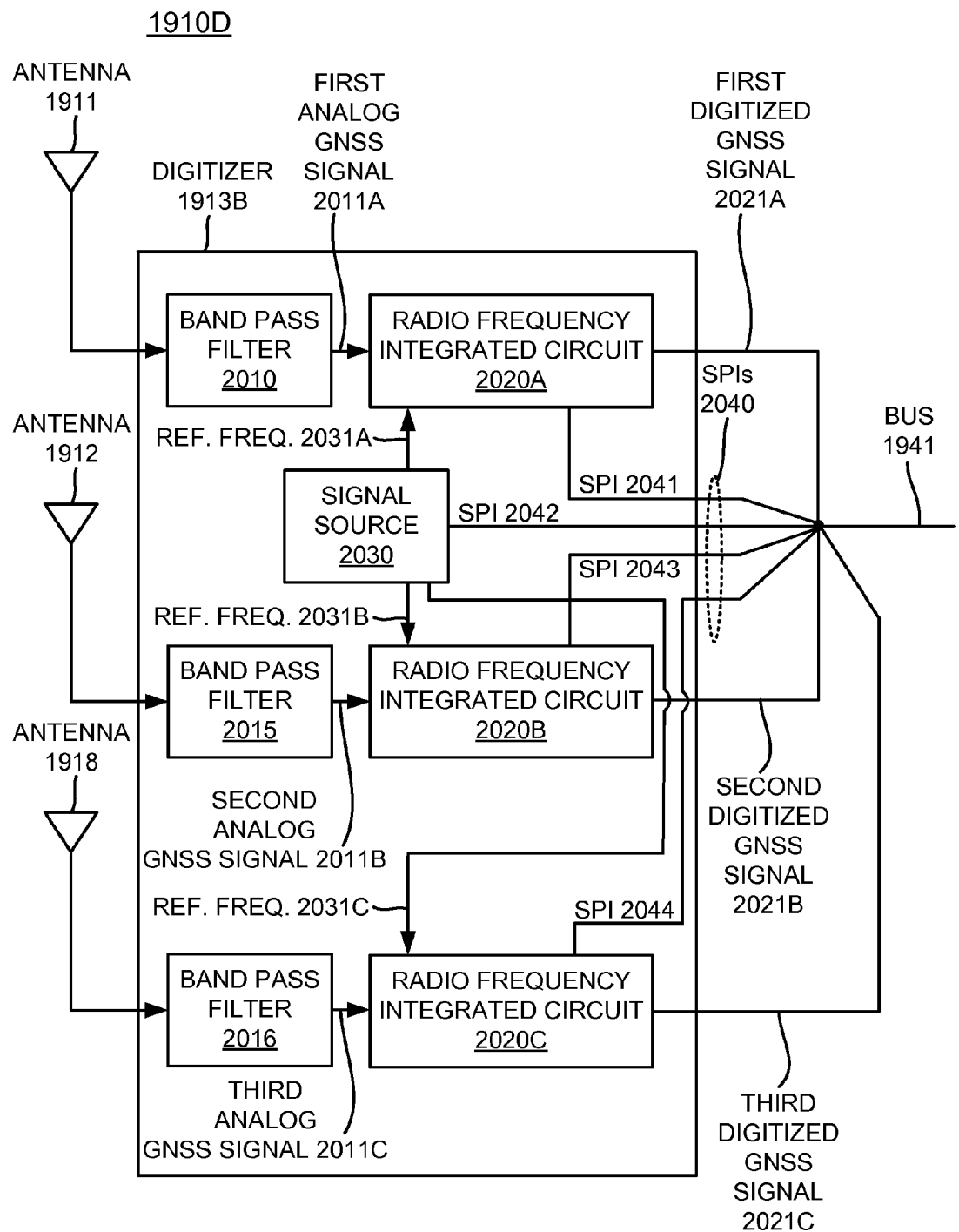
FIG. 20H is a block diagram of a radio frequency hardware component, according to various embodiments.

FIG. 20H is a block diagram of a radio frequency hardware component 1910D, according to various embodiments. RF hardware component 1910D is similar in operation to RF hardware component 1910B of FIG. 20D except that the first digitized GNSS signal 2021A, second digitized GNSS signal 2021B, and third digitized GNSS signal 2021C are coupled over bus 1941 or other similar line(s) that couple directly with processor 1931 (as illustrated in FIG. 19C) while omitting serializer 1914 from the communications path. Similarly, in some embodiments control signals such as SPIs 2040 or their equivalents may be coupled via bus 1941 or other communicative coupling with processor 1931 that omits serializer 1914 from the communications path. In an embodiment wherein an analog Satellite Based Augmentation System (SBAS) signal is received, filtered, and digitized, it is coupled over bus 1941 or other similar means that couple directly with processor 1931 while omitting serializer 1914 from the communications path.

Figure 21:
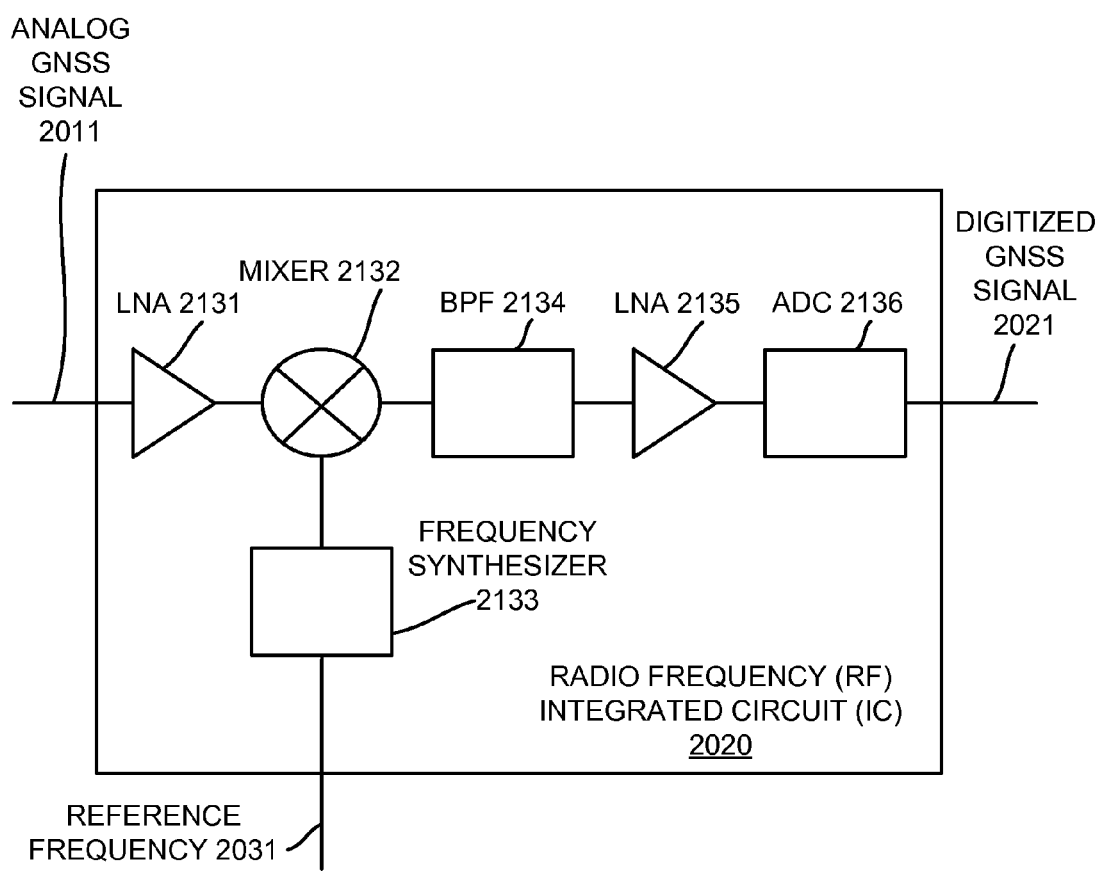
FIG. 21 is a block diagram of a radio frequency integrated circuit, according to various embodiments.

FIG. 21 is a block diagram of a radio frequency integrated circuit 2020, according to various embodiments. The depiction in FIG. 21 is generic and may apply to any RFIC 2020 (e.g., 2020A, 2020B, or 2020C) described herein. As illustrated, an analog GNSS signal 2011 is received as an input and then amplified by Low Noise Amplifier (LNA) 2131. The amplified analog GNSS signal 2011 is then received at mixer 2132 where it is mixed with a reference frequency 2031 to create an intermediate frequency. The reference frequency is produced by frequency synthesizer 2133, and is a harmonic of a stable reference frequency 2031 that it receives as an input. The output of mixer 2132 is filtered by band pass filter 2134 at the intermediate frequency to exclude other output produced by mixer 2132. A second amplifier, LNA 2135, then further amplifies the filtered intermediate frequency signal to provide gain control prior to sampling for analog-to-digital conversion by analog-to-digital convertor 2136. Analog-to-digital convertor 2136 outputs a digitized version of the intermediate frequency signal which is then coupled to the soft GNSS receiver 1933 (either directly in an integrated embodiment or through serialization and transmission in other embodiments in which the RF hardware component 1910 and the communication device 1930A are not integrated).

Figure 22:
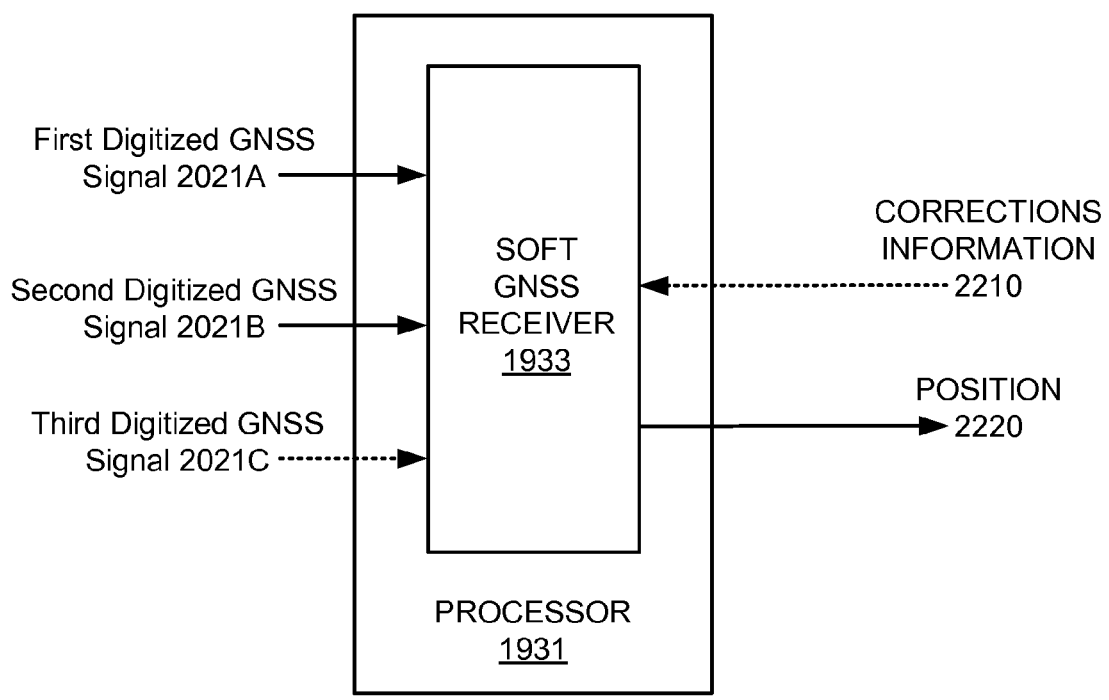
FIG. 22 is a block diagram of a software defined GNSS receiver, according to various embodiments.

FIG. 22 is a block diagram of a software defined GNSS receiver 1933, according to various embodiments. Software defined GNSS receiver 1933 is also referred to herein as a "soft GNSS receiver." Software defined GNSS receivers are a type of software defined radio in which correlating, dispreading, and other functions of a GNSS receiver are accomplished digitally by a program running on a processor. Software defined GNSS receivers and their implementation are well-known by those of skill in the art. As illustrated in FIG. 22, software defined GNSS receiver receives digitized GNSS signals (2021A, 2021B, and in some embodiments 2021C) as inputs. Soft GNSS receiver 1933 generates first information such as pseudorange, code, carrier phase, and/or Doppler shift information from the first digitized GNSS signal 2021A. In some embodiments, the first information may be associated with L2C signals from GPS satellites. Soft GNSS receiver 1933 generates second information such as pseudorange, code, carrier phase, and/or Doppler shift information from the second digitized GNSS signal 2021B. In some embodiments, the second information may be associated with L1 signals from GPS satellites that at least include the GPS satellites that provide the L2C information and may include additional GPS satellites. In some embodiments when third digitized GNSS signal 2021 is received, soft GNSS receiver 1933 generates third information such as pseudorange, code, carrier phase, and/or Doppler shift information from the third digitized GNSS signal 2021A. In some embodiments, the third information may be associated with L5 GNSS signals or L1 GNSS signals or SBAS signals. Soft GNSS receiver 1933 may also receive one or more corrections 2210 (e.g., one or more of WAAS, DGPS, PPP, RTX, RTK, SBAS and VRS) as digital inputs that are received over-the-air via transceiver 1936 of communication device 1930A. Soft GNSS receiver 1933 operates to determine a position based at least on a combination of the first information and the second information, but may also utilize the third information and/or corrections 2210 when determining the position.

Figure 23A:
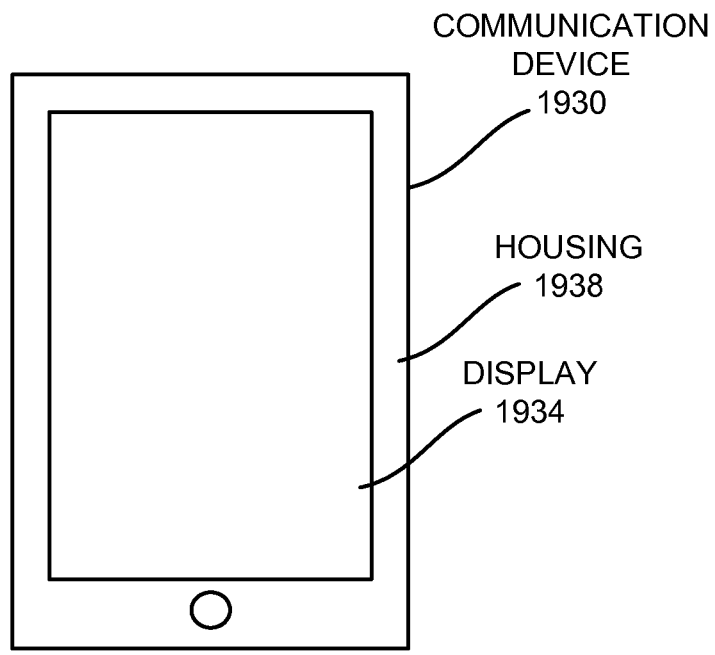
FIG. 23A is a front view of a communication device, according to various embodiments.

FIG. 23A is a front view of a communication device 1930A, according to various embodiments. Communication device 1930A includes display 1934 and housing 1938.

Figure 23B:
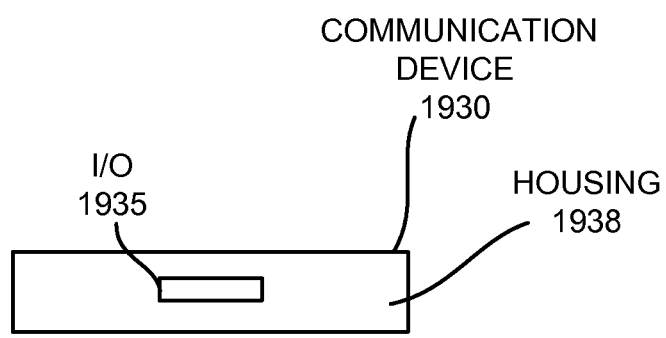
FIG. 23B is a bottom side view of a communication device, according to various embodiments.

FIG. 23B is a bottom side view of a communication device 1930A, according to various embodiments. In one embodiment an I/O 1935 is included in some portion of housing 1938. Here it has been depicted on a bottom side edge; however, in other embodiments, female I/O 1935 may be located in other portions of housing 1938.

Figure 24:
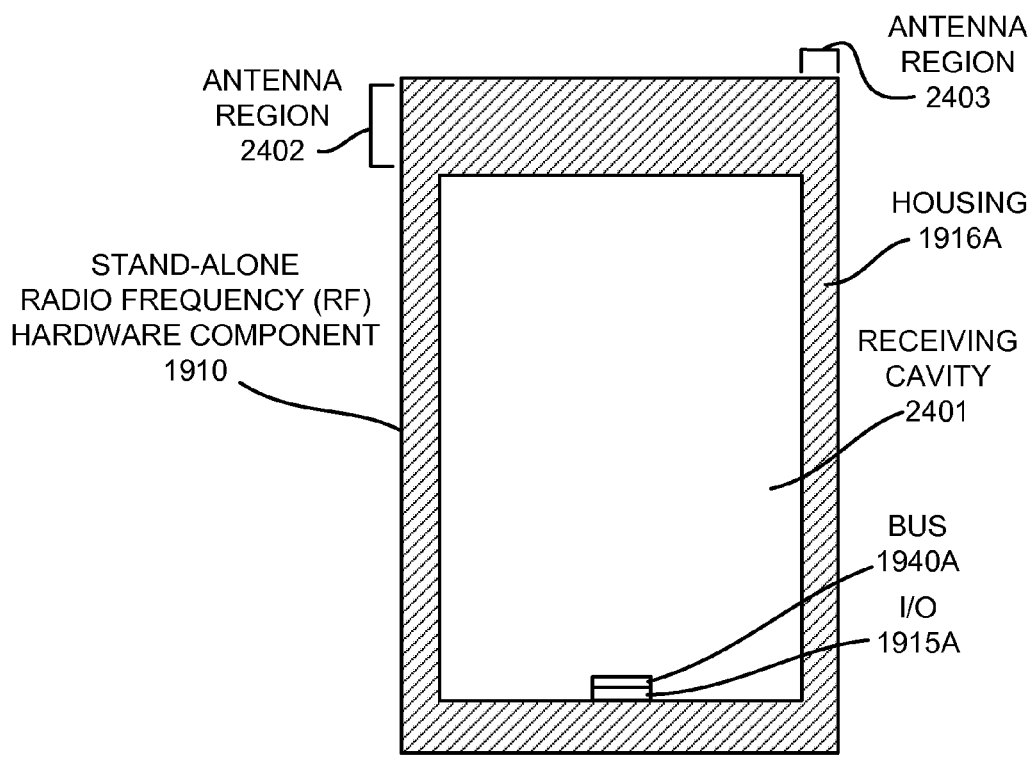
FIG. 24 is a front view of the outside of radio frequency hardware component, according to various embodiments.

FIG. 24 is a front view of the outside of radio frequency hardware component 1910, according to various embodiments. As depicted in FIG. 24, radio frequency hardware component 1910 is a stand-alone component which can operate as a sleeve or protective shell that the housing 1938 of a separate communication device can be nestled within or otherwise conveniently and removably affixed by virtue of design. For example, as illustrated, housing 1916A includes a receiving cavity 2401 and a male I/O 1915A which also includes a bus 1940A. Antennas such as antennas 1911, 1912, and in some embodiments 1918 may be embedded anywhere within housing 1938, but in some embodiments are located upper edge antenna region 2402 or a side edge antenna region 2403.

Figure 25:
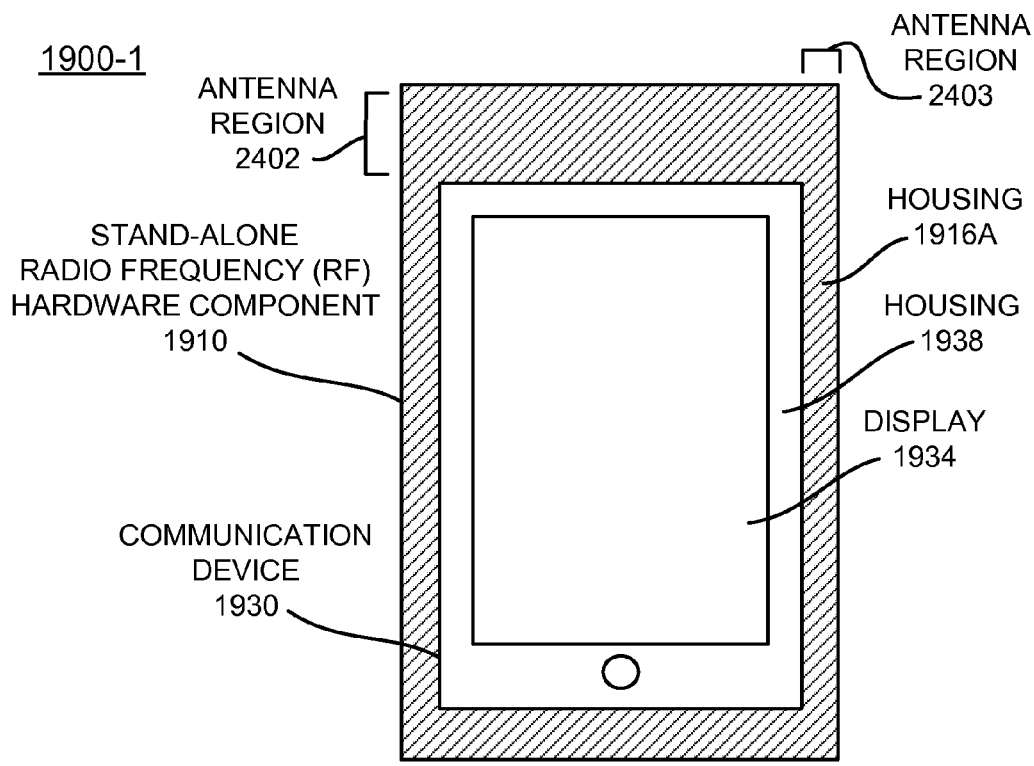
FIG. 25 is a front view of the outside of radio frequency hardware component coupled with a communication device to form a GNSS receiver, according to various embodiments.

FIG. 25 is a front view of the outside of radio frequency hardware component 1910 that is coupled with a communication device 1930A to form GNSS receiver 1900-1, according to various embodiments. Communication device 1930A resides snugly within receiving cavity 2401. As part of the coupling, bus 1940A and I/O 1915A have been inserted into the female I/O 1935 of communication device 1930A, thus engaging a removable communicative coupling between RF hardware component 1910 and communication device 1930A. It should be appreciated that an anticipated variation of this is a form factor which externally affixes (by virtue of design), housing-to-housing, to communication device 1930A without enveloping it.

Figure 26A:
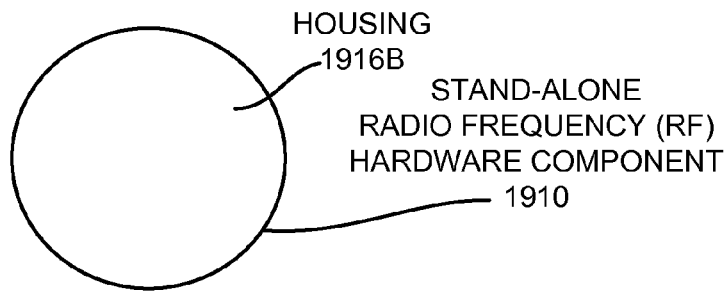
FIG. 26A is a front view of the outside of radio frequency hardware component, according to various embodiments.

FIG. 26A is a front view of the outside of radio frequency hardware component 1910, according to various embodiments. In this embodiment, RF hardware component 1910 is disposed within a housing 1916B. Housing 1916B is illustrated as being puck shaped, but may have other shapes which do not include a cavity into which communication device 1930A can be inserted and/or do not externally affix (by virtue of design), housing-to-housing, to communication device 1930A.

Figure 26B:
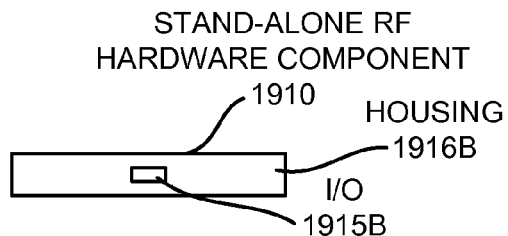
FIG. 26B is a side view of the outside of radio frequency hardware component, according to various embodiments.

FIG. 26B is a side view of the outside of radio frequency hardware component, according to various embodiments. In one embodiment an I/O 1915 is included in some portion of housing 1938. Here it has been depicted on a side edge; however, in other embodiments, I/O 1915 may be located in other portions of housing 1916B. All though depicted as a female I/O, I/O 1915B may be a male I/O and may be integrated with a bus in some embodiments.

Figure 27:
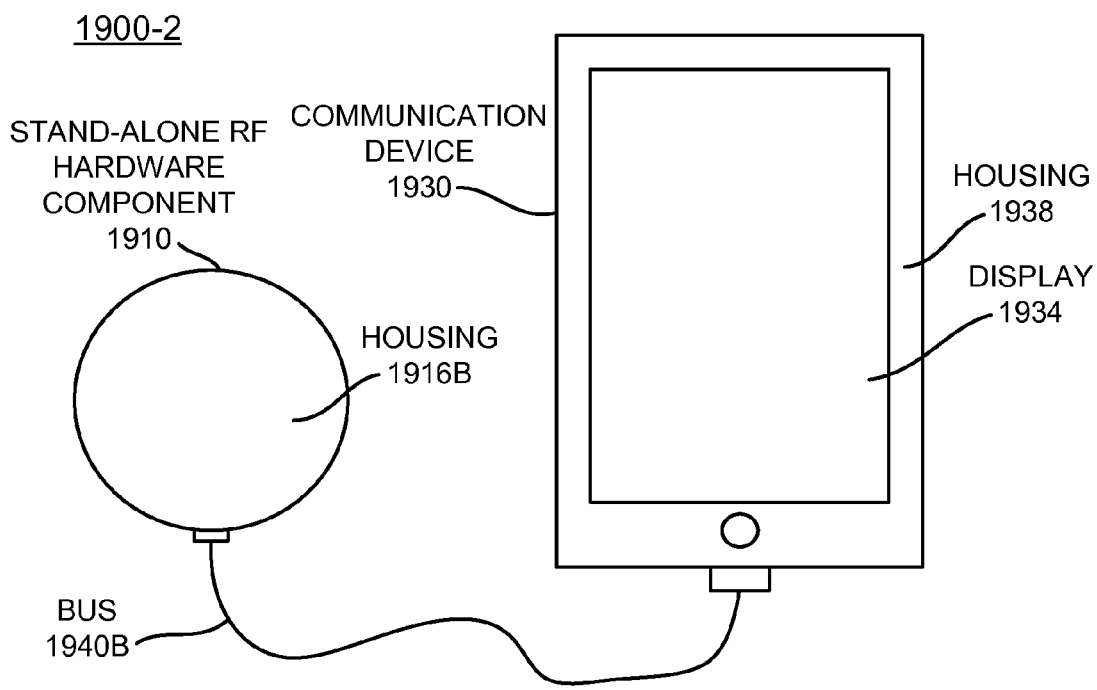
FIG. 27 is a front view of the outside of radio frequency hardware component coupled with a communication device to form a GNSS receiver, according to various embodiments.

FIG. 27 is a front view of the outside of radio frequency hardware component 1910 that is coupled with a communication device to form GNSS receiver 1900-2, according to various embodiments. Bus 1940B couples I/O 1915B to I/O 1935 of communication device 1930A, thus engaging a removable communicative coupling between RF hardware component 1910 and communication device 1930A.

Figure 28:
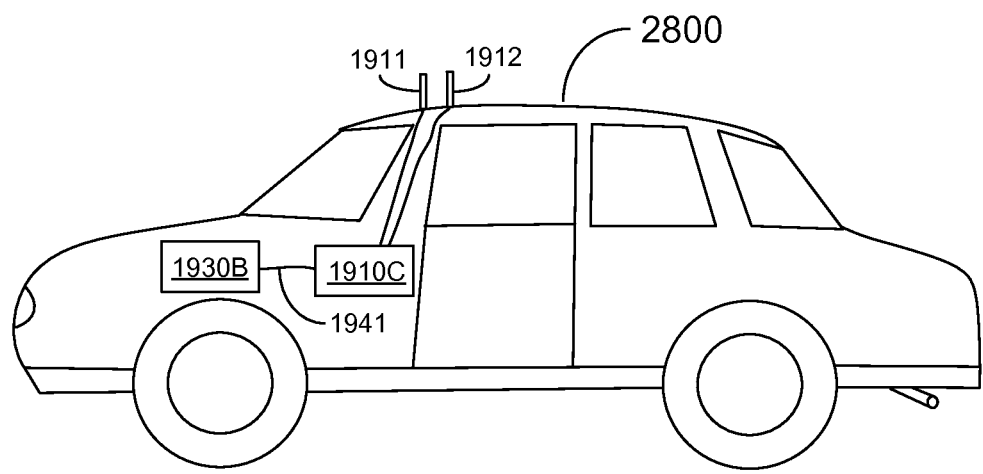
FIG. 28 is a diagram of a vehicle which includes a global navigation satellite system receiver system with a radio frequency hardware component, according to various embodiments.
Figure 29:
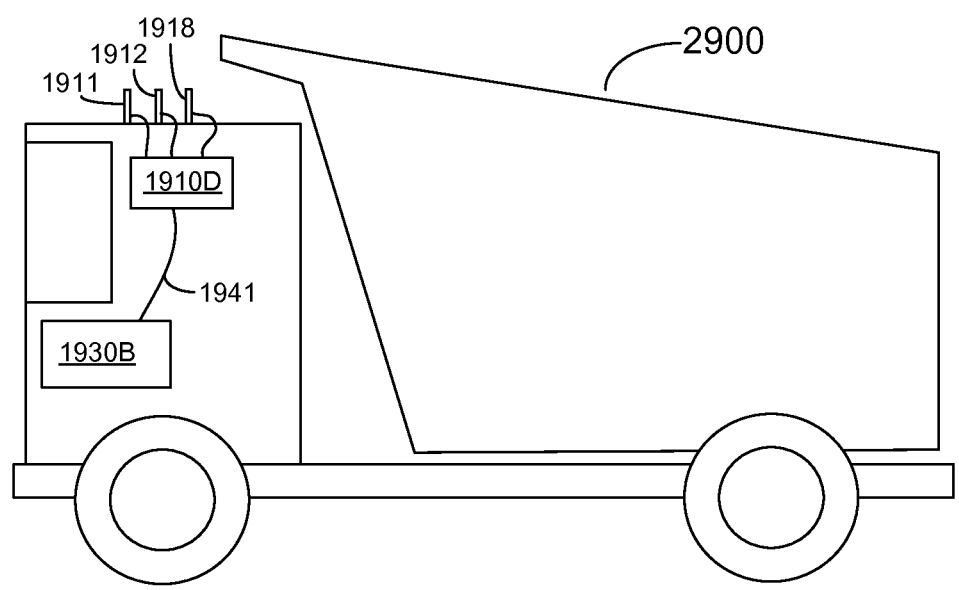
FIG. 29 is a diagram of a vehicle which includes a global navigation satellite system receiver system with a radio frequency hardware component, according to various embodiments.

FIG. 28 is a diagram of a vehicle which includes a vehicle-based GNSS receiver system with a vehicle-based radio frequency hardware component, according to various embodiments. Vehicle 2800 is illustrated as an automobile, but is not so limited; instead vehicle 2800 may be virtually any on-road or off-road vehicle. Vehicle 2800 includes an implementation of GNSS receiver system 1900C which is vehicle-based. In the illustrated implementation, two antennas (antennas 1911 and 1912) are installed on vehicle 2800 with a view of the sky. Although antennas 1911 and 1912 are depicted as external antennas, they may also be located inside of vehicle 2800. Additionally, as depicted in FIG. 29, more than two antennas may be utilized in some embodiments. The two antennas are coupled with RF hardware component 1910, such as 1910C by way of example, that is disposed in vehicle 2800, and in some embodiments may be manufactured as a part of vehicle 2800. RF hardware component 1910 is communicatively coupled with communication device 1930, such as 1930B by way of example. The communicative coupling may be wired or wireline and, as previously described herein, a wireline coupling may convey either digital or analog GNSS signals from RF hardware component 1910 to communication device 1930. The communicative coupling couples the outputs of RF hardware component 1910, from its location in vehicle 2800, directly to communication device 1930 at its location in vehicle 2800. In some embodiments, RF hardware component 1910 and communication device 1930 are separate devices. Communication device 1930 is disposed in and coupled with vehicle 2800, and in some embodiments may be manufactured as part of vehicle 2800. For example, communication device 1930 may be a subsystem of vehicle 2800 and/or may be or include a hardware DSRC radio or a software defined DSRC radio compliant with IEEE 802.11p standards. In some embodiments, communication device 1930 is an entertainment system of vehicle 2800, an infotainment system (which supplies visual data such as weather and/or maps in addition to controlling other electronic systems of the vehicle beyond just entertainment) of vehicle 2800, a safety sub-system of vehicle 2800 (such as a vehicle stability and control sub-system or domain control sub-system), or another electronic device of vehicle 2800 which includes a processor. The Sync® system used by Ford Motor Company is one example of a vehicle based infotainment system which controls more functions than just audio or video entertainment. Communication device 1930 includes one or more processors 1931, at least one of which is utilized to implement soft GNSS receiver 1933. Processor 1931 may be a host processor of communication device 1930; a microprocessor communication device 1930 that is not the host processor; a graphics processing unit (GPU) communication device 1930; or a digital signal processor (DSP) communication device 1930.

FIG. 29 is a diagram of a vehicle which includes a vehicle-based GNSS receiver system with a vehicle-based radio frequency hardware component, according to various embodiments. Vehicle 2900 is illustrated as a dump truck, but is not so limited; instead vehicle 2900 may be virtually any on-road or off-road vehicle. Vehicle 2900 includes an implementation of GNSS receiver system 1900D which is vehicle-based. In the illustrated implementation, three antennas (antennas 1911, 1912, and 1918) are installed on vehicle 2900 with a view of the sky. Although antennas 1911, 1912, and 1918 are depicted as external antennas, they may also be located inside of vehicle 2900. The three antennas are coupled with RF hardware component 1910, such as 1910D by way of example, that is disposed in vehicle 2900, and in some embodiments may be manufactured as a part of vehicle 2900. RF hardware component 1910 is communicatively coupled with communication device 1930, such as 1930B by way of example. The communicative coupling may be wired or wireline and, as previously described herein, a wireline coupling may convey either digital or analog GNSS signals from RF hardware component 1910 to communication device 1930. The communicative coupling couples the outputs of RF hardware component 1910, from its location in vehicle 2900, directly to communication device 1930 at its location in vehicle 2900. In some embodiments, RF hardware component 1910 and communication device 1930 are separate devices. Communication device 1930 is disposed in and coupled with vehicle 2900, and in some embodiments may be manufactured as part of vehicle 2900. For example, communication device 1930 may be a subsystem of vehicle 2900 and/or may be or include a hardware DSRC radio or a software defined DSRC radio compliant with IEEE 802.11p standards. In some embodiments, communication device 1930 is an entertainment system of vehicle 2900, an infotainment system (which supplies visual data such as weather and/or maps in addition to controlling other electronic systems of the vehicle beyond just entertainment) of vehicle 2900, a safety sub-system of vehicle 2900 (such as a vehicle stability and control sub-system or domain control sub-system), or another electronic device of vehicle 2900 which includes a processor. The Sync® system used by Ford Motor Company is one example of a vehicle based infotainment system which controls more functions than just audio or video entertainment. Communication device 1930 includes one or more processors 1931, at least one of which is utilized to implement soft GNSS receiver 1933. Processor 1931 may be a host processor of communication device 1930; a microprocessor communication device 1930 that is not the host processor; a graphics processing unit (GPU) communication device 1930; or a digital signal processor (DSP) communication device 1930.

FIG. 30 is a flowchart 3000 of a method of position determination, in accordance with various embodiments. In some embodiments, one or more aspects of the method illustrated in flowchart 3000 may comprise instructions which are stored on a computer-readable storage media and which when executed cause a processor to perform an action.

At 3010 of flowchart 3000, a first analog Global Navigation Satellite System (GNSS) signal in a first frequency band is received, over-the-air with a first antenna of a radio frequency hardware component. For example, this may comprise an antenna 1911 of an RF hardware component 1910 receiving an analog L2C GPS signal that is in the L2 frequency band.

At 3020 of flowchart 3000, at least a second analog GNSS signal in a second frequency band is received, over-the-air, with a second antenna of the radio frequency hardware component, where the first frequency band and the second frequency band are separate and distinct. For example, this may comprise antenna 1912 of an RF hardware component 1910 receiving an L1 GPS signal that is in the L1 frequency band. In some embodiments, this may additionally include antenna 1912 receiving one or more of an analog L1 Galileo signal, a modernized analog L1 BeiDou signal, a modernized analog Compass signal, and an analog L1 pseudolite signal. In some embodiments, antenna 1912 may also receive analog L1 GNSS signals from one or more of: BeiDou satellites (i.e., conventional L1 BeiDou), Glonass satellites (i.e., conventional L1 Glonass), or from terrestrial pseudolite(s) that are in a frequency division multiple access format.

At 3030 of flowchart 3000, the first analog GNSS signal is digitized into a first digitalized GNSS signal 2021A with a digitizer of the radio frequency hardware component. For example, in one embodiment, this comprises using a digitizer 1913 of an RF hardware component 1910 to digitize the L2C GPS signal.

At 3040 of flowchart 3000, the second analog GNSS signal is digitized into a second digitalized GNSS signal 2021B with a digitizer of the radio frequency hardware component. For example, in one embodiment, this comprises using the digitizer 1913 of an RF hardware component 1910 to digitize the L1 GPS signal. In some embodiments, additional L1 GNSS signals received by antenna 1912 are from a disparate GNSS system that uses the same channel access method (e.g., CDMA) is also digitized into additional digitized GNSS signals 2021C. For example, in one embodiment digitizer 1913 also digitizes received L1 Galileo signals, received L1 BeiDou CDMA signals (i.e., modernized L1 BeiDou), received L1 Glonass CDMA signals (i.e., modernized L1 Glonass), and/or received L1 pseudolite signals. In some embodiments, additional L1 GNSS signals received by antenna 1912 are from a disparate GNSS system that uses a different channel access method (e.g., FDMA) is also digitized into additional digitized GNSS signals 2021C. For example, in one embodiment digitizer 1913 also digitizes received L1 Galileo signals, received L1 BeiDou CDMA signals (i.e., modernized L1 BeiDou), received L1 Glonass CDMA signals (i.e., modernized L1 Glonass), and/or received L1 pseudolite signals. It is appreciated that FDMA and CDMA signals received by a signal antenna are processed with different RFICs from one another and sometimes with different filters from one another.

In some embodiments, the RF hardware component 1910 may include an additional antenna, such as antenna 1918, that receives yet another analog GNSS signal over-the-air. For example, in one embodiment, an analog L5 GNSS signal may be received in the L5 frequency band. This received L5 signal is digitized into yet another digitized GNSS signal 2021C by digitizer 1913. In one example embodiment, where an analog L5 GPS signal is received over-the-air via antenna 1918, the L5 GPS signal is digitized by digitizer 1913. Similarly analog pseudolite transmitted signals may be received in the L5 band by antenna 1918. In another embodiment, antenna 1918 receives analog L1 GNSS signals from one or more of: BeiDou satellites (i.e., conventional L1 BeiDou), Glonass satellites (i.e., conventional L1 Glonass), or from terrestrial pseudolite(s) that are in a frequency division multiple access format. The received analog L1 Glonass signals, analog L1 BeiDou signals, or analog L1 pseudolite signals are digitized into digitized GNSS signals 2021C by digitizer 1913. In another embodiment, antenna 1918 receives analog SBAS signals from one or more satellites that provide GNSS corrections services (e.g., Indian GPS aided Geo Augmented Navigation System (GAGAN), European Geostationary Navigation Overlay Service (EGNOS), Japanese Multi-functional Satellite Augmentation System (MSAS), John Deere's StarFire, WAAS and Trimble's OmniSTAR to name several). The received analog SBAS signals are digitized into digitized signals by digitizer 1913B of RF hardware component 1910 in a similar manner to digitized GNSS signals 2021.

In some embodiments, the digitized GNSS signals 2021 (and digitized SBAS signals if received) are serialized for transmission to a separately implemented communication device 1930. In some embodiments, where the RF hardware component 1910 and the communication device 1930 are more integrated, the digitized GNSS signals 2021 are directly provided (without being serialized as an interim step) to a processor of the communication device 1930.

At 3050 of flowchart 3000, the digitized GNSS signals 2021 (and SBAS signals if received and digitized) are received at a communication device 1930 located proximate to the radio frequency hardware component 1910, where the communication device 1930 comprises an internal GNSS receiver chipset 1937. In some embodiments the digitized GNSS signals 2021 are received as a serial transmission at a communication device 1930 located proximate to and removably coupled with the radio frequency hardware component 1910. The digitized GNSS signals are serialized into the serialized transmission by a serializer of the radio frequency hardware component 1910. In one embodiment, proximate means that communication device 1930 is located no more than 7 meters from radio frequency hardware component 1910. In one embodiment, proximate means that communication device 1930 is located no more than three centimeters from radio frequency hardware component 1910. In one embodiment, proximate means that an external housing 1916 of communication device 1930 physically touches an external housing 1938 of radio frequency hardware component 1910.

At 3060 of flowchart 3000, a software defined GNSS receiver 1933 operating on a processor 1931 of the communication device 1930 is used to determine first information from the first digitized GNSS signal and to determine second information from the second digitized GNSS signal. The processor is located outside of any imbedded GNSS receiver chipset of the communication device 1930. In general, a combination of at least the first information and the second information is used by the soft GNSS receiver 1933 to determine a position. In some embodiments, the first and second information are used to determine a two code position solution (e.g., L2C code and L1 code). In some embodiments, the first and second information are used to perform carrier phase interferometry to reduce ionospheric distortions of signals received from a particular GNSS satellite from which signals on two different frequencies have been provided as the first and second digitized GNSS signals. For example, this can comprise soft GNSS receiver 1933 receiving the digitized GNSS signals 2021 and decoding at least L2C pseudoranges from the digitized L2C GPS signals as the first information, and decoding at least L1 pseudoranges from the digitized L1 GPS signals. The decoded information from signals in separate frequency bands from a single satellite is used to perform carrier phase interferometry to produce an ionosphere-free L1 signal that has ionospheric perturbations cancelled out. Techniques for production of such an ionosphere-free L1 signal are well-known in the art. The position determination is carried out by soft GNSS receiver using code of the ionosphere-free L1 signal and the code of the L2C signal. In some embodiments, L1 signals received from additional GNSS systems that are disparate from the GPS system may be included with L1 GPS signal when carrying out the position determination.

In some embodiments corrections information 2210 received by transceiver 1936 may also be supplied to and used by soft GNSS receiver 1933 to further refine a position that is determined. In some embodiments, SBAS signals that are received by RF hardware component 1910 are supplied to soft GNSS receiver 1933 and used to further refine a position that is determined.

FIG. 31 is a flowchart 3100 of a method of position determination, in accordance with various embodiments. In some embodiments, one or more aspects of the method illustrated in flowchart 3100 may comprise instructions which are stored on a computer-readable storage media and which when executed cause a processor to perform an action. It is appreciated that the components involved in implementing the method described in flowchart 3100 are all disposed in a single, common vehicle.

At 3110 of flowchart 3100, a first analog Global Navigation Satellite System (GNSS) signal in a first frequency band is received, over-the-air with a first antenna of a radio frequency hardware component that is coupled with a vehicle. For example, as depicted in FIGS. 28 and 29, this may comprise an antenna 1911 of an RF hardware component 1910 receiving an analog L2C GPS signal that is in the L2 frequency band.

At 3120 of flowchart 3100, at least a second analog GNSS signal in a second frequency band is received, over-the-air, with a second antenna of the radio frequency hardware component, where the first frequency band and the second frequency band are separate and distinct. For example, as depicted in FIGS. 28 and 29, this may comprise antenna 1912 of an RF hardware component 1910 receiving an L1 GPS signal that is in the L1 frequency band. In some embodiments, this may additionally include antenna 1912 receiving one or more of an analog L1 Galileo signal, a modernized analog L1 BeiDou signal, a modernized analog Compass signal, and an analog L1 pseudolite signal. In some embodiments, antenna 1912 may also receive analog L1 GNSS signals from one or more of: BeiDou satellites (i.e., conventional L1 BeiDou), Glonass satellites (i.e., conventional L1 Glonass), or from terrestrial pseudolite(s) that are in a frequency division multiple access format.

At 3130 of flowchart 3100, the first analog GNSS signal is digitized into a first digitalized GNSS signal 2021A with a digitizer of the radio frequency hardware component. For example, in one embodiment, this comprises using a digitizer 1913 of an RF hardware component 1910 to digitize the L2C GPS signal.

At 3140 of flowchart 3100, the second analog GNSS signal is digitized into a second digitalized GNSS signal 2021B with a digitizer of the radio frequency hardware component. For example, in one embodiment, this comprises using the digitizer 1913 of an RF hardware component 1910 to digitize the L1 GPS signal. In some embodiments, additional L1 GNSS signals received by antenna 1912 are from a disparate GNSS system that uses the same channel access method (e.g., CDMA) is also digitized into additional digitized GNSS signals 2021C. For example, in one embodiment digitizer 1913 also digitizes received L1 Galileo signals, received L1 BeiDou CDMA signals (i.e., modernized L1 BeiDou), received L1 Glonass CDMA signals (i.e., modernized L1 Glonass), and/or received L1 pseudolite signals. In some embodiments, additional L1 GNSS signals received by antenna 1912 are from a disparate GNSS system that uses a different channel access method (e.g., FDMA) is also digitized into additional digitized GNSS signals 2021C. For example, in one embodiment digitizer 1913 also digitizes received L1 Galileo signals, received L1 BeiDou CDMA signals (i.e., modernized L1 BeiDou), received L1 Glonass CDMA signals (i.e., modernized L1 Glonass), and/or received L1 pseudolite signals. It is appreciated that FDMA and CDMA signals received by a signal antenna are processed with different RFICs from one another and sometimes with different filters from one another.

In some embodiments, the RF hardware component 1910 may include an additional antenna, such as antenna 1918, that receives yet another analog GNSS signal over-the-air. One such embodiment is illustrated in FIG. 29. For example, in one embodiment, an analog L5 GNSS signal may be received in the L5 frequency band. This received L5 signal is digitized into yet another digitized GNSS signal 2021C by digitizer 1913. In one example embodiment, where an analog L5 GPS signal is received over-the-air via antenna 1918, the L5 GPS signal is digitized by digitizer 1913B. Similarly analog pseudolite transmitted signals may be received in the L5 band by antenna 1918. In another embodiment, antenna 1918 receives analog L1 GNSS signals from one or more of: BeiDou satellites (i.e., conventional L1 BeiDou), Glonass satellites (i.e., conventional L1 Glonass), or from terrestrial pseudolite(s) that are in a frequency division multiple access format. The received analog L1 Glonass signals, analog L1 BeiDou signals, or analog L1 pseudolite signals are digitized into digitized GNSS signals 2021C by digitizer 1913B of RF hardware component 1910. In another embodiment, antenna 1918 receives analog SBAS signals from one or more satellites that provide GNSS corrections services (e.g., Indian GPS aided Geo Augmented Navigation System (GAGAN), European Geostationary Navigation Overlay Service (EGNOS), Japanese Multi-functional Satellite Augmentation System (MSAS), John Deere's StarFire, WAAS and Trimble's OmniSTAR to name several). The received analog SBAS signals are digitized into digitized signals by digitizer 1913B of RF hardware component 1910 in a similar manner to digitized GNSS signals 2021.

In some embodiments, the digitized GNSS signals 2021 (and digitized SBAS signals if received) are serialized for transmission to a separately implemented communication device 1930. In some embodiments, where the RF hardware component 1910 and the communication device 1930B are more integrated, the digitized GNSS signals 2021 are directly provided (without being serialized as an interim step) to a processor of the communication device 1930.

At 3150 of flowchart 3100, the digitized GNSS signals 2021 (and SBAS signals if received and digitized) are received at a communication device 1930B of the vehicle. In some embodiments the digitized GNSS signals 2021 are received as a serial transmission at communication device 1930B. For example, the digitized GNSS signals 2021 are serialized into the serialized transmission by a serializer of the radio frequency hardware component 1910 or 1910. In one embodiment, communication device 1930B is located in the same vehicle and no more than 7 meters from radio frequency hardware component 1910.

At 3160 of flowchart 3100, a software defined GNSS receiver 1933 operating on a processor 1931 of the communication device 1930B is used to determine first information from the first digitized GNSS signal and to determine second information from the second digitized GNSS signal. In general, a combination of at least the first information and the second information is used by the soft GNSS receiver 1933 to determine a position. In some embodiments, the first and second information are used to determine a two code position solution (e.g., L2C code and L1 code). In some embodiments, the first and second information are used to perform carrier phase interferometry to reduce ionospheric distortions of signals received from a particular GNSS satellite from which signals on two different frequencies have been provided as the first and second digitized GNSS signals. For example, this can comprise soft GNSS receiver 1933 receiving the digitized GNSS signals 2021 and decoding at least L2C pseudoranges from the digitized L2 C GPS signals as the first information, and decoding at least L1 pseudoranges from the digitized L1 GPS signals. The decoded information from signals in separate frequency bands from a single satellite is used to perform carrier phase interferometry to produce an ionosphere-free L1 signal that has ionospheric perturbations cancelled out. Techniques for production of such an ionosphere-free L1 signal are well-known in the art. The position determination is carried out by soft GNSS receiver using code of the ionosphere-free L1 signal and the code of the L2C signal. In some embodiments, L1 signals received from additional GNSS systems that are disparate from the GPS system may be included with L1 GPS signal when carrying out the position determination.

In some embodiments corrections information 2210 received by transceiver 1936 may also be supplied to and used by soft GNSS receiver 1933 to further refine a position that is determined. In some embodiments, SBAS signals that are received by RF hardware component 1910 are supplied to soft GNSS receiver 1933 and used to further refine a position that is determined.

CONCLUSION

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A stand-alone radio frequency hardware component comprising:
   a first antenna configured for receiving, over-the-air, a first analog Global Navigation Satellite System (GNSS) signal in a first frequency band;
   a second antenna configured for receiving, over-the-air, at least a second analog GNSS signal in a second frequency band, wherein said first frequency band and said second frequency band are separate and distinct;
   a digitizer configured for digitizing said first analog GNSS signal into a first digitalized GNSS signal and for digitizing said second analog GNSS signal into a second digitized GNSS signal;
   a serializer configured for serializing said digitized GNSS signals into a serialized output signal; and
   a serial output configured for communicatively coupling said digitized GNSS signals, as said serialized output signal, directly from said radio frequency hardware component to a communication device that is removably couplable with said stand-alone radio frequency hardware component.

2. The stand-alone radio frequency hardware component of claim 1, wherein said digitizer comprises:
   a first Radio Frequency Integrated Circuit (RFIC) configured for digitizing said first analog GNSS signal into said first digital signal; and
   a second RFIC configured for digitizing said at least said second analog GNSS signal into said second digital signal.

3. The stand-alone radio frequency hardware component of claim 1, wherein at least one of said first analog GNSS signal and said second analog GNSS signal is an L2C Global Positioning System (GPS) signal and the other of said first analog GNSS signal and said second analog GNSS signal is an L1 GPS signal.

4. The stand-alone radio frequency hardware component of claim 3, wherein:
   said stand-alone radio frequency hardware component is further configured for receiving, over-the-air, an analog L1 Galileo signal in said second frequency band; and
   said digitizer is further configured for digitizing said analog L1 Galileo signal into a third digitalized GNSS signal.

5. The stand-alone radio frequency hardware component of claim 3, further comprising:
   said stand-alone radio frequency hardware component is further configured for receiving, over-the-air, an analog L1 BeiDou signal in said second frequency band; and
   said digitizer is further configured for digitizing said analog L1 BeiDou signal into a third digitalized GNSS signal.

6. The stand-alone radio frequency hardware component of claim 3, further comprising:
   said stand-alone radio frequency hardware component is further configured for receiving, over-the-air, an analog L1 Glonass signal in said second frequency band; and
   said digitizer is further configured for digitizing said analog L1 Glonass signal into a third digitalized GNSS signal.

7. The stand-alone radio frequency hardware component of claim 3, further comprising:
   a third antenna configured for receiving, over-the-air, an analog L1 pseudolite signal in said second frequency band, and wherein said digitizer is further configured for digitizing said analog L1 pseudo lite signal into a third digitalized GNSS signal.

8. The stand-alone radio frequency hardware component of claim 3, further comprising:
   a third antenna configured for receiving, over-the-air, an analog Satellite Based Augmentation System (SBAS) signal, and wherein said digitizer is further configured for digitizing said analog SBAS signal into a digitalized signal.

9. The stand-alone radio frequency hardware component of claim 3, further comprising:
   a third antenna configured for receiving, an analog L5 GPS signal in a third frequency band that is separate and distinct from said first frequency band and from said second frequency band, and wherein said digitizer is further configured for digitizing said analog L5 GPS signal into a third digitalized GNSS signal.

10. A Global Navigation Satellite System (GNSS) receiver system comprising:
    a radio frequency hardware component comprising:
       a first antenna configured for receiving, over-the-air, a first analog GNSS signal in a first frequency band;
       a second antenna configured for receiving, over-the-air, at least a second analog GNSS signal in a second frequency band, wherein said first frequency band and said second frequency band are separate and distinct;
       a digitizer configured for digitizing said first analog GNSS signal into a first digitalized GNSS signal and for digitizing said second analog GNSS signal into a second digitized GNSS signal; and
    a communication device configured to receive said digitized GNSS signals via a physical coupling with said radio frequency hardware component, said communication device comprising:
       an internal GNSS receiver chipset; and
       a processor, located outside of said internal GNSS receiver chipset, said processor configured for operating a software defined GNSS receiver to determine a position using at least first information obtained by said processor from said first digitized GNSS signal and second information obtained by said processor from said second digitized GNSS signal.

11. The GNSS receiver system of claim 10, wherein said radio frequency hardware component further comprises:
    a serializer configured for serializing said digitized GNSS signals into a serialized output signal; and
    wherein said radio frequency hardware component comprises a stand-alone radio frequency hardware component disposed proximate to and removably coupled with said communication device and is configured for communicatively coupling said digitized GNSS signals, as said serialized output signal, directly from said stand-alone radio frequency hardware component to said communication device via said physical coupling.

12. The GNSS receiver system of claim 10, wherein said digitizer comprises:
- a first Radio Frequency Integrated Circuit (RFIC) configured for digitizing said first analog GNSS signal into said first digital signal; and
- a second RFIC configured for digitizing said at least said second analog GNSS signal into said second digital signal.

13. The GNSS receiver system of claim 10, wherein at least one of said first analog GNSS signal and said second analog GNSS signal is an L2C Global Positioning System (GPS) signal and the other of said first analog GNSS signal and said second analog GNSS signal is an L1 GPS signal.

14. The GNSS receiver system of claim 13, wherein:
- said radio frequency hardware component is further configured for receiving, over-the-air, an analog L1 Galileo signal in said second frequency band; and
- said digitizer is further configured for digitizing said analog L1 Galileo signal into a third digitalized GNSS signal.

15. The GNSS receiver system of claim 13, wherein:
- said radio frequency hardware component is further configured for receiving, over-the-air, an analog L1 BeiDou signal; and
- said digitizer is further configured for digitizing said analog L1 BeiDou signal into a third digitalized GNSS signal.

16. The GNSS receiver system of claim 13, wherein:
- said radio frequency hardware component is further configured for receiving, over-the-air, an analog L1 Glonass signal; and
- said digitizer is further configured for digitizing said analog L1 Glonass signal into a third digitalized GNSS signal.

17. The GNSS receiver system of claim 13, wherein:
- said radio frequency hardware component is further configured for receiving, over-the-air, an analog L1 pseudolite signal; and
- said digitizer is further configured for digitizing said analog L1 pseudolite signal into a third digitalized GNSS signal.

18. The GNSS receiver system of claim 13, further comprising:
- a third antenna configured for receiving, over-the-air, an analog L5 GPS signal in a third frequency band that is separate and distinct from said first frequency band and from said second frequency band; and
- said digitizer is further configured for digitizing said analog L5 GPS signal into a third digitalized GNSS signal.

19. The GNSS receiver system of claim 10, wherein said processor comprises a processor selected from the list of processors consisting of: a host processor of said communication device; a microprocessor of said communication device, a graphics processing unit (GPU) of said communication device; and a digital signal processor (DSP) of said communication device.

20. The GNSS receiver system of claim 10, wherein said communication device is selected from the list of communication devices consisting of: a cellular telephone; a tablet computer; a two-way non-cellular radio; a dedicated short range communication (DSRC) radio which complies with Institute of Electrical and Electronics Engineers (IEEE) 802.11p standards; and a dedicated short range communication (DSRC) radio which is implemented as a software defined radio in compliance with IEEE 802.11p standards.

21. A method of position determination, said method comprising:
- receiving, over-the-air with a first antenna of a radio frequency hardware component, a first analog Global Navigation Satellite System (GNSS) signal in a first frequency band;
- receiving, over-the-air with a second antenna of said radio frequency hardware component, at least a second analog GNSS signal in a second frequency band, wherein said first frequency band and said second frequency band are separate and distinct;
- digitizing said first analog GNSS signal into a first digitalized GNSS signal with a digitizer of said radio frequency hardware component;
- digitizing said second analog GNSS signal into a second digitized GNSS signal with a said digitizer of said radio frequency hardware component;
- receiving said digitized GNSS signals at a communication device located proximate to said radio frequency hardware component, said communication device comprising an internal GNSS receiver chipset; and
- using a software defined GNSS receiver operating on a processor of said communication device to obtain first information from said first digitized GNSS signal, obtain second information from said second digitized GNSS signal, and determine a position using at least both of the first information and the second information, wherein the processor is located outside of the GNSS receiver chipset.

22. The method are recited in claim 21, further comprising:
- receiving GNSS corrections at said communication device; and
- utilizing said GNSS corrections in said software defined GNSS receiver as a portion performing said position determination.

23. The method as recited in claim 21, wherein said receiving, over-the-air with a first antenna of a radio frequency hardware component, a first analog GNSS signal in a first frequency band comprises receiving an analog L2C GPS signal; and
- wherein said receiving, over-the-air with a second antenna of said radio frequency hardware component, at least a second analog GNSS signal in a second frequency band comprises receiving an analog L1 GPS signal.

24. The method as recited in claim 23, further comprising:
- receiving, over-the-air with said radio frequency hardware component, a third analog GNSS signal selected from the group consisting of: an analog L1 Galileo signal;
- an analog L1 BeiDou signal, an analog L1 Glonass signal; an analog L5 GPS signal; and an analog pseudolite transmitted GNSS signal;
- digitizing said third analog GNSS signal into a third digitized GNSS signal with said digitizer of said radio frequency hardware component; and
- using said software defined GNSS receiver to obtain third information from said third digitized GNSS signal and to employ said third information as a portion of performing said position determination.

25. The method as recited in claim 21, wherein said receiving said digitized GNSS signals at a communication device located proximate to said radio frequency hardware component comprises:
- receiving a serial transmission of said digitized GNSS signals at said communication device located proximate to and removably coupled with said radio frequency hardware component, wherein said digitized GNSS signals are serialized into said serialized transmission by a serializer of said radio frequency hardware component.

26. A Global Navigation Satellite System (GNSS) receiver system comprising:
a radio frequency hardware component comprising:
a first antenna configured for receiving, over-the-air, a first analog GNSS signal in a first frequency band;
a second antenna configured for receiving, over-the-air, at least a second analog GNSS signal in a second frequency band, wherein said first frequency band and said second frequency band are separate and distinct;
a digitizer configured for digitizing said first analog GNSS signal into a first digitalized GNSS signal and for digitizing said second analog GNSS signal into a second digitized GNSS signal; and
a communication device configured to receive said digitized GNSS signals via a physical coupling with said radio frequency hardware component, said communication device comprising:
a processor configured for operating a software defined GNSS receiver to determine a position using at least first information obtained by said processor from said first digitized GNSS signal and second information obtained by said processor from said second digitized GNSS signal.

27. The GNSS receiver system of claim 26, wherein said radio frequency hardware component further comprises:
a serializer configured for serializing said digitized GNSS signals into a serialized output signal; and
wherein said radio frequency hardware component comprises a stand-alone radio frequency hardware component disposed proximate to and removably coupled with said communication device and is configured for communicatively coupling said digitized GNSS signals, as said serialized output signal, directly from said stand-alone radio frequency hardware component to said communication device via said physical coupling.

28. The GNSS receiver system of claim 26, wherein said digitizer comprises:
a first Radio Frequency Integrated Circuit (RFIC) configured for digitizing said first analog GNSS signal into said first digital signal; and
a second RFIC configured for digitizing said at least said second analog GNSS signal into said second digital signal.

29. The GNSS receiver system of claim 26, wherein at least one of said first analog GNSS signal and said second analog GNSS signal is an L2C Global Positioning System (GPS) signal and the other of said first analog GNSS signal and said second analog GNSS signal is an L1 GPS signal.

30. The GNSS receiver system of claim 29, wherein:
said radio frequency hardware component is further configured for receiving, over-the-air, an analog L1 Galileo signal in said second frequency band; and
said digitizer is further configured for digitizing said analog L1 Galileo signal into a third digitalized GNSS signal.

31. The GNSS receiver system of claim 29, wherein:
said radio frequency hardware component is further configured for receiving, over-the-air, an analog L1 BeiDou signal; and said digitizer is further configured for digitizing said analog L1 BeiDou signal into a third digitalized GNSS signal.

32. The GNSS receiver system of claim 29, wherein:
said radio frequency hardware component is further configured for receiving, over-the-air, an analog L1 Glonass signal; and
said digitizer is further configured for digitizing said analog L1 Glonass signal into a third digitalized GNSS signal.

33. The GNSS receiver system of claim 29, wherein:
said radio frequency hardware component is further configured for receiving, over-the-air, an analog L1 pseudolite signal; and
said digitizer is further configured for digitizing said analog L1 pseudolite signal into a third digitalized GNSS signal.

34. The GNSS receiver system of claim 29, further comprising:
a third antenna configured for receiving, over-the-air, an analog L5 GPS signal in a third frequency band that is separate and distinct from said first frequency band and from said second frequency band; and
said digitizer is further configured for digitizing said analog L5 GPS signal into a third digitalized GNSS signal.

35. The GNSS receiver system of claim 26, wherein said processor comprises a processor selected from the list of processors consisting of: a host processor of said communication device; a microprocessor of said communication device, a graphics processing unit (GPU) of said communication device; and a digital signal processor (DSP) of said communication device.

36. The GNSS receiver system of claim 26, wherein said communication device is selected from the list of communication devices consisting of: a cellular telephone; a tablet computer; a two-way non-cellular radio; a dedicated short range communication (DSRC) radio which complies with Institute of Electrical and Electronics Engineers (IEEE) 802.11p standards; and a dedicated short range communication (DSRC) radio which is implemented as a software defined radio in compliance with IEEE 802.11p standards.

37. A method of position determination, said method comprising:
receiving, over-the-air with a first antenna of a radio frequency hardware component, a first analog Global Navigation Satellite System (GNSS) signal in a first frequency band;
receiving, over-the-air with a second antenna of said radio frequency hardware component, at least a second analog GNSS signal in a second frequency band, wherein said first frequency band and said second frequency band are separate and distinct;
digitizing said first analog GNSS signal into a first digitalized GNSS signal with a digitizer of said radio frequency hardware component;
digitizing said second analog GNSS signal into a second digitized GNSS signal with a said digitizer of said radio frequency hardware component;
receiving said digitized GNSS signals at a communication device located proximate to said radio frequency hardware component; and
using a software defined GNSS receiver operating on a processor of said communication device to obtain first information from said first digitized GNSS signal, obtain second information from said second digitized GNSS signal, and determine a position using at least both of the first information and the second information.

38. The method are recited in claim 37, further comprising:
   receiving GNSS corrections at said communication device; and
   utilizing said GNSS corrections in said software defined GNSS receiver as a portion performing said position determination.

39. The method as recited in claim 37, wherein said receiving, over-the-air with a first antenna of a radio frequency hardware component, a first analog GNSS signal in a first frequency band comprises receiving an analog L2C GPS signal; and
   wherein said receiving, over-the-air with a second antenna of said radio frequency hardware component, at least a second analog GNSS signal in a second frequency band comprises receiving an analog L1 GPS signal.

40. The method as recited in claim 39, further comprising:
   receiving, over-the-air with said radio frequency hardware component, a third analog GNSS signal selected from the group consisting of: an analog L1 Galileo signal; an analog L1 BeiDou signal, an analog L1 Glonass signal; an analog L5 GPS signal; and an analog pseudolite transmitted GNSS signal;
   digitizing said third analog GNSS signal into a third digitized GNSS signal with said digitizer of said radio frequency hardware component; and
   using said software defined GNSS receiver to obtain third information from said third digitized GNSS signal and to employ said third information as a portion of performing said position determination.

41. The method as recited in claim 37, wherein said receiving said digitized GNSS signals at a communication device located proximate to said radio frequency hardware component comprises:
   receiving a serial transmission of said digitized GNSS signals at said communication device located proximate to and removably coupled with said radio frequency hardware component, wherein said digitized GNSS signals are serialized into said serialized transmission by a serializer of said radio frequency hardware component.

\* \* \* \* \*